(12) United States Patent
Lee et al.

(10) Patent No.: US 9,665,259 B2
(45) Date of Patent: May 30, 2017

(54) INTERACTIVE DIGITAL DISPLAYS

(71) Applicant: Microsoft Corporation, Redmond, WA (US)

(72) Inventors: Bongshin Lee, Issaquah, WA (US); Greg Smith, Bellevue, WA (US); Amir Netz, Bellevue, WA (US); Matthew J. Longley, Enumclaw, WA (US); Allison Tran, Seattle, WA (US); Cristian Petculescu, Seattle, WA (US); Shahar Prish, Herzelia (IL); Diego Oppenheimer, Seattle, WA (US); Adam Wilson, Seattle, WA (US); Patrick Baumgartner, Kirkland, WA (US); Pedram Faghihi Rezaei, Seattle, WA (US); Amy Forstrom, Seattle, WA (US); Eran Megiddo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/302,249

(22) Filed: Jun. 11, 2014

(65) Prior Publication Data

US 2015/0015504 A1 Jan. 15, 2015

Related U.S. Application Data

(60) Provisional application No. 61/845,902, filed on Jul. 12, 2013.

(51) Int. Cl.
*G06F 3/0484* (2013.01)
*G06F 3/041* (2006.01)
(Continued)

(52) U.S. Cl.
CPC .......... *G06F 3/04845* (2013.01); *G06F 3/017* (2013.01); *G06F 3/0412* (2013.01);
(Continued)

(58) Field of Classification Search
CPC .... G06F 3/017; G06F 3/04845; G06F 3/0486; G06F 3/0412; G06F 3/0488
(Continued)

(56) References Cited

U.S. PATENT DOCUMENTS 5,880,743 A 3/1999 Moran et al.
6,038,522 A 3/2000 Manson et al.
(Continued)

FOREIGN PATENT DOCUMENTS

CN 101662521 A 3/2010
EP 0865003 A2 9/1998

OTHER PUBLICATIONS

"International Search Report and Written Opinion," From PCT Application No. PCT/US2014/045448. Filed Jul. 3, 2014, Mailed Oct. 2, 2014.
(Continued)

*Primary Examiner* — Michael Pervan
(74) *Attorney, Agent, or Firm* — Rainier Patents, P.S.

(57) ABSTRACT

The description relates to an interactive digital display. One example includes a display device configured to receive user input and recognize commands relative to data visualizations. The system also includes a graphical user interface configured to be presented on the display device that allows users to interact with the data visualizations via the user commands.

20 Claims, 45 Drawing Sheets

(51) Int. Cl.
| | |
|---|---|
| *G06F 3/0488* | (2013.01) |
| *G06F 3/01* | (2006.01) |
| *G06F 3/0486* | (2013.01) |
| *G06T 11/20* | (2006.01) |

(52) U.S. Cl.
CPC .......... *G06F 3/0486* (2013.01); *G06F 3/0488* (2013.01); *G06T 11/206* (2013.01); *G06T 2200/24* (2013.01)

(58) Field of Classification Search
USPC ..... 178/18.01–19.07; 345/173–178; 715/863
See application file for complete search history.

(56) References Cited

U.S. PATENT DOCUMENTS

| | | | |
|---|---|---|---|
| 6,459,442 | B1 | 10/2002 | Edwards et al. |
| 6,952,803 | B1 | 10/2005 | Bloomberg et al. |
| 7,096,454 | B2 | 8/2006 | Damm et al. |
| 7,158,138 | B1 | 1/2007 | Bronskill et al. |
| 7,515,752 | B2 | 4/2009 | Tremblay et al. |
| 7,788,606 | B2 | 8/2010 | Patel et al. |
| 8,082,274 | B2 | 12/2011 | Steinglass et al. |
| 8,290,888 | B1 | 10/2012 | Heidenreich et al. |
| 8,994,732 | B2 | 3/2015 | Lee et al. |
| 2002/0033825 | A1 | 3/2002 | Satake et al. |
| 2003/0154443 | A1 | 8/2003 | Papierniak |
| 2004/0060037 | A1 | 3/2004 | Damm et al. |
| 2005/0248560 | A1 | 11/2005 | Agrawala et al. |
| 2006/0045343 | A1 | 3/2006 | Tremblay et al. |
| 2008/0109740 | A1 | 5/2008 | Prinsen et al. |
| 2008/0192056 | A1 | 8/2008 | Robertson et al. |
| 2008/0231926 | A1* | 9/2008 | Klug .................. H04N 13/0425 359/23 |
| 2008/0301571 | A1 | 12/2008 | Herzog |
| 2009/0278848 | A1 | 11/2009 | Robertson et al. |
| 2010/0031203 | A1* | 2/2010 | Morris ................ G06F 3/04883 715/863 |
| 2010/0050133 | A1* | 2/2010 | Nishihara ............. G06F 3/0425 715/863 |
| 2010/0058201 | A1 | 3/2010 | Harvey et al. |
| 2010/0325564 | A1 | 12/2010 | Mital et al. |
| 2011/0175916 | A1 | 7/2011 | Noris et al. |
| 2011/0181774 | A1 | 7/2011 | Masuda |
| 2011/0214044 | A1 | 9/2011 | Davis et al. |
| 2011/0249024 | A1 | 10/2011 | Arrasvuori et al. |
| 2012/0011465 | A1 | 1/2012 | Rezende |
| 2012/0229468 | A1 | 9/2012 | Lee et al. |
| 2012/0229470 | A1 | 9/2012 | Nagai |
| 2012/0330853 | A1 | 12/2012 | Forbes et al. |
| 2013/0047093 | A1 | 2/2013 | Reuschel et al. |
| 2013/0222385 | A1 | 8/2013 | Dorsey et al. |
| 2014/0053091 | A1 | 2/2014 | Hou et al. |
| 2014/0201682 | A1 | 7/2014 | Lee et al. |

OTHER PUBLICATIONS

"Article 34 Demand and Response," From PCT Application No. PCT/US2014/045448, Filed: Jan. 8, 2015.
Walny, et al., "Understanding Pen and Touch Interaction for Data Exploration on Interactive Whiteboards", In IEEE Transactions on Visualization and Computer Graphics, vol. 18, Issue 12, Dec. 2012, 10 pages.
Browne, et al., "Data Analysis on Interactive Whiteboards through Sketch-based Interaction", In Proceedings of the ACM International Conference on Interactive Tabletops and Surfaces, Nov. 13, 2011, 4 pages.
Frisch, et al., "Investigating Multi-Touch and Pen Gestures for Diagram Editing on Interactive Surfaces", In Proceedings of the ACM International Conference on Interactive Tabletops and Surfaces, Nov. 23, 2009, 8 pages.
Brandl, et al., "Combining and Measuring the Benefits of Bimanual Pen and Direct-Touch Interaction on Horizontal Interfaces", In Proceedings of the Working Conference on Advanced Visual Interfaces, May 28, 2008, 8 pages.
Walker, Maximilian, "Information Visualization beyond Mouse and Keyboard", In the Technical Report, LMU MI-2013-1, Apr. 2013, pp. 55-63.
Walny, et al., "Towards Supporting Interactive Sketch-based Visualizations", In the Draft Submitted to Thinking through Drawing Workshop, Aug. 2012, 12 pages.
U.S. Appl. No. 13/784,848, Lee, et al., "Engaging Presentation through Freeform Sketching", filed Mar. 5, 2013.
Landay, J.A. and Myers, B.A., "Interactive Sketching for the Early Stages of User Interface Design", retrieved at <<http://citeseerx.ist.psu.edu/viewdoc/download?doi=10.1.1.30.8570&rep=rep1&type=pdf>>, Proceedings of the SIGCHI Conference on Human Factors in Computing Systems, May 1, 1995, pp. 43-50, 8 pages.
Laviola Jr., J.J. and Zeleznik, R.C., "MathPad2: A System for the Creation and Exploration of Mathematical Sketches", retrieved at <<http://www.cs.uml.edu/~holly/teaching/91550/spring2011/LaViola-Jr-2004.pdf>>, ACM SIGGRAPH, Aug. 5, 2007, pp. 432-440, 9 pages.
Li et al., "SketchComm: A Tool to Support Rich and Flexible Asynchronous Communication of Early Design Ideas", retrieved at <<http://research.microsoft.com/en-us/people/xiangc/cscw2012_sketchcomm.pdf>>, Proceedings of the ACM Conference on Computer Supported Cooperative Work, Feb. 11-15, 2012, Seattle, WA, pp. 359-368, 10 pages.
Lin et al., "DENIM: An Informal Tool for Early Stage Web Site Design", retrieved at <<http://citeseerx.ist.psu.edu/viewdoc/download?doi=10.1.1.17.7475&rep=rep1&type=pdf>>, CHI'01 Extended Abstracts of Human Factors in Computing Systems, Mar. 31, 2001, pp. 205-206, 2 pages.
Wang Baldonado et al., "Guidelines for Using Multiple Views in Information Visualization", retrieved at <<http://www.cs.ubc.ca/~tmm/courses/cpsc533c-04-spr/morereadings/baldonado.pdf>>, Proceedings of the Working Conference on Advanced Visual Interfaces, May 1, 2000, pp. 110-119, 10 pages.
"Perceptive Pixel", retrieved at <<http://www.perceptivepixel.com/>>, on Mar. 4, 2013, 1 page.
Barringer, Matt, "Powering the Earth", retrieved at <<http://edition.cnn.com/SPECIALS/2009/environment/energy/>>, on Dec. 19, 2012, 2 pages.
"RSAanimate: Ideas and Actions for 21st Century Enlightment", Nov. 29, 2012, retrieved at <<http://www.thersa.org/>>, on Dec. 11, 2015, 2 pages.
Ryall, et al., "QueryLines: Approximate Query for Visual Browsing", retrieved at <<http://www.merl.com/papers/docs/TR2005-015.pdf>>, CHI'05 Extended Abstracts of the Conference on Human Factors in Computing Systems, Apr. 2, 2005, pp. 1765-1768, 6 pages.
Segel, E. and Heer, J., "Narrative Visualization: Telling Stories with Data", retrieved at <<http://vis.stanford.edu/files/2010-Narrative-InfoVis.pdf>>, IEEE Transactions on Visualization and Computer Graphics, vol. 16, Issue 6, Nov. 2010, pp. 1139-1148, 10 pages.
Sutherland, Ivan E., "Sketchpad: A Man-Machine Graphical Communication System", retrieved at <<http://dcom.arch.gatech.edu/class/COA8672/Readings/history/Sketchpad-sutherland.pdf>>, AFIPS Spring Joint Computer conference, May 21, 1963, pp. 329-346, 18 pages.
"Tableau Public", retrieved at <<http://tableausoftware.com/public>>, on Dec. 20, 2012, 1 page.
Tohidi, et al., "Getting the Right Design and the Design Right: Testing Many Is Better Than One", retrieved at <<http://research.microsoft.com/en-us/um/people/asellen/publications/p1243-tohidi.pdf>>, Proceedings of the SIGCHI Conference on Human Factors in Computing Systems, Apr. 22, 2006, pp. 1243-1252, 10 pages.
Viegas, et al., "Digital Artifacts for Remembering and Storytelling: PostHistory and Social Network Fragments", retrieved at <<http://ieeexplore.ieee.org/stamp/stamp.jsp?tp=&arnumber=1265287>>, Proceedings of the 37th Annual Hawaii International Conference on System Sciences, Jan. 5, 2004, pp. 1-10, 10 pages.
Viegas, et aL., "ManyEyes: A Site for Visualization at Internet Scale", retrieved at <<http://ieeexplore.ieee.org/stamp/stamp.

(56) References Cited

OTHER PUBLICATIONS jsp?tp=&amumber=4376131>>, IEEE Transactions on Visualization and Computer Graphics, vol. 13, Issue 6, Nov. 2007, pp. 1121-1128, 10 pages.
Wattenberg, Martin, "Sketching a Graph to Query a Time-Series Database", retrieved at <<http://citeseerx.ist.psu.edu/viewdoc/download?doi=10.1.1.87.6854&rep=rep1&type=pdf>>, CHI'01 Extended Abstracts on Human Factors in Computing Systems, Mar. 31, 2001, pp. 381-382, 2 pages.
Williamson, C and Shneiderman, B., "The Dynamic HomeFinder: Evaluating Dynamic Queries in a Real-Estate Information Exploration System", retrieved at <<http://www.cs.umd.edu/~ben/papers/Williamson1992dynamic.pdf>>, Proceedings of the 15th Annual International ACM SIGIR Conference on Research and Development in Information Retrieval, Jun. 1, 1992, pp. 338-346, 9 pages.
Wojtkowski, W and Wojtkowski, WG, "Storytelling: Its Role in Information Visualization", retrieved at <<http://citeseerx.ist.psu.edu/viewdoc/download?doi=10.1.1.99.4771&rep=rep1&type=pdf>>, European Systems Science Congress, Oct. 2002, pp. 1-5, 5 pages.
Sullivan, et al., "Social-technical Tools for Collaborative Sensemaking and Sketching", retrieved at <<http://citeseerx.ist.psu.edu/viewdoc/download?doi=10.1.1.180.1373&rep=rep1&type=pdf>>, Human-Computer Interaction, Jan. 1, 2009, pp. 614-623, 10 pages.
Igarashi, Takeo, "Freeform User Interfaces for Graphical Computing", retrieved at <<http://133.11.9.3/~takeo/papers/dissertation.pdf>>, A doctoral dissertation submitted to Graduate School of Information Engineering at the University of Tokyo, Dec. 1999, 157 Pages.
Non-Final Office Action mailed Mar. 22, 2013 from U.S. Appl. No. 13/042,415, 21 pages.
Notice of Allowance mailed Nov. 4, 2014 from U.S. Appl. No. 13/042,415, 5 pages.
Response filed Oct. 15, 2014 to Final Office Action mailed Jul. 15, 2014 from U.S. Appl. No. 13/042,415, 11 pages.
Final Office Action mailed Jul. 15, 2014 from U.S. Appl. No. 13/042,415, 17 pages.
Response filed May 19, 2014 to Non-Final Office Action mailed Feb. 19, 2014 from U.S. Appl. No. 13/042,415, 13 pages.
Non-Final Office Action mailed Feb. 19, 2014 from U.S. Appl. No. 13/042,415, 22 pages.
Response filed Nov. 22, 2013 to Final Office Action mailed Aug. 27, 2013 from U.S. Appl. No. 13/042,415, 15 pages.
Final Office Action mailed Aug. 27, 2013 from U.S. Appl. No. 13/042,415, 21 pages.
Response filed Jun. 17, 2013 to Non-Final Office Action mailed Mar. 22, 2013 from U.S. Appl. No. 13/042,415, 12 pages.
Ringel Morris et al., "Cooperative Gestures: Multi-User Gestural Interactions for Co-located Groupware," Proceedings of the SIGCHI Conference on Human Factors in Computing Systems, Jan. 1, 2006, pp. 1201-1210, 10 pages.
Final Office Action mailed Jun. 5, 2015 from U.S. Appl. No. 13/784,848, 25 pages.
Response filed Feb. 18, 2015 to Non-Final Office Action mailed Nov. 20, 2014 from U.S. Appl. No. 13/784,848, 20 pages.
Non-Final Office Action mailed Nov. 20, 2014 from U.S. Appl. No. 13/784,848, 24 pages.
U.S. Appl. No. 61/752,928, filed Jan. 15, 2013, entitled "Engaging Presentation Through Freeform Sketching," 43 pages.
International Search Report mailed Jan. 15, 2015 from PCT Patent Application No. PCT/US2014/045448, 3 pages.
Written Opinion mailed Jan. 15, 2015 from PCT Patent Application No. PCT/US2014/045448, 6 pages.
International Preliminary Report on Patentability mailed Sep. 29, 2015 from PCT Patent Application No. PCT/US2014/045448, 16 pages.
International Search Report and Written Opinion mailed Apr. 9, 2014 from PCT Patent Application No. PCT/US2014/011369, 10 pages.
Response and Demand filed Jul. 17, 2014 to the International Search Report and Written Opinion mailed Apr. 9, 2014 from PCT Patent Application No. PCT/US2014/011369, 10 pages.
Second Written Opinion mailed Jan. 20, 2015 from PCT Patent Application No. PCT/US2014/011369, 12 pages.
International Preliminary Report on Patentability mailed May 4, 2015 from PCT Patent Application No. PCT/US2014/011369, 13 pages.
Communication pursuant to Rules 161(1) and 162 EPC mailed Sep. 15, 2015 from European Patent Application No. 14704417.6, 2 pages.
Response filed Oct. 20, 2015 to Communication mailed Sep. 15, 2015 from European Patent Application No. 14704417.6, 21 pages.
Browne et al., "iSketchVis: Intgrating Sketch-based Interaction with Computer Supported Data Analysis," GSWC 2011, Proceedings of the Sixth Annual Graduate Student Workshop on Computing, Oct. 7, 2011, University of California, Santa Barbara, retrieved at <<gswc.cs.ucsb.edu/2011/proceedings.pdf>> on Nov. 19, 2015, pp. 25-26, 2 pages.
Lee et al., "Sketchstory: Telling More Engaging Stories with Data through Freeform Sketching," Microsoft Research, IEEE Transactions on Visualization and Computer Graphics, 19(12): 2416-25, Dec. 2013, 10 pages.
Kin et al., "Eden: A Professional Multitouch Tool for Constructing Virtual Organic Environments," Proceedings of the SIGCHI Conference on Human Factors in Computing Systems, May 7, 2011, pp. 1343-1352, 10 pages.
Wobbrock et al., "User-Defined Gestures for Surface Computing," Proceedings of the SIGCHI Conference on Human Factors in Computing Systems, Apr. 4, 2009, pp. 1083-1092, 10 pages.
The World Bank, retrieved at <<http://data.worldbank.org>>, on Jan. 13, 2013, 2 pages.
Dean, Brian C., "Beyond Screen Capture: Creating Effective Multimedia Whiteboard Lectures on a Tablet PC," Proceedings Annual Workshop on the Impact of Pen Technology in Education (WIPTE), 2006, 5 pages.
Few, Stephen, "The Chartjunk Debate: A Close Examination of Recent Findings," Visual Business Intelligent Newsletter, retrieved at <<http://www.perceptualedge.com/articles/visual_business_intelligence/the_chartjunk_debate.pdf>>, 2011, 11 pages.
Paul, Annie Murphy, "Your Brain on Fiction," The New York Times, Mar. 17, 2012, retrieved at <<http://www.nytimes.com/2012/03/18/opinion/sunday/the-neuroscience-of-your-brian-on-fiction.html>>, 4 pages.
"Our Approach: Key Engagement Attributes," retrieved at <<http://ideation816.com/About/OurApproach>>, on Jul. 10, 2013, 1 page.
PowerPoint Presentation and Slide Software—Office.com, retrieved at <<http://office.microsoft.com/en-us/powerpoint>>, on Jan. 13, 2013, 1 page.
"Top 7 IT Certifications, Info Graphics Mania," retrieved at <<http://infographicsmania.com/top-7-it-certifications>>, on Jul. 10, 2013, 6 pages.
"Women in the Boardroom [Infographic]—Infographic List," retrieved at <<http://infographiclist.com/2012/01/18/women-in-the-boardroom-infographic>>, on Jul. 10, 2013, 4 pages.
Wood et al., "Sketchy Rendering for Information Visualization," IEEE Transactions on Visualization and Computer Graphics, Dec. 2012, vol. 18, No. 12, pp. 2749-2758, 15 pages.
Response filed Dec. 3, 2015 to Final Office Action mailed Jun. 5, 2015 from U.S. Appl. No. 13/784,848, 21 pages.
Response filed Oct. 20, 2015 to the Official Communication dated Sep. 15, 2015 from European Patent Application No. 14704417.6, 21 pages.
"Data Analysis Software and Tools", retrieved at <<http://www.informationbuilders.com/data-analysis.html>>, on Oct. 19, 2010, 3 pages.
"Functions & Data Analysis Tools", retrieved at <<http://www.techdocs.ku.edu/docs/excel_2000_functions.pdf>>, 2003, 18 pages.
"Microsoft Excel 2010", retrieved at <<http://office.microsoft.com/en-us/excel>>, on Oct. 19, 2010, 2 pages.

(56) References Cited

OTHER PUBLICATIONS

Apitz, G. and Guimbretiere, F., "CrossY: A Crossing-Based Drawing Application", Proceedings of the 17th Annual ACM Symposium on User Interface Software and Technology, Oct. 24-27, 2004, pp. 3-12, 10 pages.

Gross, M.D. and Do, E.Y.L., "Ambiguous Intentions: A Paper-like Interface for Creative Design", retrieved at <<http://depts.washington.edu/dmgftp/publications/pdfs/uist96-mdg.pdf>>, Proceedings of the 9th Annual ACM Symposium on User Interface Software and Technology, Nov. 1, 1996, pp. 183-192, 11 pages.

Kara, L.B. and Stahovich, T.F., "SimUSketch: A Sketchbased Interface for Simulink", Proceedings of the Working Conference on Advanced Visual Interfaces, May 25-28, 2004, pp. 354-357, 4 pages.

Lai, C.Y. and Zakaria, N., "As Sketchy As Possible: Application Programming Interface (API) for Sketch-Based User Interface Understanding", 2010 International Symposium on Information Technology, 2010, vol. 1, pp. 1-6, 6 pages.

Wattenberg, Martin, "Sketching a Graph to Query a Time-Series Database", CHI '01 Extended Abstracts on Human Factors in Computing, Mar. 31, 2001, pp. 381-382, 2 pages.

Zeleznik, R. and Miller, T., "Fluid Inking: Augmenting the Medium of Free-Form Inking with Gestures", retrieved at <<http://pen.cs.brown.edu/fluid.pdf>>, Proceedings of Graphics Interface 2006, Jun. 7, 2006, pp. 155-162, 8 pages.

Mynatt, at al., "Flatland: New Dimensions in Office Whiteboards", Proceedings of the SIGCHI Conference on Human Factors in Computing Systems, May 1, 1999, pp. 346-353, 8 pages.

Olsen, et al., "A Taxonomy of Modeling Techniques using Sketch-Based Interfaces", Eurographics State of the Art Report 2008, 19 pages.

Pederson, et al., "Tivoli: An Electronic Whiteboard for Informal Workgroup Meetings," Proceedings of the INTERACT'93 and CHI'93 Conference on Human Factors in Computing Systems, 1993, pp. 391-398, 11 pages.

Sezgin, et al., "Sketch Based Interfaces: Early Processing for Sketch Understanding", retrieved at <<http://rationale.csail.mit.edu/publications/Sezgin2001Sketchbased.pdf>>, Master's Thesis, Massachusetts Institute of Technology, 2001, pp. 1-8, 8 pages.

Shneiderman, Ben, "Direct Manipulation: A Step beyond Programming Languages", ACM SIGSOC Bulletin, vol. 13, No. 2-3, Aug. 1983, 13 pages.

"Tableau", retrieved at <<http://www.tableau.com>>, on Oct. 19, 2010, 1 page.

Tenneson, Dana, "ChemPad: A Pedagogical Tool for Exploring Handwritten Organic Molecules", retrieved at <<http://graphics.cs.brown.edu/research/chempad/chempadpaper05.pdf>>, Technical Report, No. RI02912, Brown University, May 2005, 7 pages.

Halper et al., "Psychology and Non-Photorealistic Rendering: The Beginning of a Beautiful Relationship," Mensch & Computer 2003, pp. 277-286, 11 pages.

Hsu, Jeremy, "The Secrets of Storytelling," Scientific American Mind, vol. 19, No. 4, Aug. 2008, pp. 46-51, 6 pages.

Buxton, Bill, "Sketching User Experiences: Getting the Design Right and the Right Design," Morgan Kaufmann Publishers, 2010, 445 pages.

Cheema et al., "QuickDraw: Improving Drawing Experience for Geometric Diagrams," Proceedings of the SIGCHI conference on Human Factors in Computing Systems, May 5, 2012, pp. 1037-1046, 10 pages.

Bae et al., "ILoveSketch: As-Natural-As-Possible Sketching System for Creating 3D Curve Models", retrieved at <<http://citeseerX.ist.psu.edu/viewdoc/download;jsessionid=81463454828325BE03D56AA5FB781A72?doi=10.1.1.139.3049&rep=rep1&type=pdf>>, Proceedings of the 21st Annual ACM Symposium on User Interface Software and Technology, Oct. 19, 2008, pp. 151-160, 10 pages.

Bateman, et al., "Useful Junk? The Effects of Visual Embellishment on Comprehension and Memorability of Charts", retrieved at <<http://dmrussell.net/CHI2010/docs/p2573.pdf>>, Proceedings of the SIGCHI Conference on Human Factors in Computing Systems, Apr. 10, 2010, pp. 2573-2582, 10 pages.

Bott, J. and Laviola Jr, J., "A Pen-Based Tool for Visualizing Vector Mathematics", retrieved at <<http://www.eecs.ucf.edu/~jjl/pubs/vectorpad.pdf>>, Proceedings of the Seventh Sketch-Based Interfaces and Modeling Symposium, Jun. 7, 2010, 8 pages.

Chao, et al., "Poster: Rapid Pen-Centric Authoring of Improvisational Visualizations with NapkinVis", retrieved at <<http://www.cs.ubc.ca/~wochao/napkinvis/SummaryNapkinVis.pdf>>, Proceedings of IEEE Information Visualization Conference, Oct. 24, 2010, 2 pages.

"Data Visualization—Good Way to Present Data in Descriptive Way," retrieved on Oct. 18, 2010 at <<http://www.buzzle.com/articles/data-visualization-good-way-to-present-data-in-descriptive-way.html>>, 2 pages.

Davis, et al., "K-Sketch: A 'Kinetic' Sketch Pad for Novice Animators", Proceedings of the Twenty-sixth Annual SIGCHI Conference on Human Factors in Computing Systems, Apr. 5, 2008, 10 pages.

Eccles, et al., "Stories in GeoTime", IEEE Symposium on Visual Analytics Science and Technology, Oct. 30, 2007, pp. 19-26, 8 pages.

Gershon, N. and Page, W., "What Storytelling Can Do for Information Visualization", retrieved at <<http://cs.smith.edu/classwiki/images/c/c2/StorytellingForInformationVisualization.pdf>>, Proceedings of Communications of the ACM, vol. 44, Issue 8, Aug. 2001, pp. 31-37, 7 pages.

"Khan Academy", retrieved at <http://www.khanacademy.org/>>, on Dec. 19, 2012, 3 pages.

Hearst, Marti A., "Sketching Intelligent Systems", retrieved at <<http://citeseerx.ist.psu.edu/viewdoc/download?doi=10.1.1.42.853&rep=rep1&type=pdf>>, IEEE Intelligent Systems and their Applications, vol. 13, Issue 3, May 1998, pp. 10-19, 10 pages.

Heer, et al., "Graphical Histories for Visualization: Supporting Analysis, Communication, and Evaluation", retrieved at <<http://vis.berkeley.edu/papers/graphical_histories/2008-GraphicalHistories-InfoVis.pdf>>, Journal of IEEE Transactions on Visualization and Computer Graphics, vol. 14, Issue 6, 2008, 8 pages.

Heer, et al., "Voyager and Voyeurs: Supporting Asynchronous Collaborative Information Visualization", Proceedings of the SIGCHI Conference on Human Factors in Computing Systems, Apr. 28, 2007, 10 pages.

Hinckley, et al., "Pen+Touch=New Tools", Proceedings of the 23nd Annual ACM Symposium on User Interface Software and Technology, Oct. 3, 2010, pp. 27-36, 10 pages.

Igarashi, et al., "Teddy: A Sketching Interface for 3D Freeform Design", retrieved at <<http://www.cc.gatech.edu/~jarek/graphics/papers/07TeddyIgarashi.pdf>>, Proceedings of the 26th Annual Conference on Computer Graphics and Interactive Techniques, Aug. 1999, pp. 409-416, 8 pages.

Kazi, et al., "SandCanvas: A Multi-touch Art Medium Inspired by Sand Animation", retrieved at <<http://www.mysmu.edu/faculty/rcdavis/pubs/2011-CHI-SandCanvas.pdf>>, Proceedings of the SIGCHI Conference on Human Factors in Computing Systems, May 7, 2011, 10 pages.

Kazi, et al., "Vignette: Interactive Texture Design and Manipulation with Freeform Gestures for Pen-and-Ink Illustration", retrieved at <<http://sketchvignette.files.wordpress.com/2012/01/vignettechi2012.pdf>>, Proceedings of the SIGCHI Conference on Human Factors in Computing Systems, May 7, 2011, 10 pages.

Keim, Daniel A., "Information Visualization and Visual Data Mining", retrieved at <<http://nm.merz-akademie.de/~jasmin.sipahi/drittes/images/Keim2002.pdf>>, IEEE Transactions on Visualization and Computer Graphics, vol. 7, Issue 1, Jan. 2002, pp. 100-107, 8 pages.

Schumann et al., "Assessing the Effect of Non-Photorealistic Rendered Images in CAD," Proceedings of the SIGCHI Conference on Human Factors in Computing Systems, Apr. 13-18, 1996, pp. 35-41, 7 pages.

Roam, Dan, "The Back of the Napkin (Expanded Edition): Solving Problems and Selling Ideas with Pictures," Penguin Group, Inc., 2008, 286 pages.

(56) References Cited

OTHER PUBLICATIONS

Strothotte, et al., "Non-Photorealistic Computer Graphics: Modeling, Rendering, and Animation," The Morgan Kaufmann Series in Computer Graphics, Apr. 26, 2002, 496 pages.
Written Opinion mailed Jul. 1, 2015 from PCT Patent Application No. PCT/US2014/045448, 7 pages.
Communication pursuant to Rules 161(1) and 162 EPC mailed Feb. 19, 2016 from European Patent Application No. 14745279.1, 2 pages.
Response filed Mar. 17, 2016 to the Communication pursuant to Rules 161(1) and 162 EPC mailed Feb. 19, 2016 from European Patent Application No. 14745279.1, 9 pages.
First Office Action mailed Feb. 4, 2016 from China Patent Application No. 201210057445.4, 13 pages.
Voluntary Amendment filed Mar. 9, 2016 from China Patent Application No. 201480004937.4, 13 pages.
Non-Final Office Action mailed Jan. 12, 2016 from U.S. Appl. No. 13/784,848, 28 pages.
Response filed Jun. 17, 2016 to the Non-Final Office Action mailed Jan. 12, 2016 from U.S. Appl. No. 13/784,848, 21 pages.
Response filed Jun. 17, 2016 to the First Office Action mailed Feb. 4, 2016 from China Patent Application No. 201210057445.4, 11 pages.
Second Office Action mailed Aug. 3, 2016 from China Patent Application No. 2012100574454, 7 pages.
Final Office Action mailed Aug. 11, 2016 from U.S. Appl. No. 13/784,848, 31 pages.
Notice on Grant mailed Dec. 26, 2016 from China Patent Application No. 201210057445.4, 4 pages.
Response filed Jan. 11, 2017 to the Final Office Action mailed Aug. 11, 2016 from U.S. Appl. No. 13/784,848, 19 pages.
Office Action and Search Report mailed Feb. 18, 2017 from Taiwanese Patent Application No. 103101469, 10 pages.

\* cited by examiner

INTERACTIVE DIGITAL DISPLAYS

BACKGROUND

It is common for people to work on whiteboards, where they can collaborate with others, brainstorm lists of important questions, and sketch simple charts. However, if the topic of discussion involves large amounts of data, it is soon necessary to make use of computational power available in some tools (e.g., a spreadsheet). Using pen, touch, or a combination of pen and touch on a digital displays has great potential to lead to new and more natural interactions with data, which were not possible with the traditional whiteboard or with the typical desktop environment with mouse and keyboard. The present concepts offer a novel approach to interaction with data visualizations for data combination, data analysis, data communication, and/or brainstorm ideas on digital displays. This approach could be applied to various forms of interactive digital displays, such as pen- and/or touch-enabled tablets, notebooks, digital whiteboards, etc.

SUMMARY

The description relates to an interactive digital display. One example includes a display device configured to receive input from a user relative to data visualizations and automatically generate a new way of viewing the data. The system also includes a graphical user interface configured to be presented on the display device that allows a user to interact with the graphical user interface via user commands.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. In some cases parentheticals are utilized after a reference number to distinguish like elements. Use of the reference number without the associated parenthetical is generic to the element. Further, the left-most numeral of each reference number conveys the FIG. and associated discussion where the reference number is first introduced.

DETAILED DESCRIPTION

Overview

Figure 1:
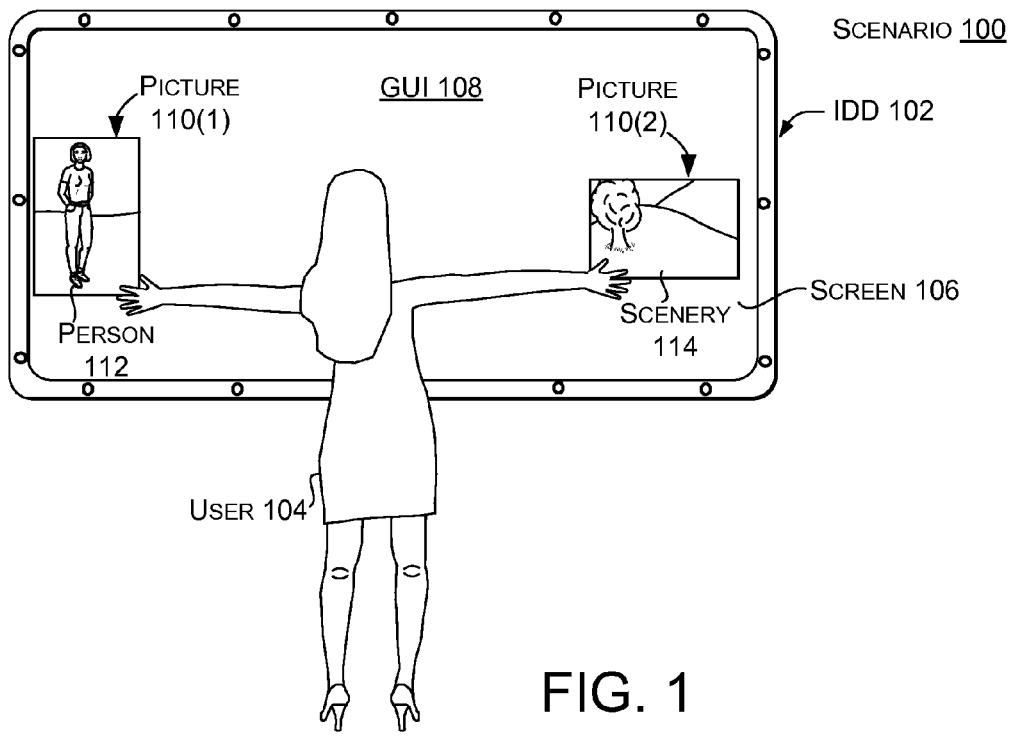
FIGS. 1-4 collectively show an example interactive experience scenario in accordance with some implementations of the present concepts.

The description relates to interaction with data visualizations on digital displays, such as digital whiteboards. People can use typical conference room whiteboards to casually sketch ideas and/or simple charts. The casual sketching approach of whiteboards can be combined with the computational power of a computer to provide computer-aided manipulation and analysis of data visualizations. The interaction with the data visualizations can be provided by a digital display, among other devices. As such, these devices can be thought of as interactive digital displays. Any device can potentially function as an interactive digital display, but the concepts are more readily applied to devices that are enabled for a range of input modalities, such as devices that are pen- and/or multi-touch-enabled.

For the purpose of this discussion, "interactive digital display" can include screens with pen- and multi-touch-enabled input modalities. In other implementations, an interactive digital display can include a device enabled with a variety of single or multiple input modalities, such as pen, touch, multi-touch, gesture, vision, and/or speech. The device can alternatively or additionally include auto-complete functionality. The interactive digital display can be enabled to recognize and receive input from a single or multiple users simultaneously.

The interactive digital display can show multiple data visualizations concurrently. These multiple data visualizations can be combined with simple gestures, yielding new data visualizations that represent new combinations of the data (e.g., user data). The new data visualizations can retain a fully functional connection to the underlying data, so that the underlying data can be accessed or edited. The new data visualizations can also be further manipulated into additional data visualizations.

One interactive digital display example can be similar in size to a traditional whiteboard that might be mounted in a conference room, such that an adult can reach all areas of the interactive digital display to interact directly with the surface. However, in other implementations the interactive digital display can be larger or smaller, such as a tablet or smart phone type device. In other implementations, a presenter may use a multi-touch enabled device connected to a projection system, such that the presenter is able to manipulate data on the multi-touch enabled device while others observe the projected data visualizations on another screen. For example, data visualizations being manipulated by a presenter in a large presentation hall can be projected onto a screen that is large enough that a standing adult would not be able to reach all areas of the screen to interact directly with the physical screen. In another example, several co-workers sitting around a table in a conference room can be viewing data visualizations on an interactive digital display mounted on a wall. Individual workers can contribute to the data visualizations via individual tablets or other form factors from their seats.

In some implementations, interactive digital displays can minimize cost (e.g., time) to manipulate data on the interactive digital display. For instance, the interactive digital display can aid the user to create new spreadsheets and/or charts by reducing steps to select data and configure charts. The freeform nature of the interactive digital display can enable a user or a group of users to quickly sketch data manipulations, to try different options, discover correlations and outliers, and/or to filter and summarize data.

Scenario Examples

FIGS. 1-4 collectively illustrate an exemplary manifestation of an interactive experience scenario 100 that includes an interactive digital display (IDD) 102. In this example, as shown in FIG. 1, a user 104 stands in front of the interactive digital display 102. In this case, the interactive digital display includes a screen 106 (e.g., interactive surface). A graphical user interface (GUI) 108 (e.g., display area, canvas) can be presented on the screen 106. In one implementation, the GUI 108 can facilitate combining two groups of data. In this case, two data visualizations can be presented via the GUI. In this example, the data visualizations can include a first picture 110(1) and a second picture 110(2). Here the first picture is generally a photograph of a person 112, while the second picture is generally a photograph of scenery 114.

Figure 2:
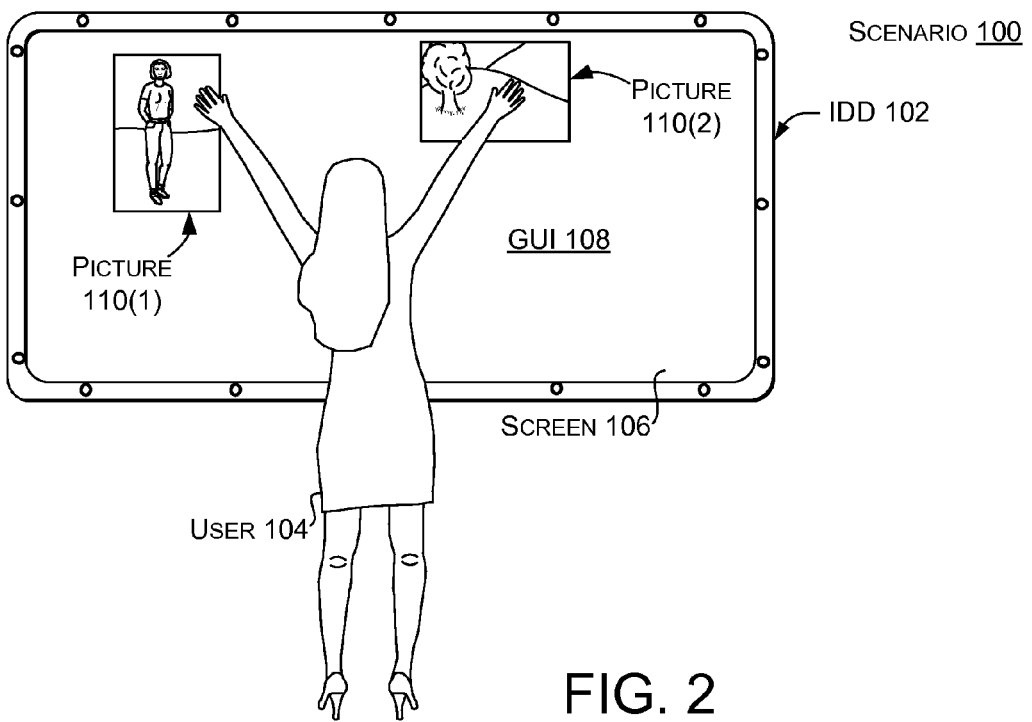
Figure 3:
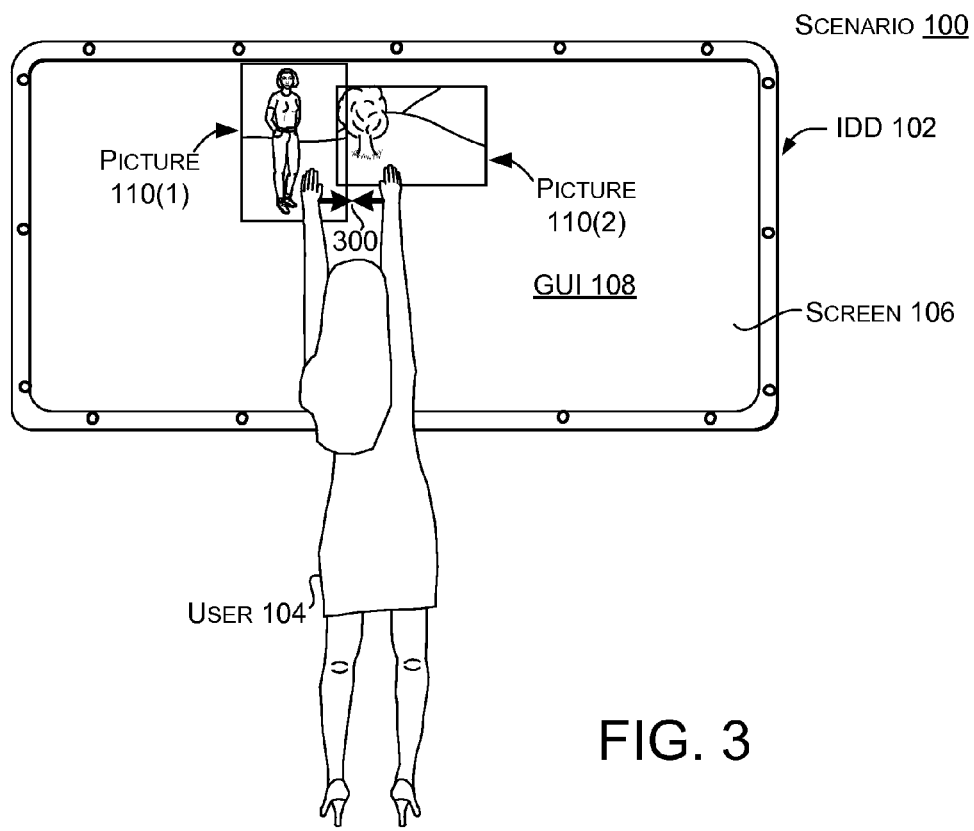

As shown in FIG. 1, the user 104 is touching the surface of the screen 106 of the interactive digital display 102 near the first picture 110(1) and the second picture 110(2) with her respective left and right index fingers. As illustrated in FIG. 2, the user 104 can move her index fingers across the screen 106, dragging the first picture and the second picture closer together. As shown in FIG. 3, the user can bring the first picture and the second picture next to each other. In this example, the interactive digital display 102 can show the first picture and the second picture so that they appear to overlap each other on the GUI 108. In some implementations, the first picture and the second picture may appear translucent when overlapped, so that one picture is not hidden behind the other picture. Due to the constraints of the drawing page, in FIGS. 2 and 3 the user is depicted as bringing the first picture and the second picture together with an overhead motion that keeps the pictures from being occluded by the user's body in the illustration. Note that the pictures may be brought together at eye level of the user, or some other orientation relative to the user.

In one implementation, the interactive digital display 102 can recognize actions of the user 104 as specific gestures (e.g., user input gestures, two-handed user gestures). In this case, the movement by the user of both the first picture 110(1) and the second picture 110(2) at the same time, bringing them next to each other, can be recognized as a "bump" gesture at 300. The interactive digital display can interpret the bump gesture 300 as the user wishing to combine the first picture and the second picture. Other forms of user input are contemplated to indicate a wish to combine two data visualizations. For example, other touch gestures, body gestures, visual cues, or spoken commands can be used with the interactive digital display. In one such non-touch implementation, the user could perform a similar gesture without actually touching the interactive digital display (e.g., the user could point at the left picture with her left hand and the right picture with her right hand and make a motion of bringing her two hands together in a bumping action). The interactive digital display could interpret this gesture in a similar manner to the touch gesture described above.

Figure 4:
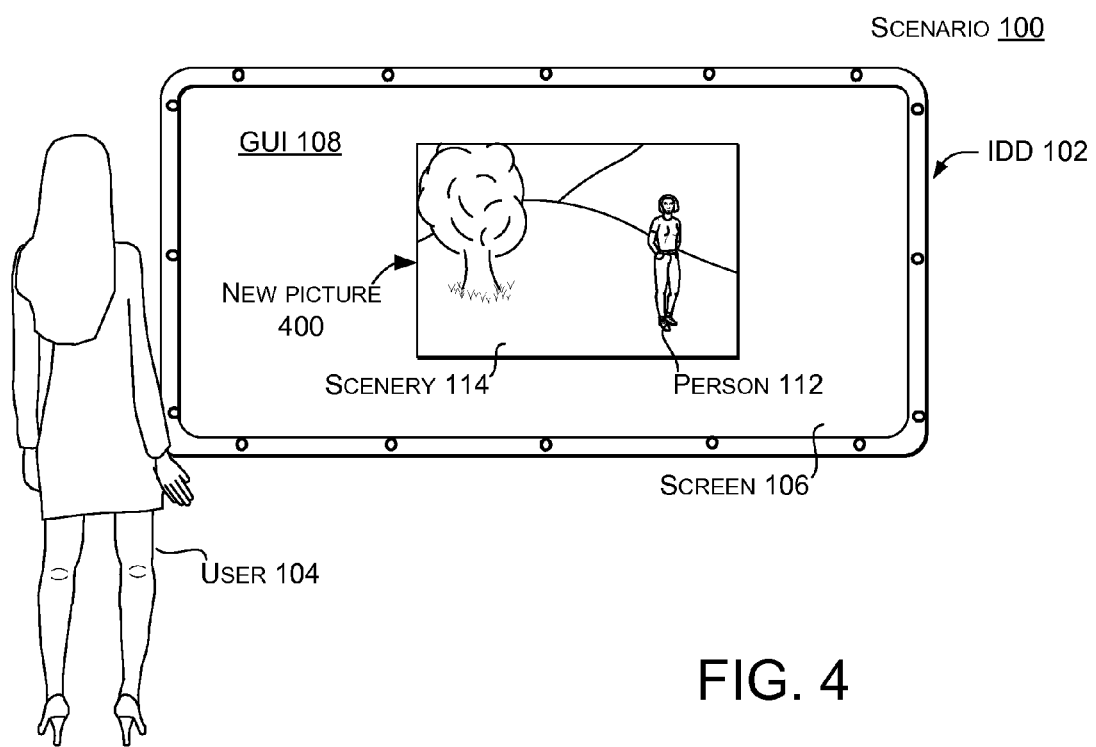

In the example shown in FIG. 4, the interactive digital display 102 can automatically respond to the bump gesture 300 of FIG. 3 by combining the first picture 110(1) and the second picture 110(2) into a third data visualization, e.g., a new picture 400. The interactive digital display 102 can show the new picture 400 on the GUI 108. The new picture can contain data from the first picture 110(1) and the second picture 110(2) (as seen in FIGS. 1-3). For example, the new picture 400 shows person 112 from the first picture and also shows scenery 114 from the second picture. In this case, the interactive digital display has automatically sized person 112 so that the person appears appropriately scaled within scenery 114.

To summarize, some implementations can include an interactive digital display that recognizes user input relative to data visualizations. Through recognition or interpretation of the user input, the interactive digital display can allow the user to indicate that she wants to combine data. The interactive digital display can determine whether or not the combination is possible and how to achieve the combination (this aspect is discussed below relative to FIGS. 15-16), and the interactive digital display can present the combined data. Stated another way, in response to a simple gesture by the user, the interactive digital display can automatically process the data and generate and display new ways of viewing the processed data.

FIGS. 5-8 collectively illustrate another example of the present concepts. As shown in this example in FIG. 5, interactive experience scenario 500 includes an interactive digital display (IDD) 502. A user 504 stands before the interactive digital display 502 which is manifest as a digital whiteboard. The interactive digital display can include a screen 506. Graphical user interface (GUI) 508 can be presented on the screen 506. In one implementation, the GUI 508 can include two data visualizations, manifest as graphs 510. In this case, first graph 510(1) is manifest as a horizontal bar chart 512, while second graph 510(2) is manifest as a vertical bar chart 514.

Figure 5:
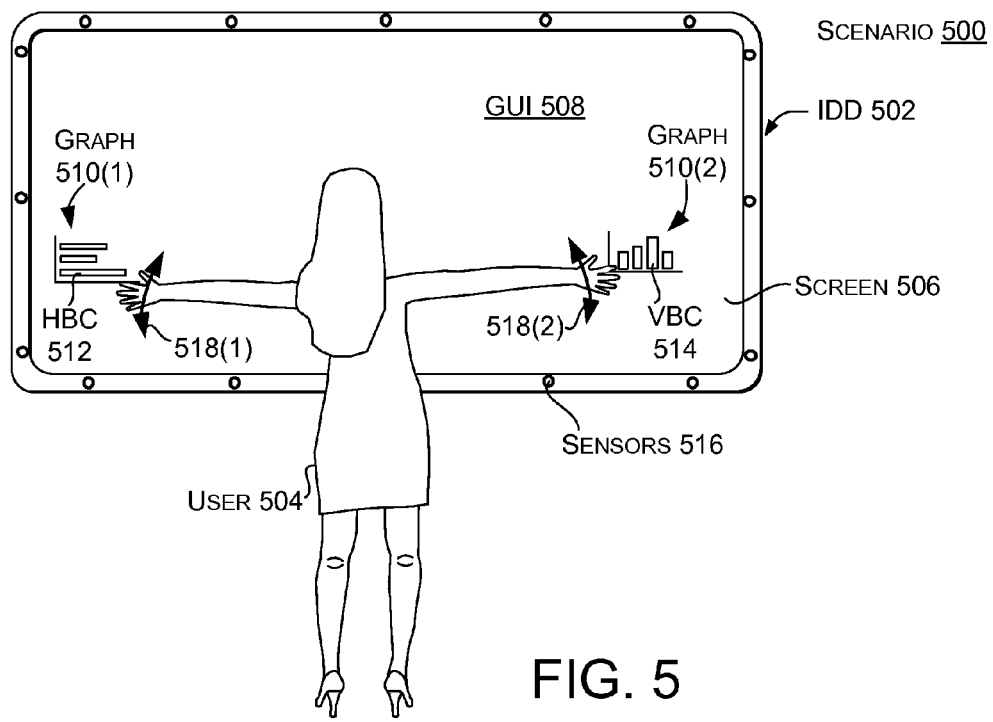
FIGS. 5-8 collectively show another example interactive experience scenario in accordance with some implementations of the present concepts.

As shown in FIG. 5, in some implementations, the interactive digital display 502 may have one or more sensors 516. In this example, the sensors 516 include multiple cameras for capturing a region in front of the interactive digital display. In some cases, the sensors can be manifest as 3-D cameras, such as are employed by Microsoft® Kinect® brand 3-D sensors. The sensors can capture movement by the user 504 which can be interpreted as user input by the interactive digital display. Other types of sensors and methods of detecting user input are contemplated.

User 504 can perform gestures relative to the GUI 508, as illustrated collectively in FIGS. 5-8. In this case, the user 504 starts with hands apart (FIG. 5), a few feet back from the interactive digital display 502 and not touching the screen 506. In some implementations, a motion can be performed by the user to select objects displayed in the GUI. For example, the user can hover her hands near the graphs 510 as indicated at 518. In some cases, the GUI can provide feedback to the user regarding the position of her hands relative to objects displayed on the GUI to help guide motions of the user (e.g., highlight objects under the user's hands to show them as selected (not shown)).

Figure 6:
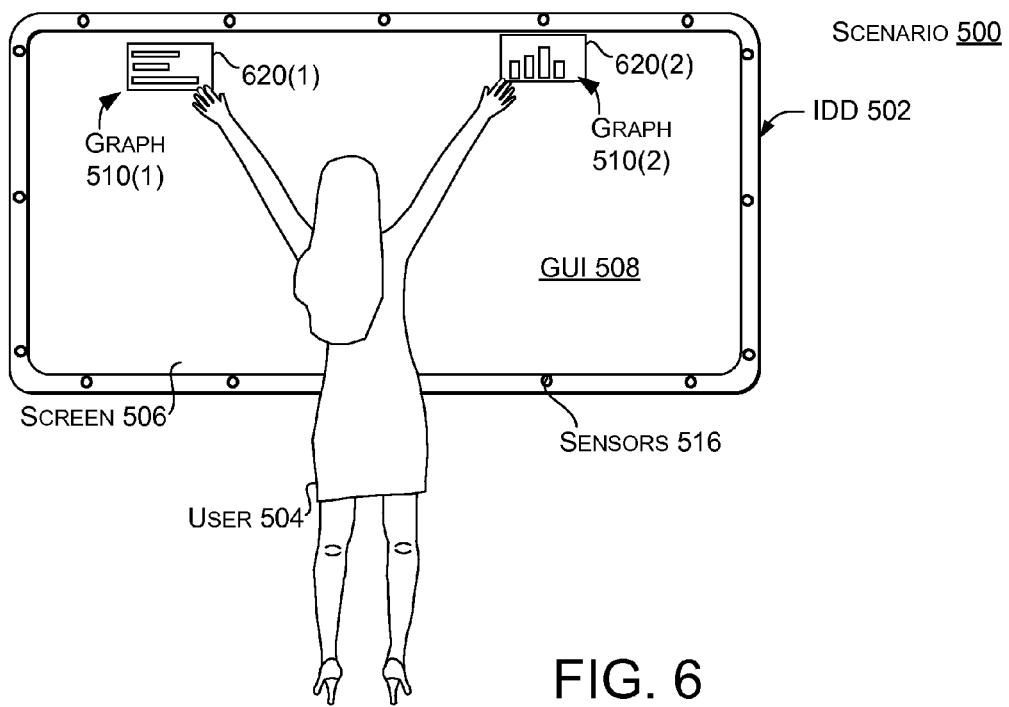

As shown in FIG. 6, the interactive digital display 502 can show the graphs 510 as having been selected based on the hovering motion 518 (FIG. 5) as determined by the sensors 516. The interactive digital display can highlight 620 or otherwise indicate the objects as selected in the GUI 508. In some cases, the interactive digital display can indicate objects as having been selected by making the objects appear translucent on the GUI 508 (not shown). Other ways to indicate on the GUI that objects are selected are contemplated. Once the graphs 510 are selected, the user 504 can then move the selected graphs 510 by moving her arms toward each other. The user can accomplish this movement through the work of the sensors 516, such that the user does not touch the surface of the screen 506 of the interactive digital display 502. In this manner, as shown in FIG. 7, the user can bring first graph 510(1) and second graph 510(2) together.

Figure 7:
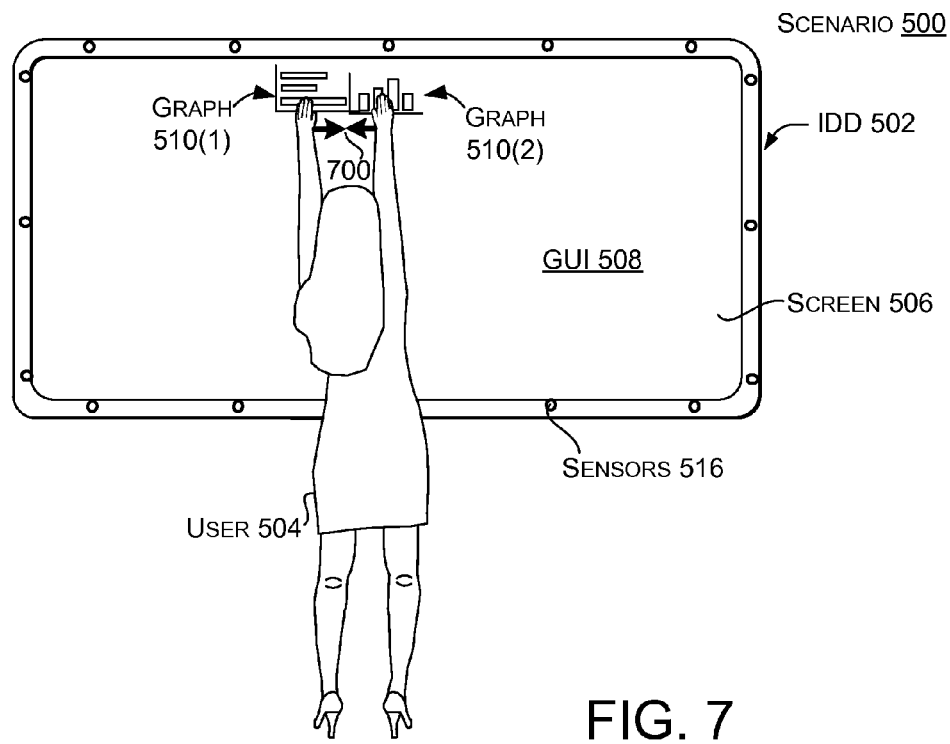

Continuing with this example, as shown in FIG. 7, the user 504 can make a motion of "bumping" the first graph 510(1) and the second graph 510(2) together. The bumping motion can be performed by the user by moving her hands so that the graphs 510 on the GUI 508 appear to move together and come in contact with each other. The bumping motion can include a certain velocity of movement. This movement can be recognized by the interactive digital display 502 as a "bump" gesture at 700. The interactive digital display can interpret the bump gesture at 700 as the user wishing to combine the first graph and the second graph.

Figure 8:
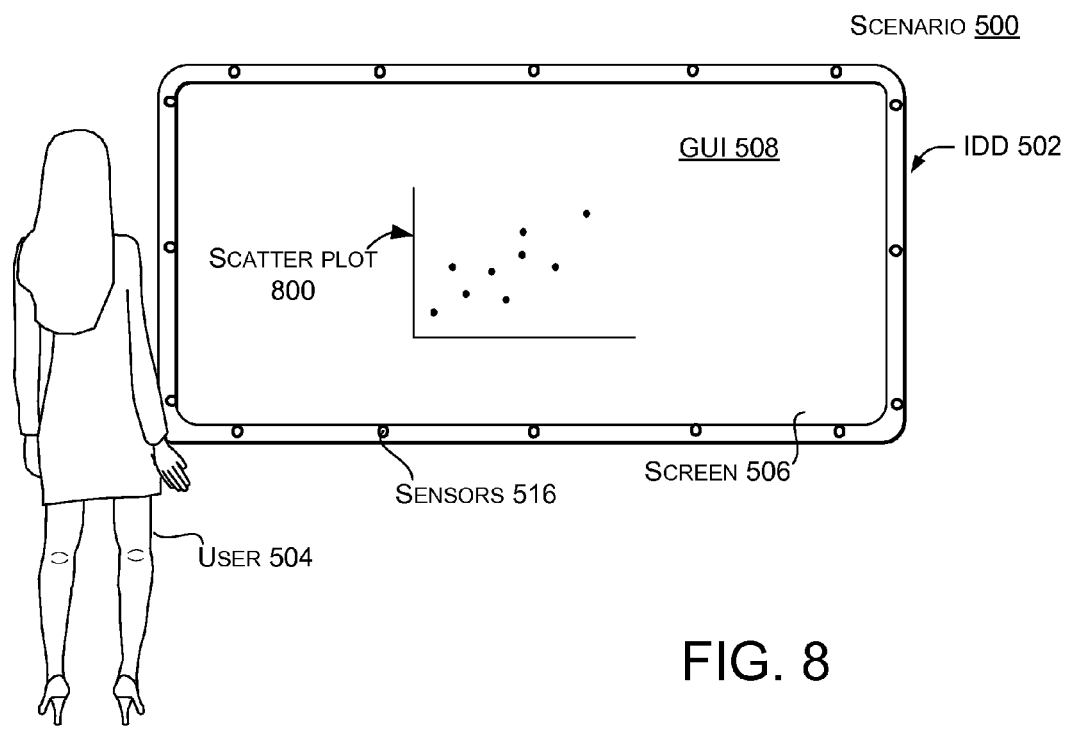

In the example shown in FIG. 8, the interactive digital display 502 can automatically respond to the bump gesture at 700 of FIG. 7 by combining the first graph 510(1) and the second graph 510(2) into a third data visualization, e.g., a scatter plot 800. The scatter plot can be a visualization of combined data from both the first graph and the second graph displayed on GUI 508. In this case, the interactive digital display can recognize the bump gesture and in response, examine the data underlying the two data visualizations that the user wishes to combine. In one implementation, the interactive digital display can examine data sets represented by the first graph and the second graph, and determine a logical way to combine the selected data (e.g., in this case by creating a scatter plot from the combined data sets).

In the example shown in FIG. 8, the scatter plot 800 can be a functional data visualization within the interactive experience, allowing the user 504 to further combine, separate, or otherwise manipulate the data. These operations will be further described below relative to FIGS. 9-41.

FIGS. 9-41 collectively illustrate interactive experience scenario 900 that includes an interactive digital display (IDD) 902. Briefly, these figures illustrate a series of user interaction examples that are enabled by the present concepts. A user 904 can be interacting with the interactive digital display 902. The interactive digital display 902 can include a screen 906, and a graphical user interface (GUI) 908 can be presented on the screen 906.

Figure 9:
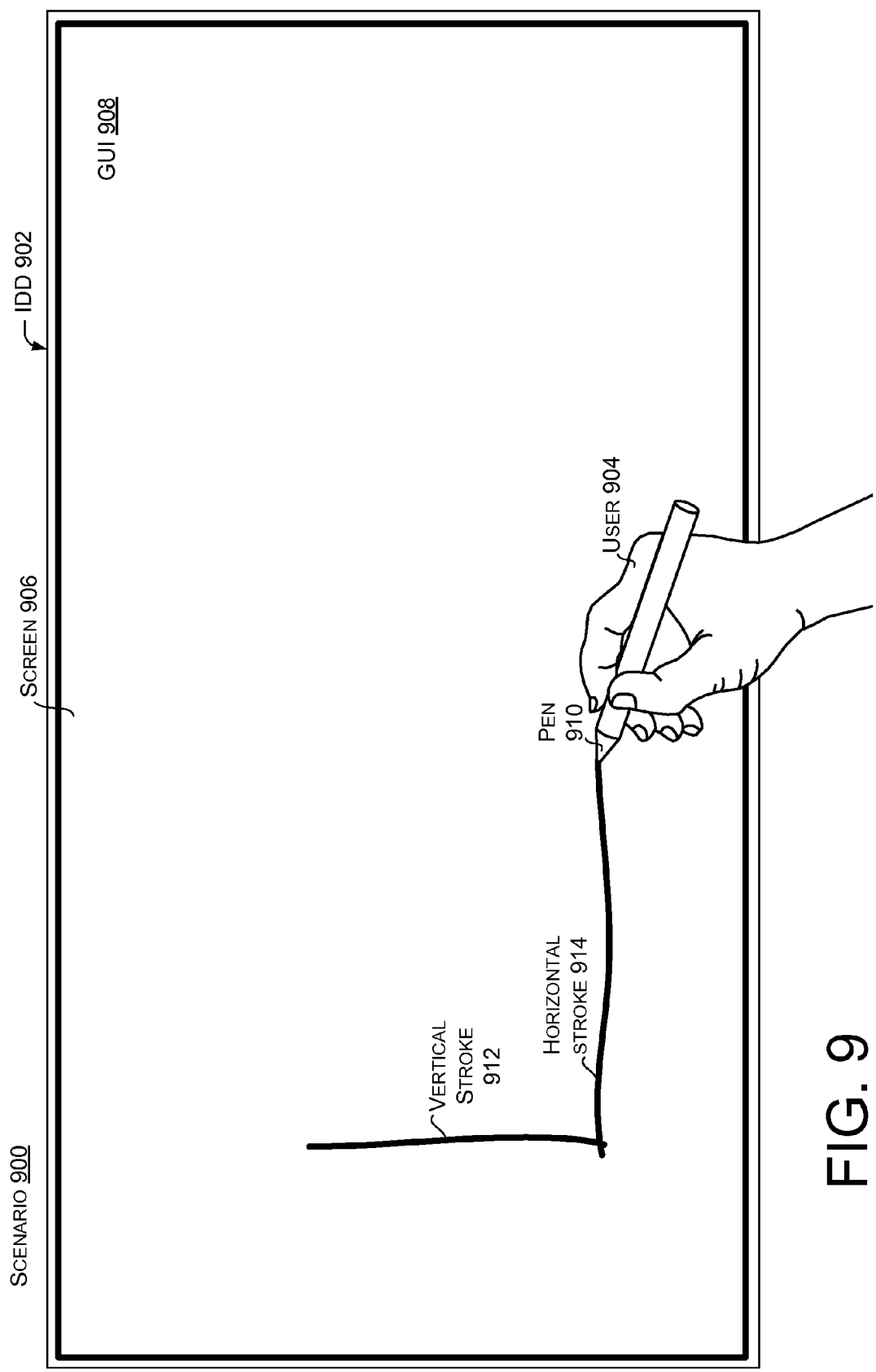
FIGS. 9-41 collectively show example interactions with an interactive digital display in accordance with some implementations of the present concepts.

As shown in FIG. 9, the user 904 can use sketch-based free-form input to add content to the interactive digital display 902. In this example, interactive digital display 902 is a pen-enabled interactive digital display. The sketch-based input can be in the form of hand strokes that represent axes for a graphical representation. FIG. 9 shows a pen 910 used to generate the strokes on the interactive digital display. Other input methods have been described above. In this example, initially, the user scribes (sketches) a vertical stroke 912 and an intersecting horizontal stroke 914 (or vice versa), the intersection of which is recognized by a chart recognizer as x-y axes for a chart. Note that the use of intersecting input strokes is just one technique for suggesting a chart or graph. For example, another technique can be to apply tic marks to an arrow. Other approaches can be utilized as desired.

Figure 10:
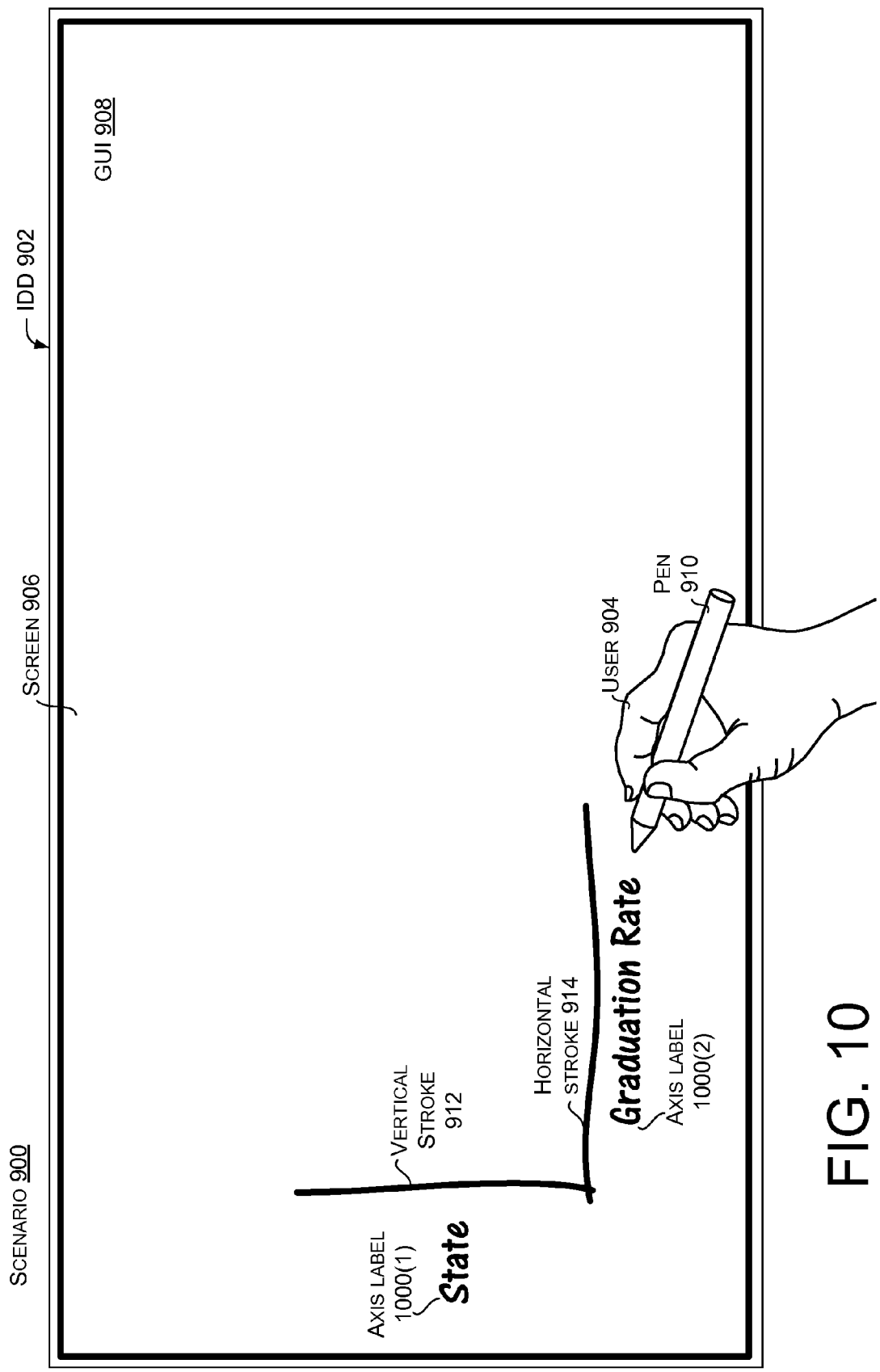

As shown in FIG. 10, the user 904 can use the pen 910 to write "state" as an axis label 1000(1) alongside the vertical stroke 912 and "graduation rate" as another axis label 1000(2) alongside the horizontal stroke 914. In other examples, the axis label alongside the vertical stroke can be written vertically along the line. In some implementations, once the user roughly scribes the vertical stroke 912 and the horizontal stroke 914, the interactive digital display 902 can automatically overlay input areas (not shown) for labeling the axes. The user can then simply add the labels by typing, writing, or voice command, into the input areas. The interactive digital display can also offer other chart options, such as color choice, and other methods of inputting chart options.

Figure 11:
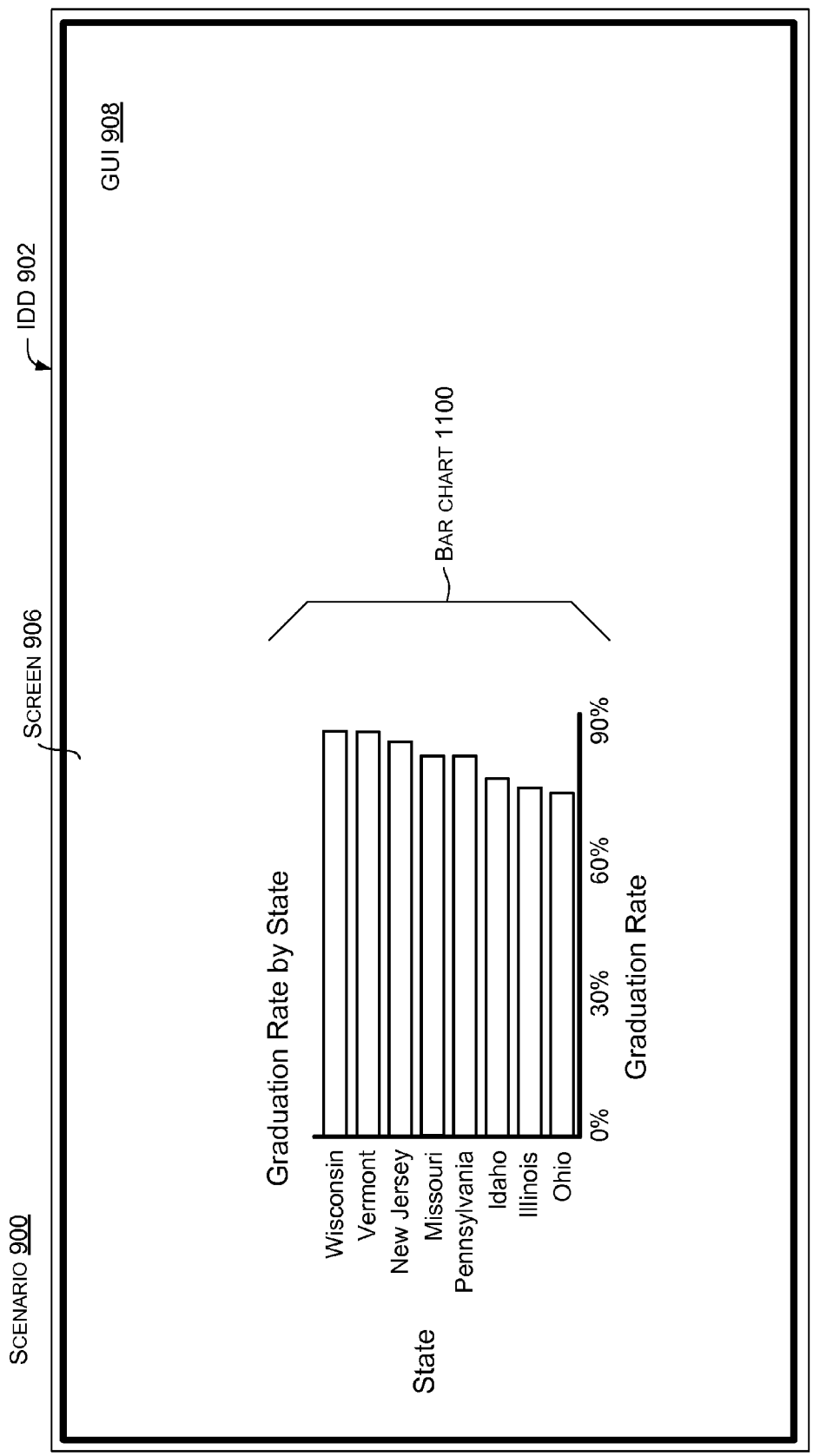

Once the user 904 has labeled the vertical stroke 912 and the horizontal stroke 914 the interactive digital display 902 can cause a bar chart 1100 to appear, as shown in FIG. 11. In this case, the interactive digital display can recognize the vertical stroke 912, the horizontal stroke 914, and the axis labels as suggestions to be axes for a chart. The interactive digital display can automatically draw machine-generated axes, labels, and other appropriate chart designators as shown in FIG. 11. For example, the interactive digital display has added a title for the chart, "Graduation Rate by State" (shown but not designated). Alternatively, the rough user-created strokes can be captured and presented as a chart with a hand-drawn appearance. In this case, for simplicity the bar chart with labels is shown following the user input in FIG. 10. However, in some implementations, the interactive digital display can automatically draw machine-generated axes after the user draws the vertical stroke and horizontal stroke shown in FIG. 9. Subsequently, the user can add the axis labels and the interactive digital display can add the chart title, etc.

In some implementations, the interactive digital display 902 can use the state and graduation rate axis labels 1000(1), 1000(2) (see FIG. 10) as categories to search for data. The interactive digital display 902 can present data found in these categories as a data visualization, for example bar chart 1100 in FIG. 11. In some implementations, the interactive digital display can show the source of the data that was used to generate the data visualization (not shown). In other implementations, the interactive digital display can offer the user 904 options for sources of data.

The interactive digital display 902 can automatically determine a logical way to format the data visualization. In the example shown in FIG. 11, the data are sorted by horizontal bar length, top down. The bar chart 1100 can be a structured object, rather than simply an image of a bar chart. For example, the bar chart 1100 can contain elements that are individually selectable as objects themselves. In this manner, the bar chart can be a fully functional representation of the underlying data, allowing many forms of data manipulation and analysis. The concept of selectable objects will be discussed further relative to FIGS. 32-34, below.

A chart sketched on the interactive digital display 902 is one example of content that can be added to the GUI 908 within the interactive experience scenario 900. Other examples of data visualizations can include graphs, tables, photographs, computer-generated graphical objects, and other artworks that have been processed into digital images. Other examples of content that can be added in other implementations can include images, video, text boxes, shape recorded smart objects from ink, lists, tables, timelines, shape art (circle, square, triangle, etc.), and/or sticky notes, among others. Still further examples of basic functionality that can contribute content include a brainstorming application, a research and exploration tool, time/calendar coordination, activity planner, product/shopping comparison tool, data exploration tool, budgeting and allocations, among others. Further, in some implementations the addition of content can be limited to the visible display surface of the interactive digital display. In other configurations, the usable display area can include a scrollable and/or zoomable canvas in the horizontal and/or vertical directions (e.g., the available GUI can be greater than what can be viewed at a given instance).

Additionally, content can be created by the user 904, such as by sketching (FIGS. 9-11), or content can be accessed. For example, assume that the user 904 has a pre-existing chart (not shown) that he/she wants to show on the interactive digital display 902. The pre-existing chart may be stored in the cloud, such as in a global account and/or on one of the personal devices of the user 904, such as a smart phone, tablet, or other computer. The interactive digital display 902 may provide functionality to access data and/or data visualizations that are stored locally to the interactive digital display or available over a network. Additionally, content can be introduced in layers, where different layers of content offer or retain different content properties.

Figure 12:
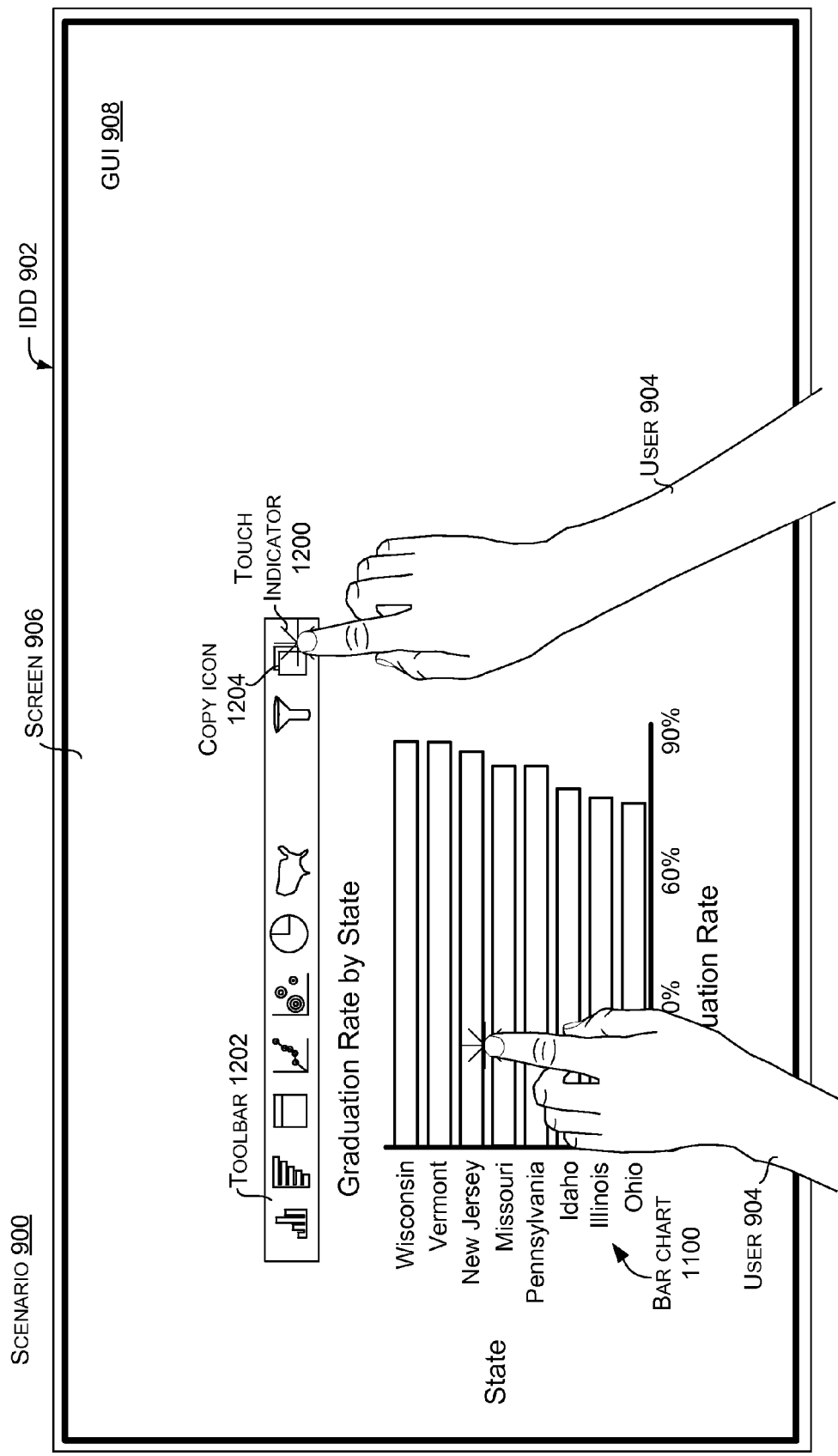

Returning to interactive experience scenario 900, FIG. 12 illustrates user 904 working with bar chart 1100. For example, the user can use touch commands to access chart options. In this example, "touch" is shown in the drawings with touch indicator 1200, which resembles a starburst pattern under the fingertip of the user. Using the index finger of his left hand, user 904 can touch (shown but not designated to avoid clutter on the drawing page) the surface of the screen 906 of the interactive digital display 902. In some implementations, the user can touch and hold the bar chart (leave his index finger resting on the surface of the screen) to reveal a toolbar 1202. The touch and hold command can be termed a "pin operation." The toolbar 1202 can contain icons. For example, one of the icons can be a copy icon 1204. The user can touch the copy icon 1204 with his right index finger, as shown with touch indicator 1200, and drag the copy icon out from the toolbar 1202 to an empty space in the GUI 908 to indicate that he would like to make a copy of the bar chart 1100. Alternatively, the user can tap the copy icon with his right-hand index finger to select the copy option. Other methods for accessing chart options or functionality are contemplated. For example, the user could simply tap the bar chart to make the toolbar available. In some implementations, the interactive digital display can distinguish between single and multiple touches. Multiple touches can be treated equally, or can be weighted. For example, some types of touches can carry more weight than other types of touches.

Other icons (shown but not designated in FIG. 12) can include icons for a vertical bar chart, a horizontal bar chart, a table, a line chart, a scatter plot, a pie chart, a map, and/or filtering data, among others. Other examples of computer-aided manipulation and analysis that can be offered by the interactive digital display can include selecting other chart types, changing views, sorting, filtering, separating, applying functions (e.g., average, standard deviation, minimum, maximum, count), adjusting ranges or scales of axes, re-sizing, coloring, labeling, editing, extracting a subset(s) of the data, etc. These operations can be applied to data, data visualizations, and/or parts of data visualizations.

Figure 13:
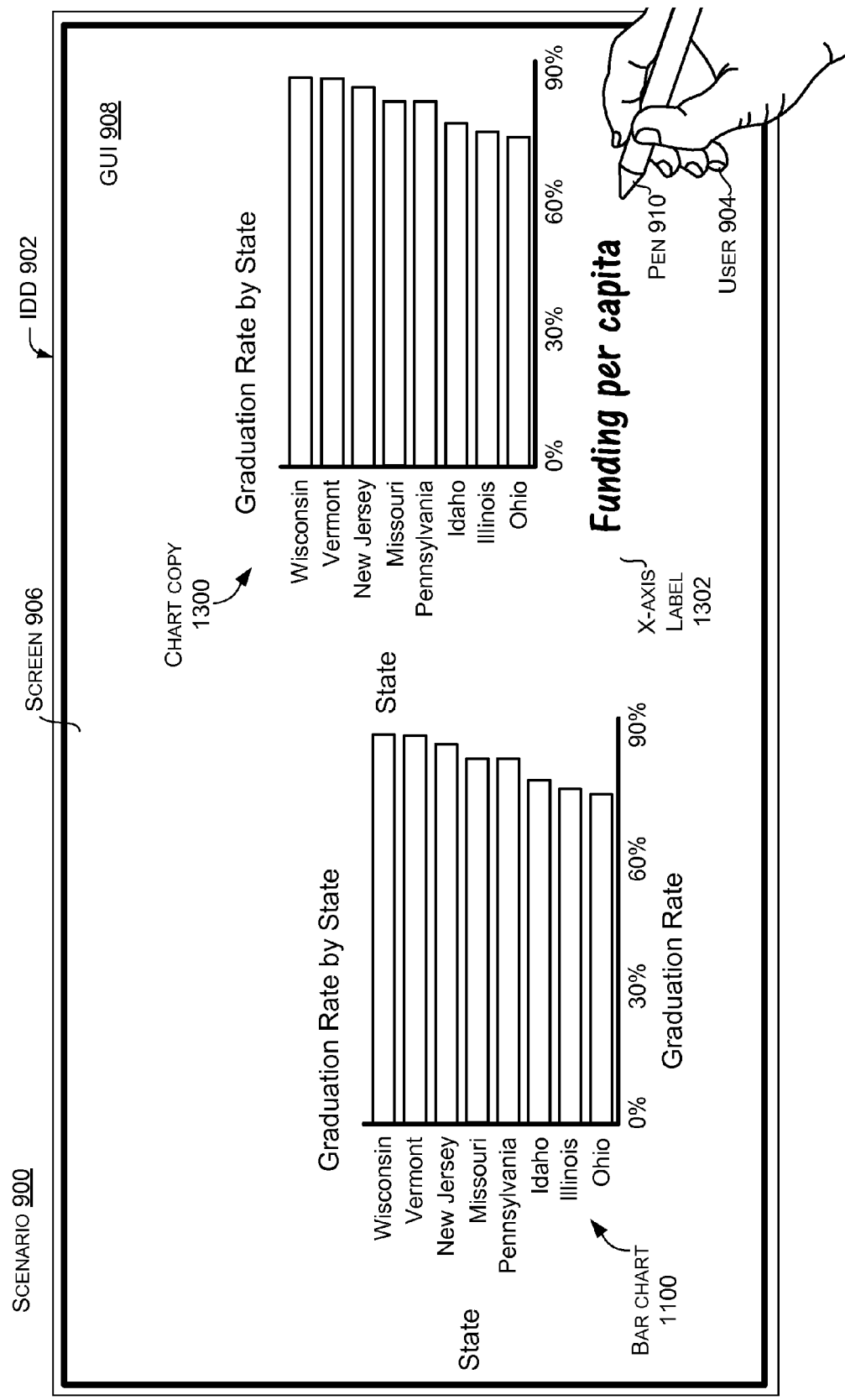
Figure 14:
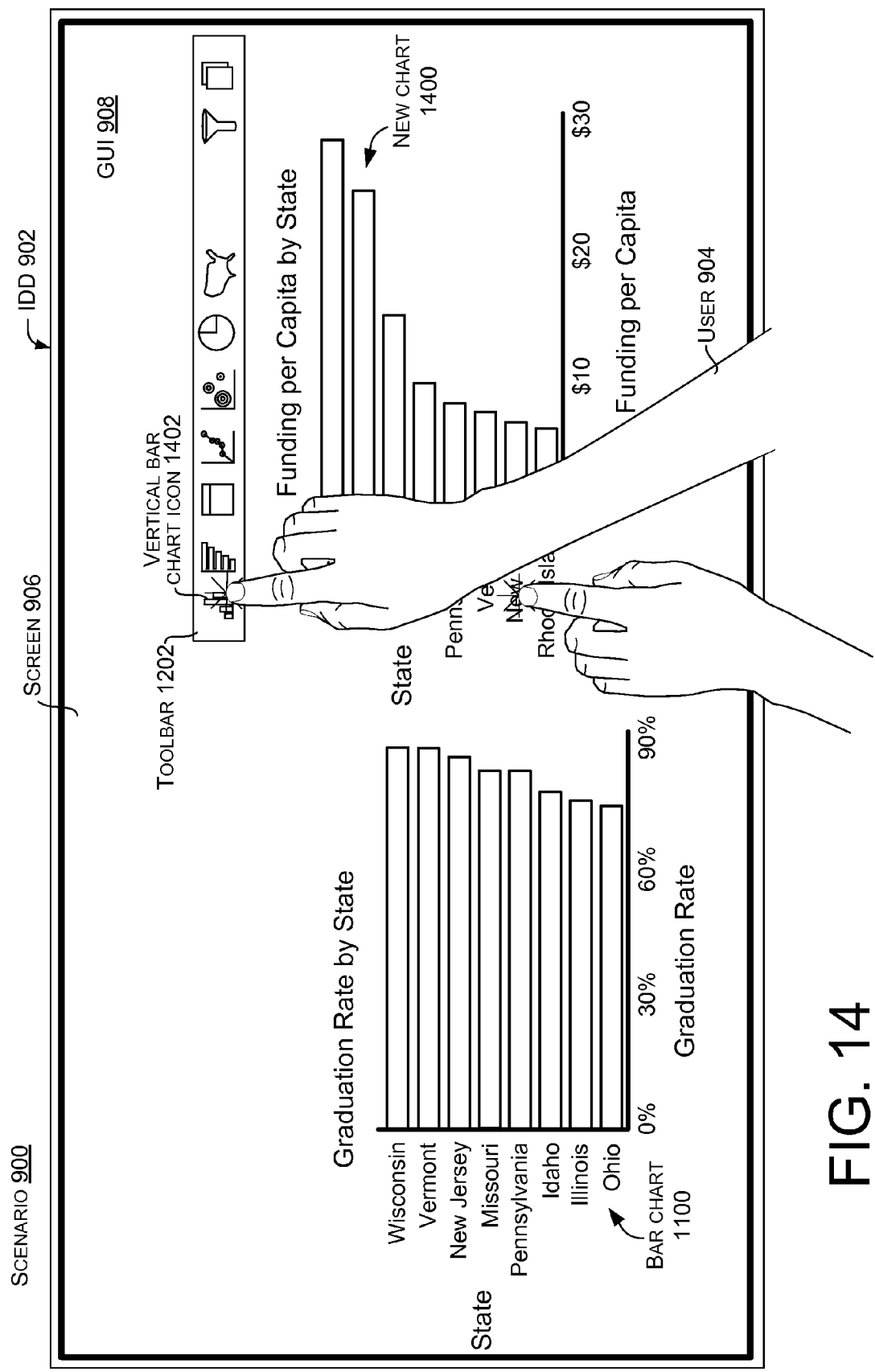

FIG. 13 shows the bar chart 1100 and the chart copy 1300 that was created in the example in FIG. 12. As shown in FIG. 13, the user 904 is changing the x-axis label 1302 of the chart copy 1300. The user is changing the x-axis label to "Funding per capita" by simply writing over the existing axis title. In one example, the original axis title can disappear when the user begins to write a new title over the original axis title on the GUI 908. In another example, the original axis title may remain visible until the user finishes writing the new title over it, and indicates acceptance or input of the new title through some form of input. In other implementations, the user can access a text entry box for the axis title, such as by tapping over the title on the screen. In the example shown in FIG. 13, the new x-axis label is recognized by the interactive digital display and the chart copy 1300 is replaced with a new chart 1400, titled "Funding per Capita by State," as shown in FIG. 14. In this case, in response to the user entering "Funding per capita" as a new x-axis label, the interactive digital display 902 automatically initiated a search for related data and generated new chart 1400 as a new data visualization representing the newly found, related data.

Figure 15:
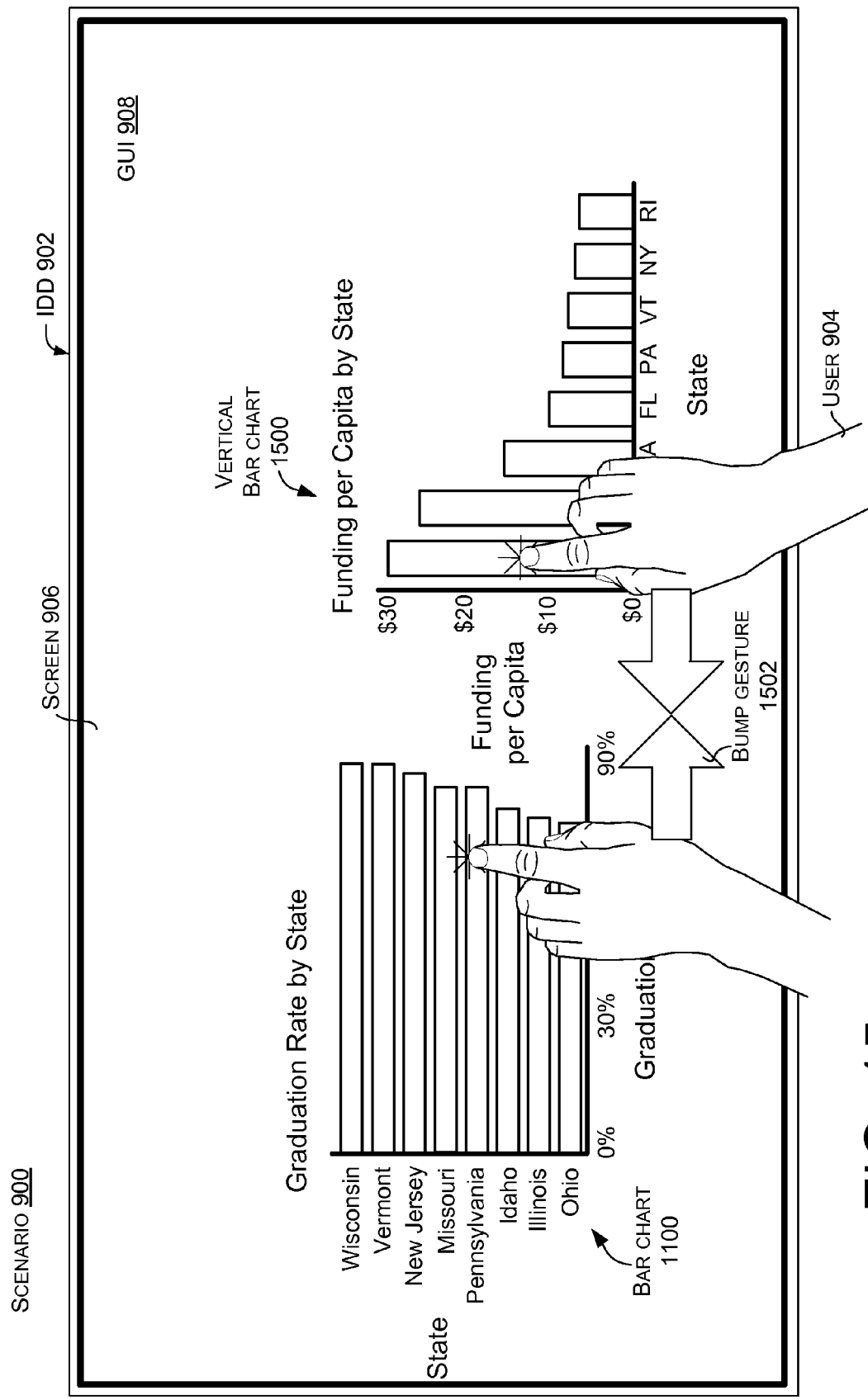

In FIG. 14, the user 904 is accessing the toolbar 1202 for the new chart 1400 by touching and holding the new chart with his left hand, revealing the toolbar. With his right hand, the user can touch the screen 906 at or near the vertical bar chart icon 1402 to change the chart type. For example, touching the vertical bar chart icon can cause the "State" and "Funding per Capita" categories to switch axes, resulting in a vertical bar chart 1500 (FIG. 15). Other chart manipulation options can be available, such as changing the scale of the axes, etc.

The interactive digital display 902 can be used for computer-aided manipulation and analysis of the data visualizations. For example, a user may wish to combine two data visualizations. The interactive digital display can be directed, with a simple gesture, to automatically combine two data visualizations. In some examples, the interactive digital display can combine two similar data visualizations, such as two pictures (see FIGS. 1-4). In other examples, the interactive digital display can combine two seemingly disparate data visualizations, such as a pie chart and a bar graph.

Figure 16:
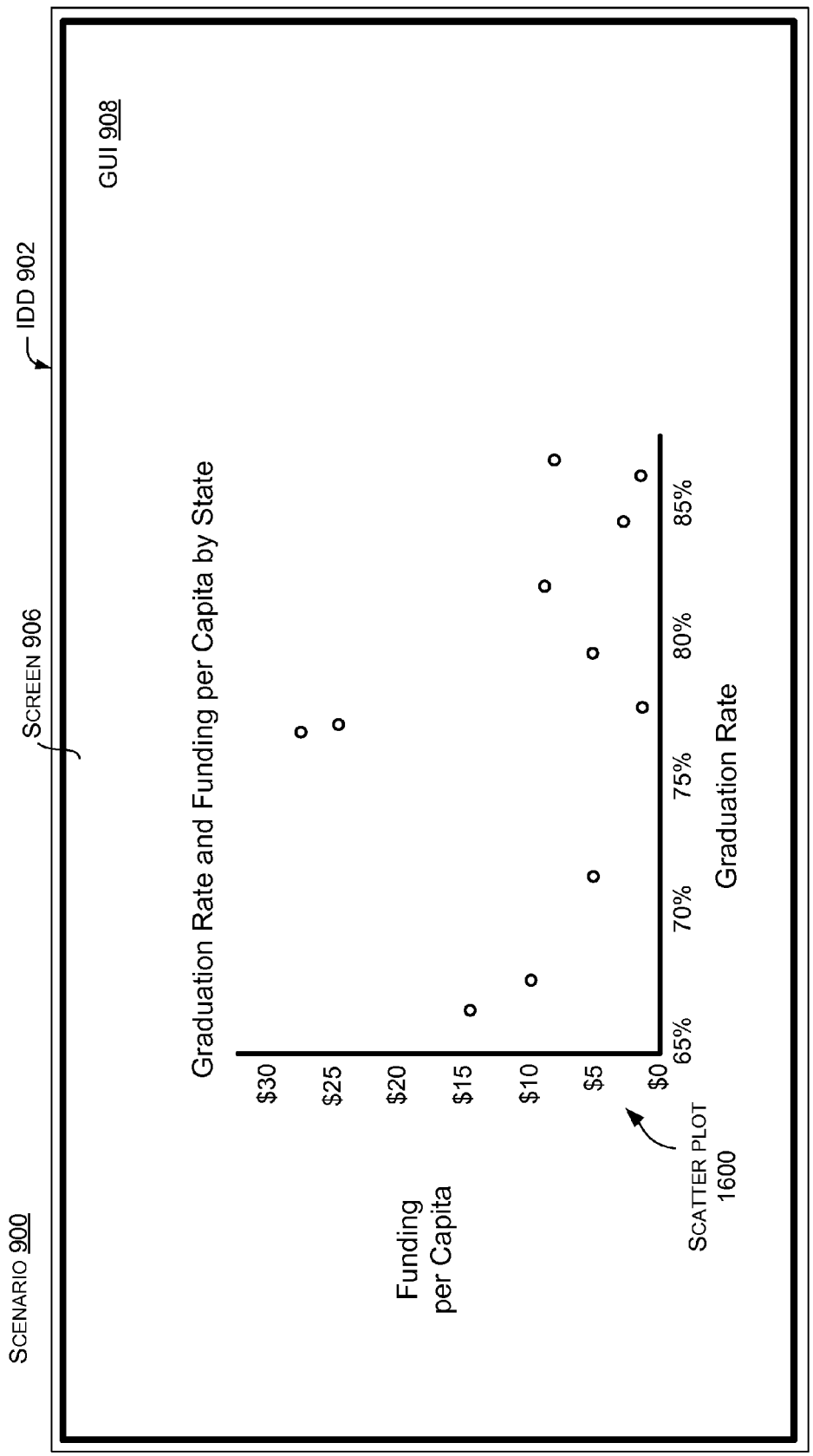
Figure 17:
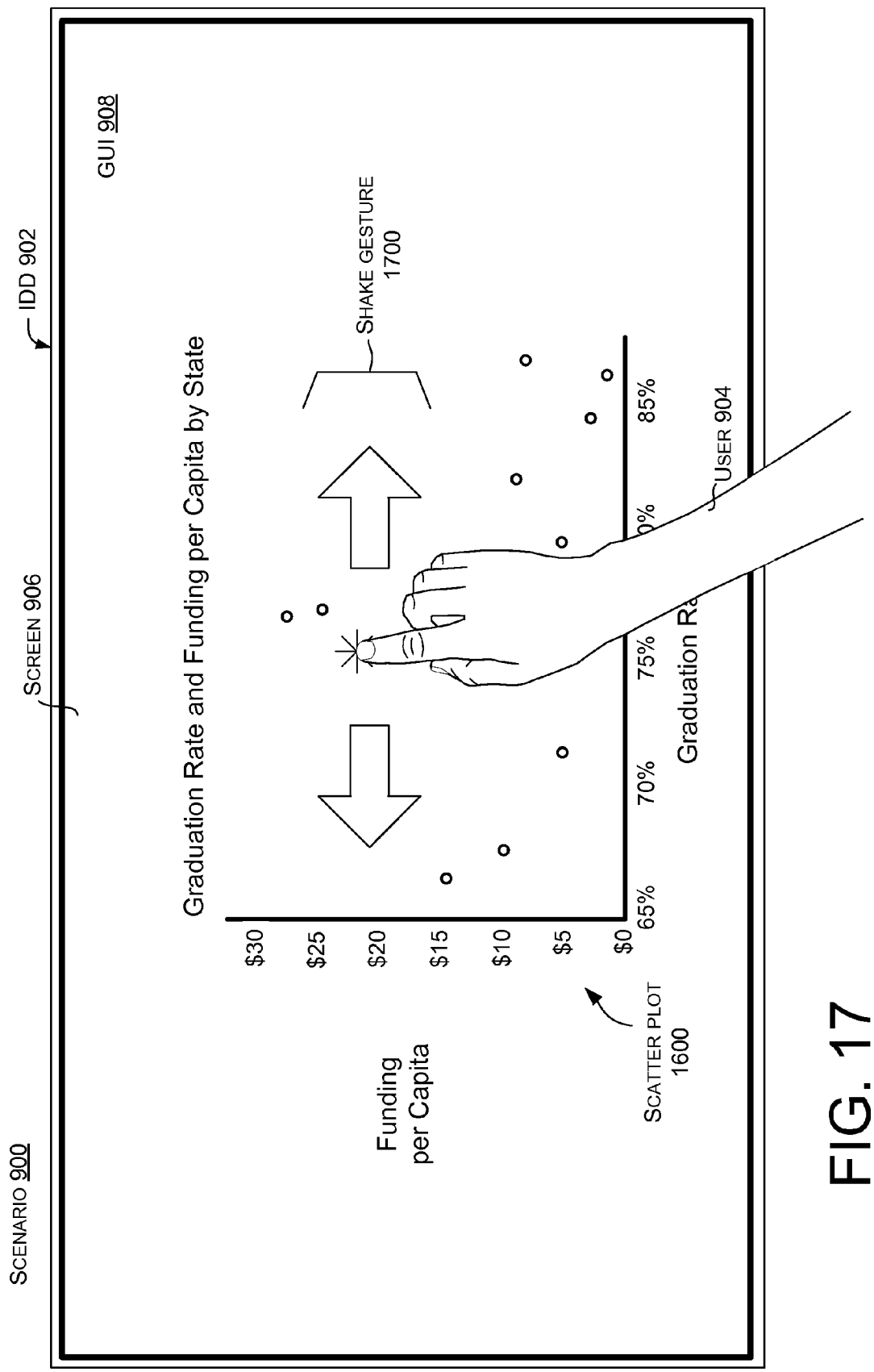

Referring to the example shown in FIG. 15, the user 904 may wish to combine bar chart 1100 and vertical bar chart 1500. In one implementation, the user can combine two data visualizations with "bump" gesture 1502. In the example in FIG. 15, the bump gesture 1502 is designated with two arrows that represent the charts moving together on the GUI 908. In this case, the bump gesture is performed by the user with his/her two index fingers, each index finger touching one of the charts, and sliding the charts toward each other on the screen, effectively "bumping" them together. When the charts overlap on the GUI with the bump gesture, the interactive digital display can automatically combine the data underlying bar chart 1100 and vertical bar chart 1500 in a meaningful way. In this example, the combination creates scatter plot 1600, as shown in FIG. 16.

In this case, the interactive digital display 902 has automatically created scatter plot 1600 in response to the bump gesture. Scatter plot 1600 is titled "Graduation Rate and Funding per Capita by State" and is a logical combination of data from bar chart 1100 and vertical bar chart 1500. In some implementations, after a gesture such as bump gesture 1502 (FIG. 15), a "thinking" icon could appear briefly before the new chart appears (not shown). Other active user commands and/or passive user commands for conveying an intention to combine data visualizations are contemplated, such as touch gestures, non-touch gestures, eye gaze, voice commands, and/or commands entered via another device, such as a smart phone, among others.

The interactive digital display 902 can examine data (e.g., numbers, words, images, information) underlying data visualizations to determine a logical way to present one combination of the data from two (or more) visualizations. For example, in one implementation, the interactive digital display can determine that the two data visualizations are pictures (see FIGS. 1-4). In this case, the interactive digital display can attempt to determine types of objects in the pictures, scales of the objects, and a logical way to create a new picture that can contain individual objects from both of the original pictures. Referring again to FIG. 16, as noted above, scatter plot 1600 is a combination of bar chart 1100 and vertical bar chart 1500 (FIG. 15). In this case, the interactive digital display 902 has chosen the common axis label/category "State" as a common category to build the new data visualization, and has selected a scatter plot type chart for the new data visualization. The interactive digital display can offer options for editing the new data visualization. For example, after the interactive digital display causes scatter plot 1600 to appear (FIG. 15), the interactive digital display could also automatically provide toolbar 1202 (FIG. 12) on the GUI 908 in relation to scatter plot 1600, offering options to edit the scatter plot.

In some examples, interactive digital display 902 can automatically present the most logical combination of two data visualizations on GUI 908. In other examples, the interactive digital display can offer various options and/or feedback for combining two or more data visualizations. In some implementations an interactive digital display can determine whether or not it is possible or likely to combine two or more specific data visualizations. This determination can be made before or during a user command to initiate the combination, such as bump gesture 1502 (FIG. 15). An interactive digital display can also provide feedback (e.g., hint) to the user about whether two or more data visualizations can be combined. For example, if a combination is possible or likely, a symbol could appear on the GUI 908. The appearance of a symbol could be in response to the user 904 bringing two data visualizations near each other on the GUI, in response to the user simply touching and holding two data visualizations with each index finger, or in response to the user performing a gesture such as bump gesture 1502. The symbol could be similar to the arrows pointing toward each other as depicted at bump gesture 1502 in FIG. 15, or could be any of a variety of symbols. In some cases, if it is not possible to combine the two data visualizations, nothing will happen when the user moves them together or tries to "bump" them together. In other cases, an icon or other indicator can be shown to represent that a bump is not possible for the two data visualizations.

In other implementations, responsive to a gesture by a user, the interactive digital display 902 could show options for a new data visualization (not shown). For example, the user could be presented with multiple chart types for the new chart and be prompted to select one, rather than the interactive digital display automatically providing one version. The interactive digital display can combine any of a variety of data visualizations or forms, such as bar charts, pie charts, scatter plots, tables, and lists. The interactive digital display can also automatically select any of these forms for the new, combined data visualization. Alternatively, the user can be prompted to select the form. In some implementations, the interactive digital display can present the user with a variety of other options or input functionality related to the new data visualization, such as axis labels, scaling, color choice, etc. Stated another way, the new, combined data visualization can appear automatically in response to a simple user command to combine two data visualizations, or the combined data visualization can be built step-wise from user-selected options. For example, a first option could be selecting a type of chart, a second option could be selecting categories for each axis of the chart, etc.

In some cases, the user 904 may want to "undo" the combination of the data visualizations. The interactive digital display 902 can have an option to separate combined visualizations, for example with a "shake" gesture 1700, shown in FIG. 17. In this example, the shake gesture entails the user swiping his/her index finger back-and-forth across the screen 906, effectively "shaking" the scatter plot apart. In this example, the result of shake gesture 1700 can be the two original charts, bar chart 1100 and vertical bar chart 1500, displayed on GUI 908 (as shown in FIG. 15). In some cases, the interactive digital display can make the two original charts appear to fly out from the scatter plot 1600. In other implementations, "shaking" apart a complex data visualization could result in the interactive digital display showing a data visualization(s) on the GUI which had not previously been displayed. For example, the interactive digital display could show an option on the GUI prompting the user to select either reverting to the previous chart(s) or choosing a new data visualization(s).

Figure 18:
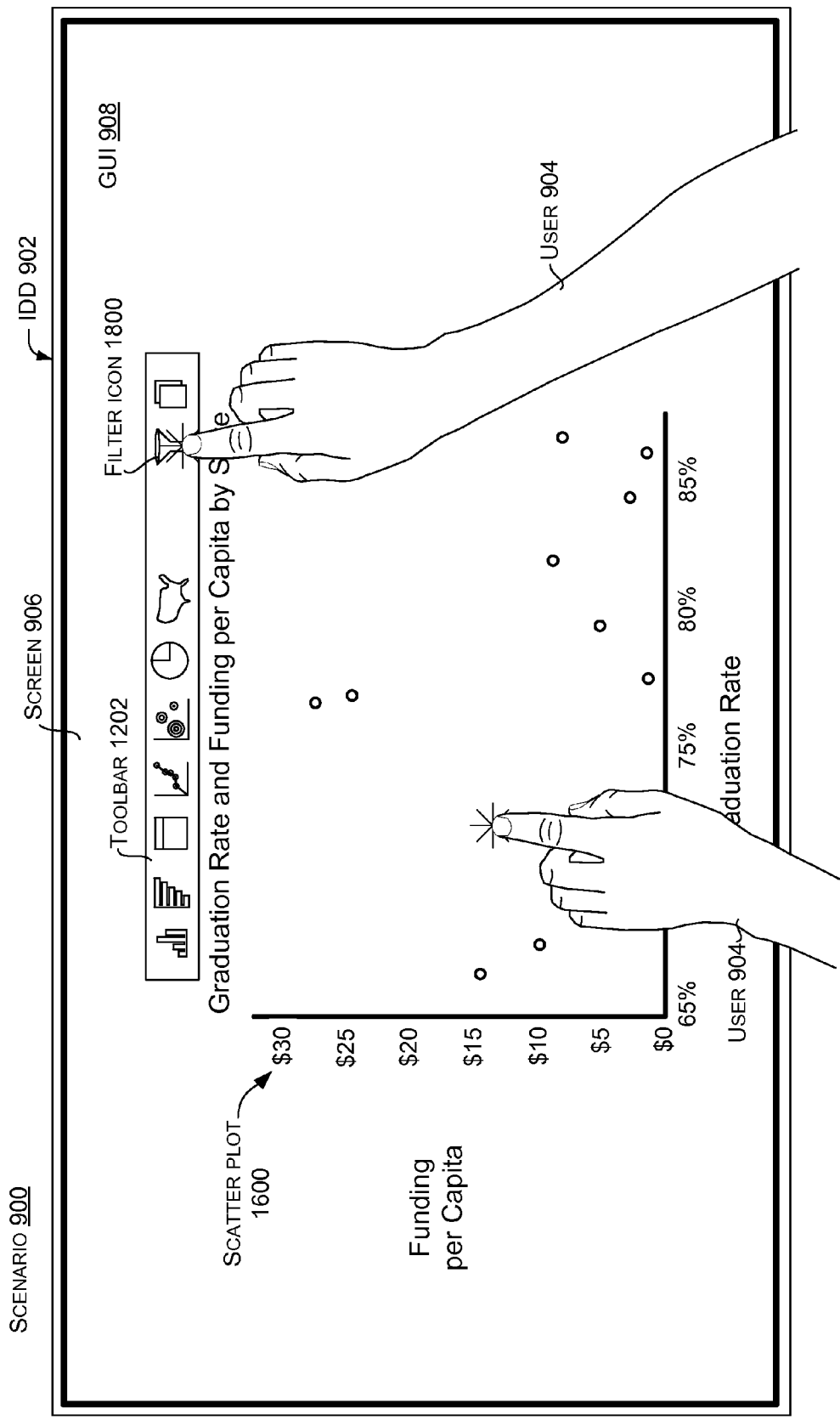
Figure 19:
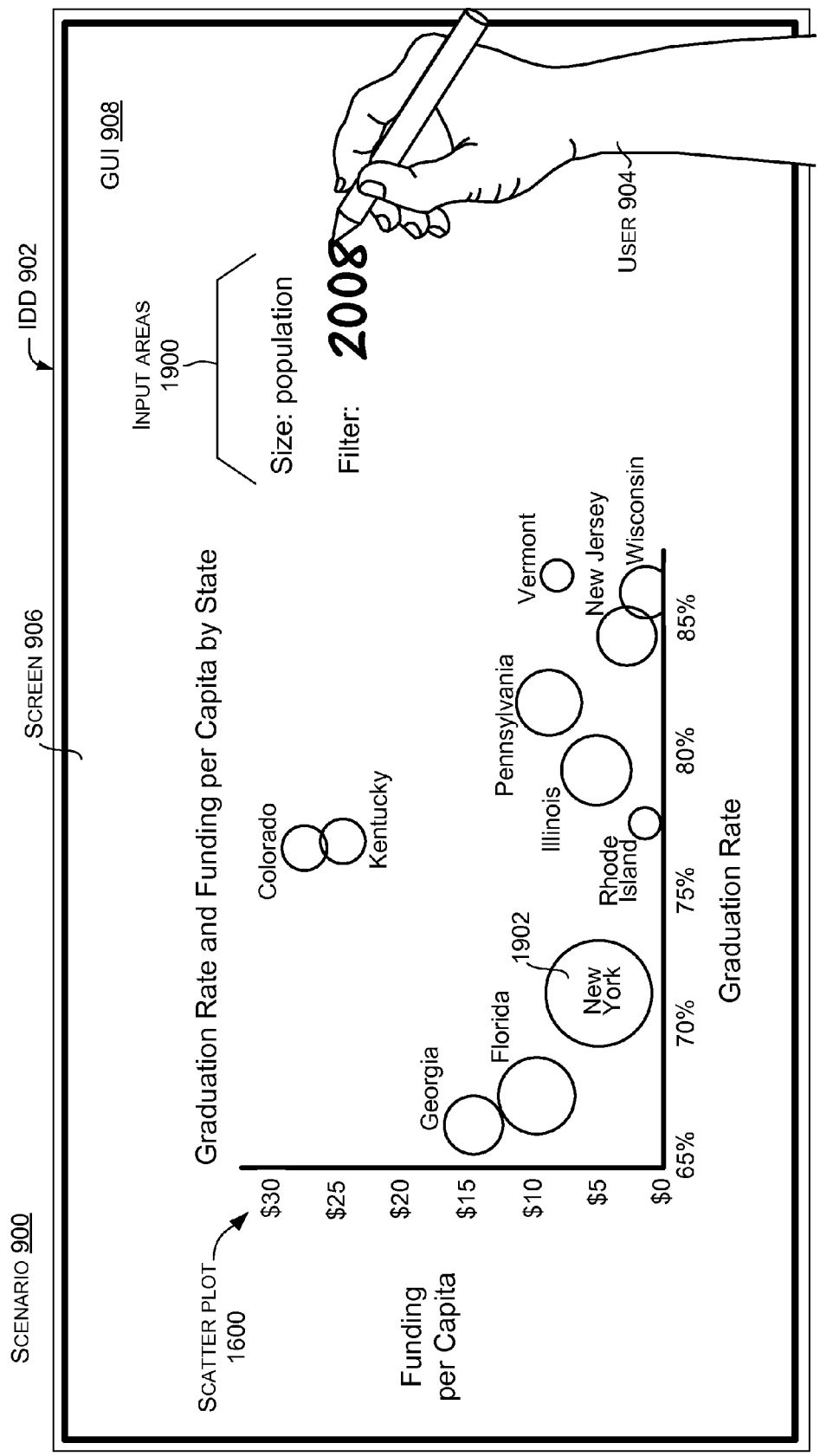

Referring now to FIG. 18, continuing from the example shown in FIG. 16, the user 904 may wish to perform various manipulations or analyses of the data in the scatter plot 1600. In some implementations, the user can use the pin operation introduced above, touching and holding the scatter plot with their left-hand index finger to reveal the toolbar 1202. The user can then select an icon, such as filter icon 1800. A filtering function, which can be activated by selecting filter icon 1800, can be used to manipulate the data underlying the scatter plot. In this case, referring now to FIG. 19, selection of the filter function can cause the interactive digital display to make input areas 1900 appear on the GUI 908. The user can enter parameters and/or conditions into the input areas to manipulate the data in the scatter plot. For example, the user can write "population" in a size affordance text field (shown but not designated). In response, the interactive digital display 902 can cause bubbles (states) in the scatter plot to grow accordingly. In this case, the relatively large bubble size of the data point representing New York, designated as 1902, is related to the relatively larger population size of New York State as compared to the other states represented in the scatter plot. The user can write "2008" in the filter text field, causing only data for the year "2008" to be displayed in the scatter plot, in this case. In this example, interactive digital display 902 recognized the user entry of a year as the user intending to select time for the filter parameter. In other examples the interactive digital display can automatically select a parameter, or the user could be prompted to select the parameter in another manner. Also, bubbles or other data representations could be labeled automatically. Alternatively, a user could select the data he/she wants to have labeled, such as by tapping a data point.

Figure 20:
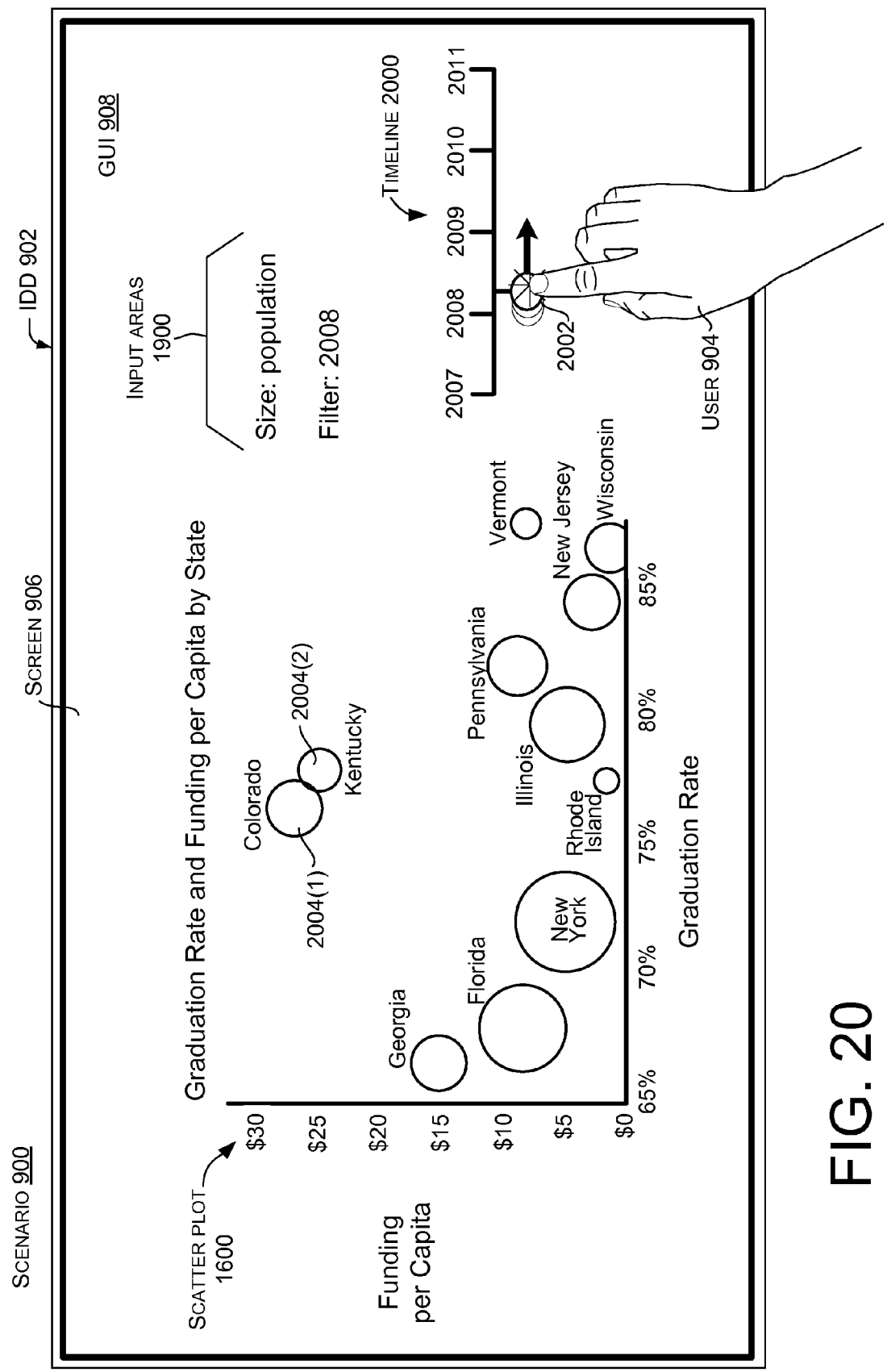

FIG. 20 illustrates another way that interactive digital display 902 can allow a user to invoke control of elements on the GUI 908, or invoke data manipulation. In this example, the user can cause a timeline 2000 to appear on the GUI 908. The timeline 2000 can be invoked by pen-interaction, touch-interaction, voice-interaction, or some other method. The timeline can include a toggle 2002, which user 904 can slide with their finger to change the year, in this case. As shown in FIG. 20, the user has moved toggle 2002 from the mark "2008" toward the right, toward the year "2009" on the timeline. In response, the interactive digital display can cause bubbles in the scatter plot to grow, shrink, and move in accordance with the filtering function. For example, as the year was adjusted from 2008 to 2009, the bubbles representing Colorado and Kentucky, designated as 2004(1) and 2004(2), respectively, changed size and location as compared to FIG. 19. In some cases, the bubbles can "snap" to the new size and/or location, or the bubbles can grow, shrink, and slide fluidly.

Figure 21:
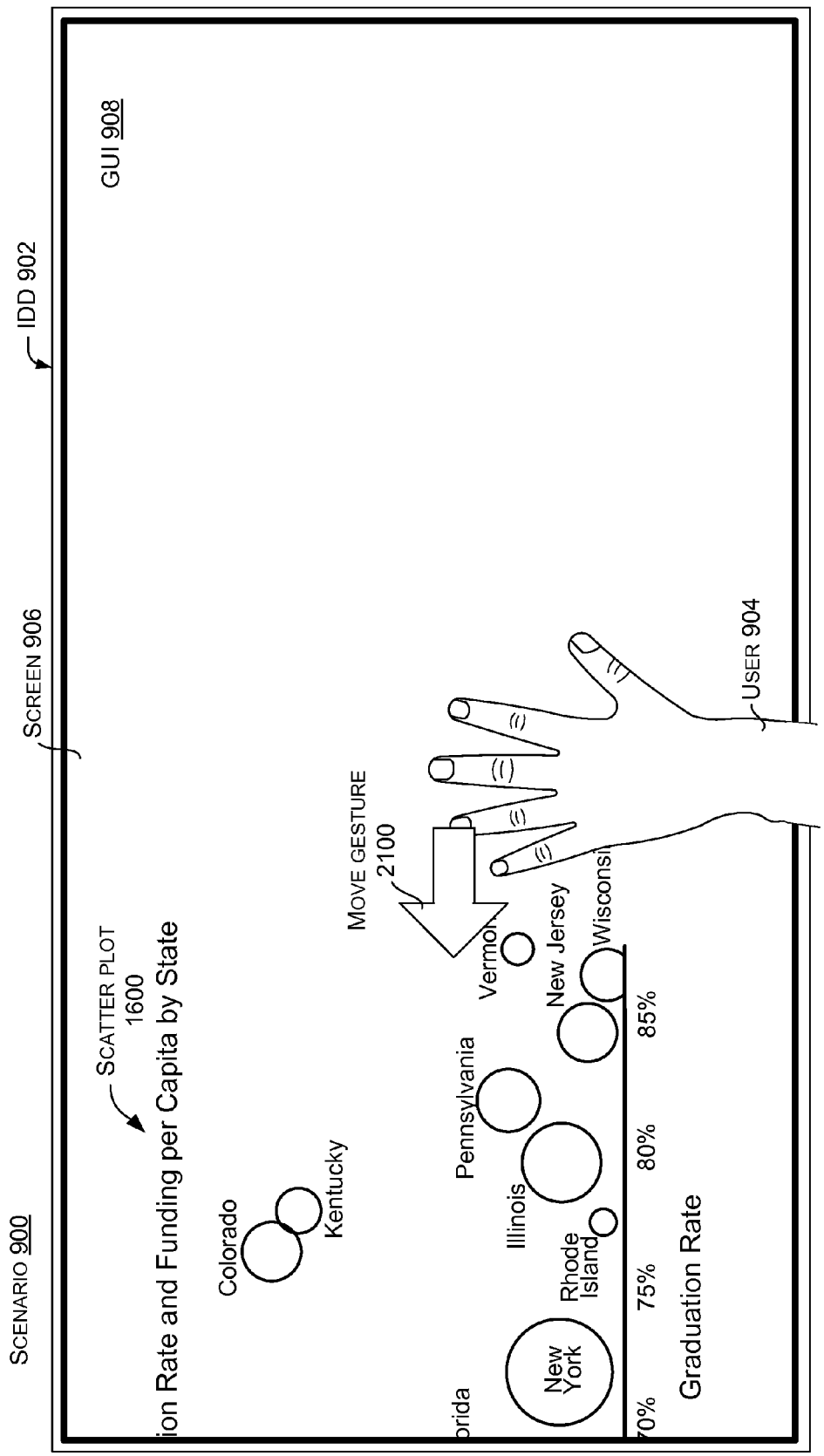

FIG. 21 shows the user 904 "moving" the scatter plot 1600 to the left across screen 906 to make more space available on the GUI 908. In this example, the user can slide the palm and fingertips of her left hand across the screen to perform a move gesture 2100. In other implementations, the move gesture can be performed with one fingertip, multiple fingertips, or by a non-touch gesture recognized by the interactive digital display 902. Objects that are moved out of view on the GUI, to the left in this case, can be deleted, or can remain hidden out of view until the GUI is moved back to the right.

Figure 22:
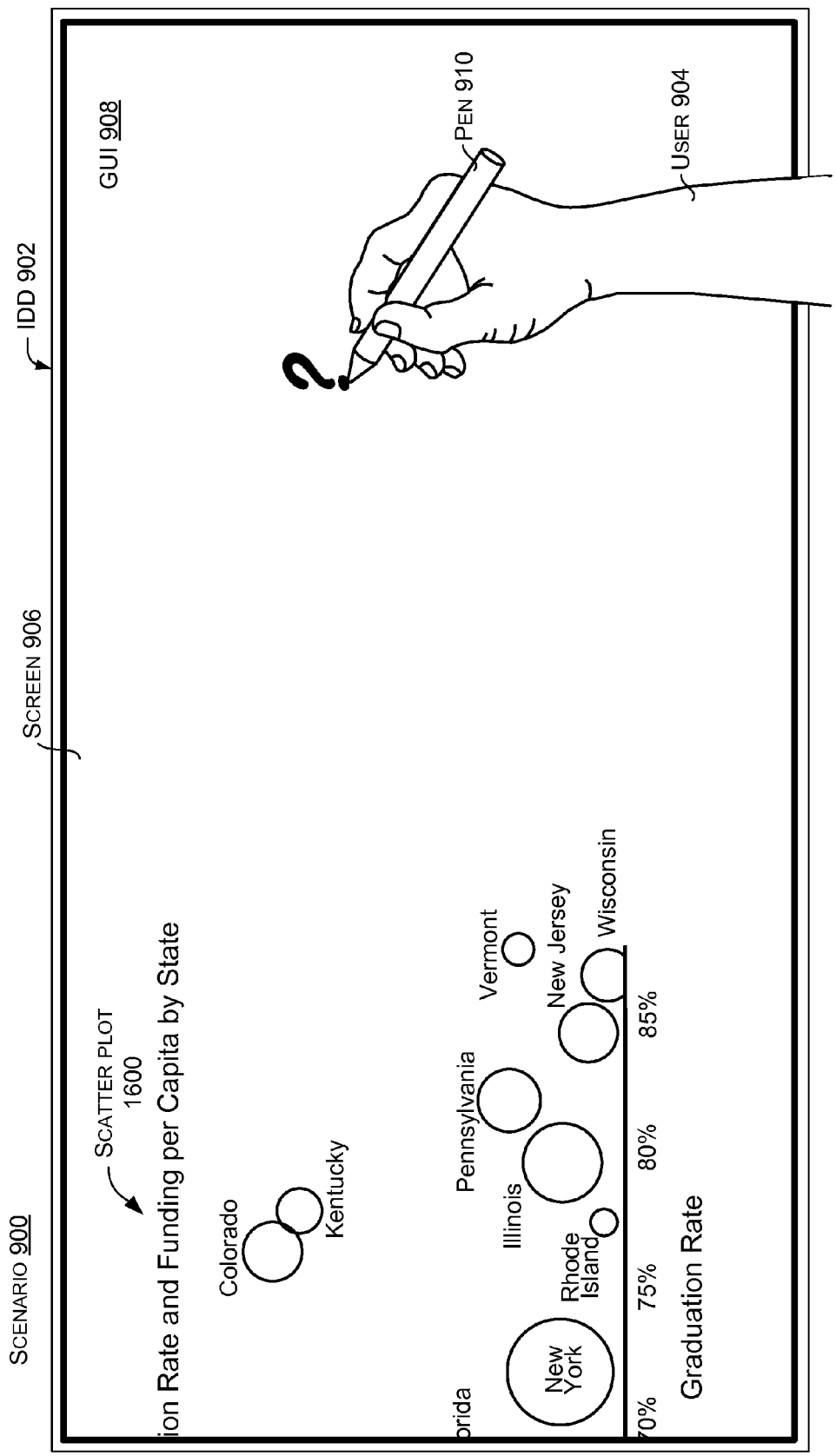
Figure 23:
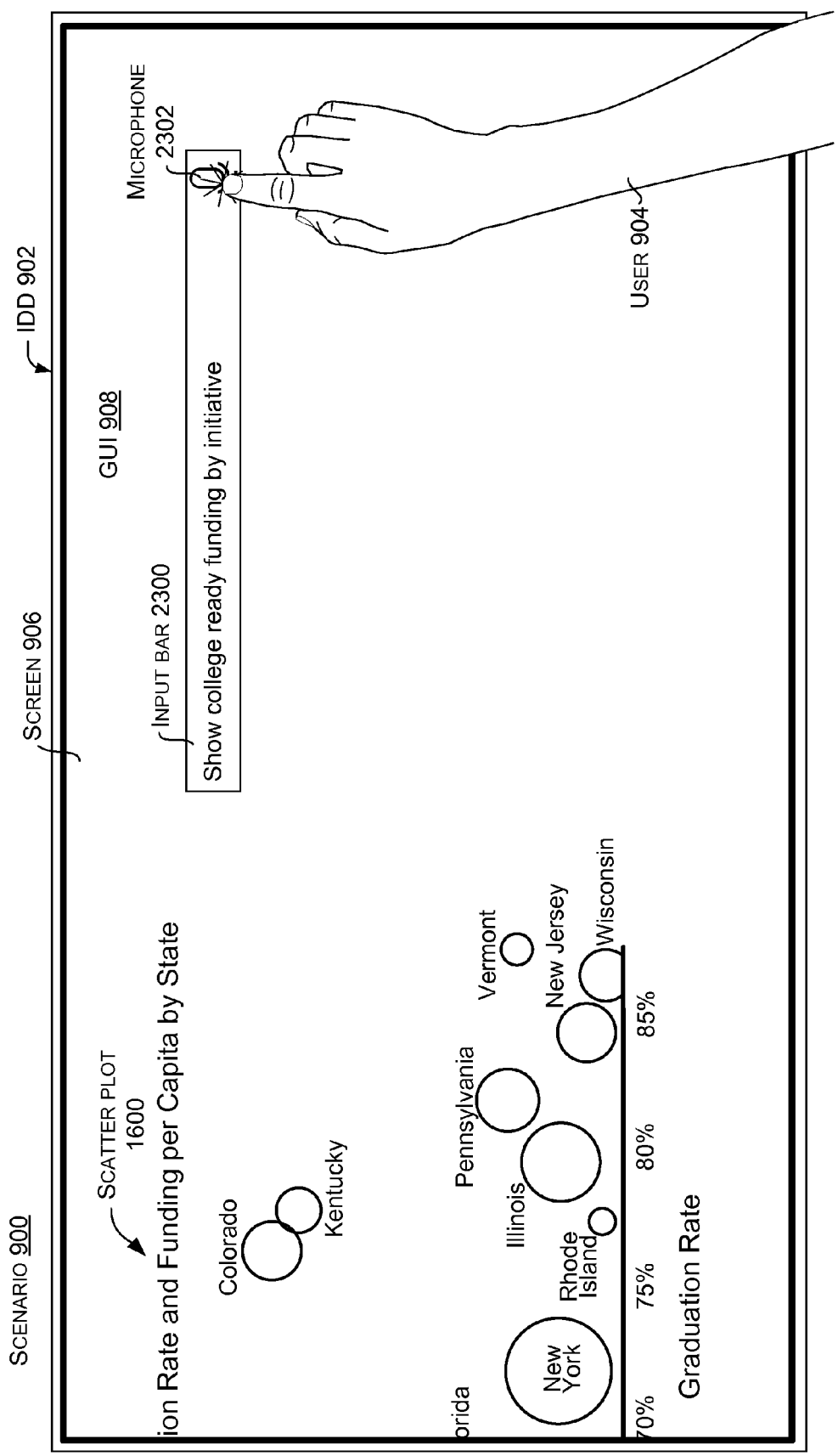
Figure 24:
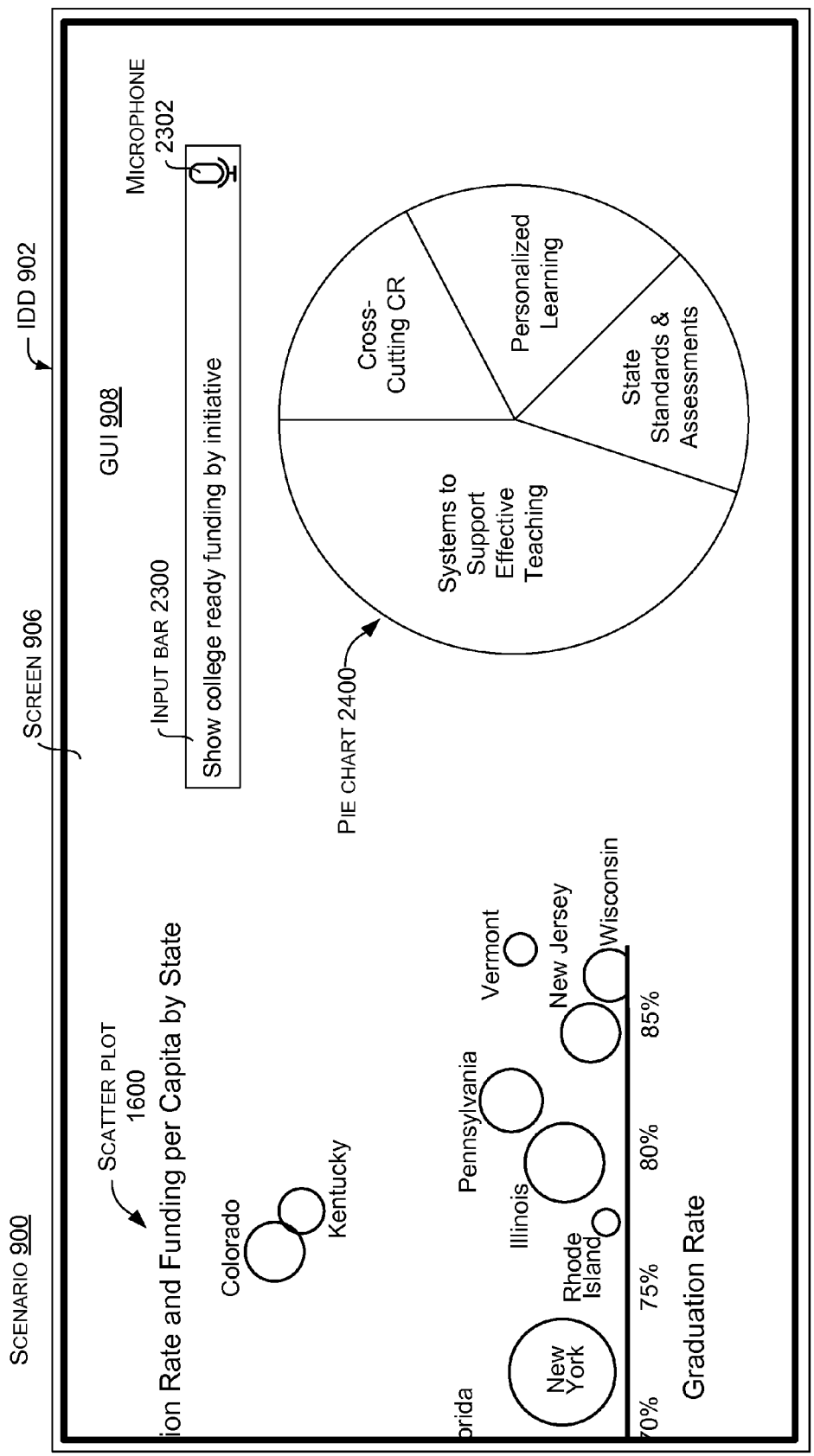

As shown in FIG. 22, the user 904 can use the pen 910 to invoke additional functionality associated with interactive digital display 902. For example, the user can draw a question mark in a blank area of the GUI 908. The action of drawing the question mark can cause the interactive digital display to make input bar 2300 appear on the GUI, as shown in FIG. 23. In this example, the pen 910 can be used to invoke speech or text input options. Input bar 2300 can be an information navigation and/or search question box. The input bar can allow the user to seek information through typing and/or use of a pen, touch, or voice command(s). In the example in FIG. 23, the user is selecting microphone 2302 by tapping the microphone icon (seen more readily in FIG. 24). In another implementation, the interactive digital display 902 could auto-invoke speech. In the example in FIG. 23, after tapping the microphone 2302, the user says "Show college ready funding by initiative." In response, the interactive digital display causes these words to appear in the input bar 2300 and searches for this information. The interactive digital display automatically shows the result as a new data visualization, pie chart 2400, as shown in FIG. 24.

Figure 25:
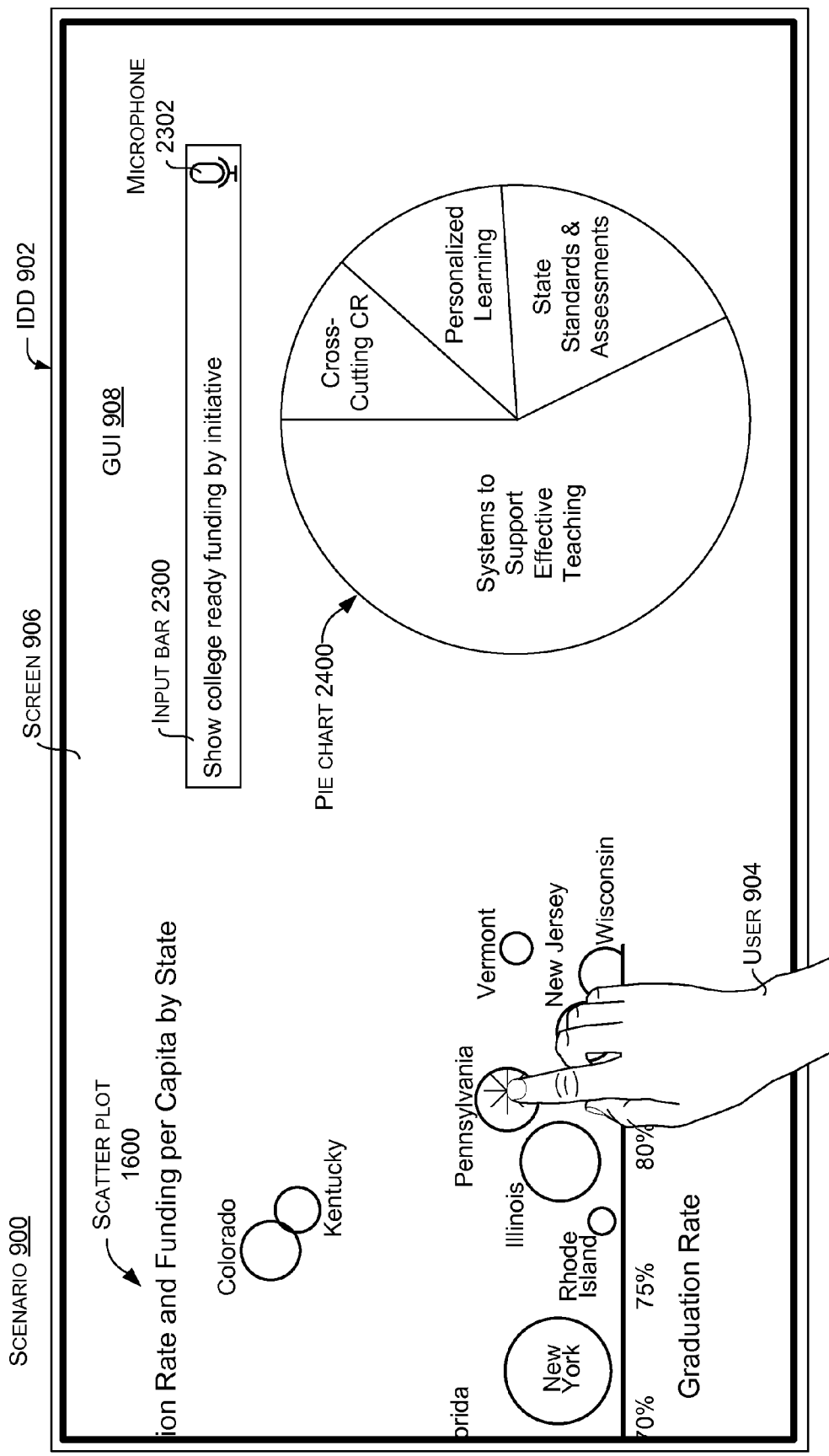
Figure 26:
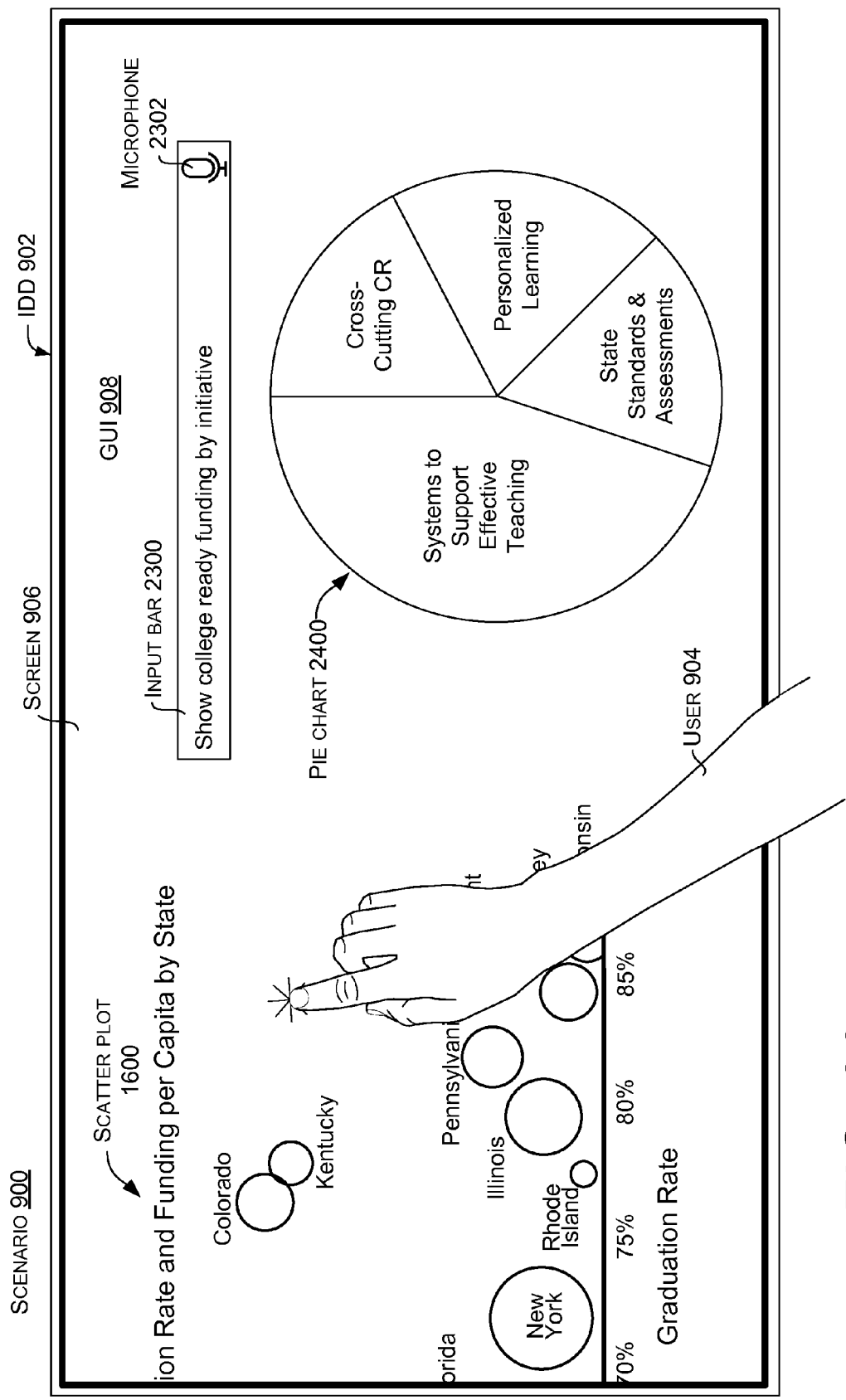

FIG. 25 illustrates manipulation of pie chart 2400. In this example, the user 904 touches the screen 906 at the data bubble representing Pennsylvania (shown but not designated) within scatter plot 1600. As a result, the interactive digital display causes the pie chart to change (e.g., filter) to reflect the choice of the user. For example, the categories within the pie chart grow or shrink, reflecting the change from data representing many states to data representing only the state of Pennsylvania. Many other forms of data manipulation and/or analysis are contemplated. Additionally, many ways of invoking or activating the data manipulation and/or analysis are contemplated. In this example, the user simply touched the data bubble representing Pennsylvania to change the pie chart. In other cases, the user could select the pie chart in some way to indicate the pie chart as the target of data manipulation, then subsequently specify Pennsylvania. The user could also unselect various aspects of the data visualization. For example, the user may be able to revert the pie chart back to the more general example by touching a blank area of scatter plot 1600, as shown in FIG. 26, thereby unselecting Pennsylvania.

Figure 27:
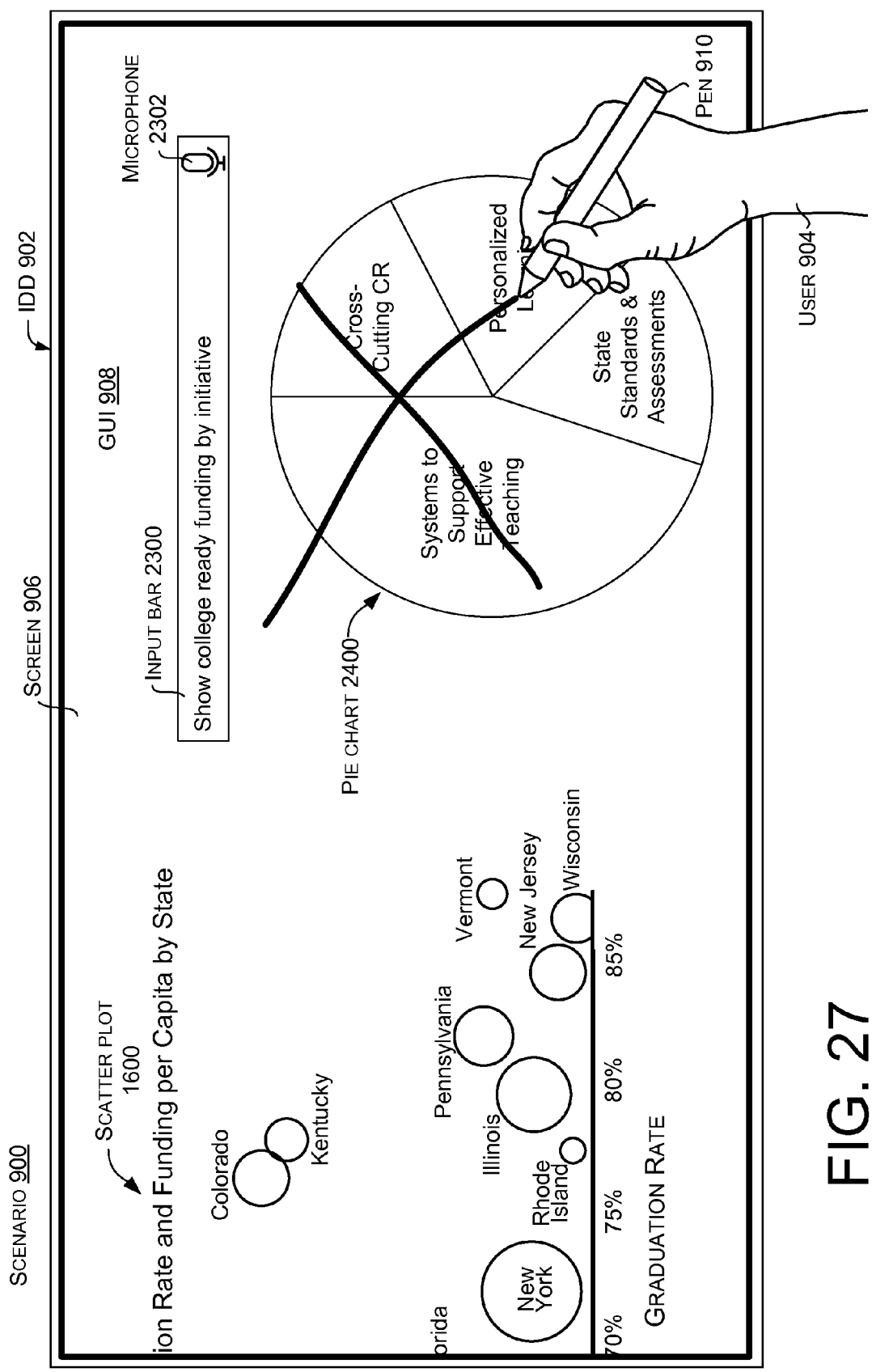

As shown in FIG. 27 the user may delete data visualizations from the GUI 908. The user may accomplish this with the pen 910, such as by writing an X over pie chart 2400 to delete the pie chart. Other methods of deleting data visualizations are contemplated, such as by moving them off the GUI with a swiping motion, selecting them and verbally indicating a delete request, etc.

Figure 28:
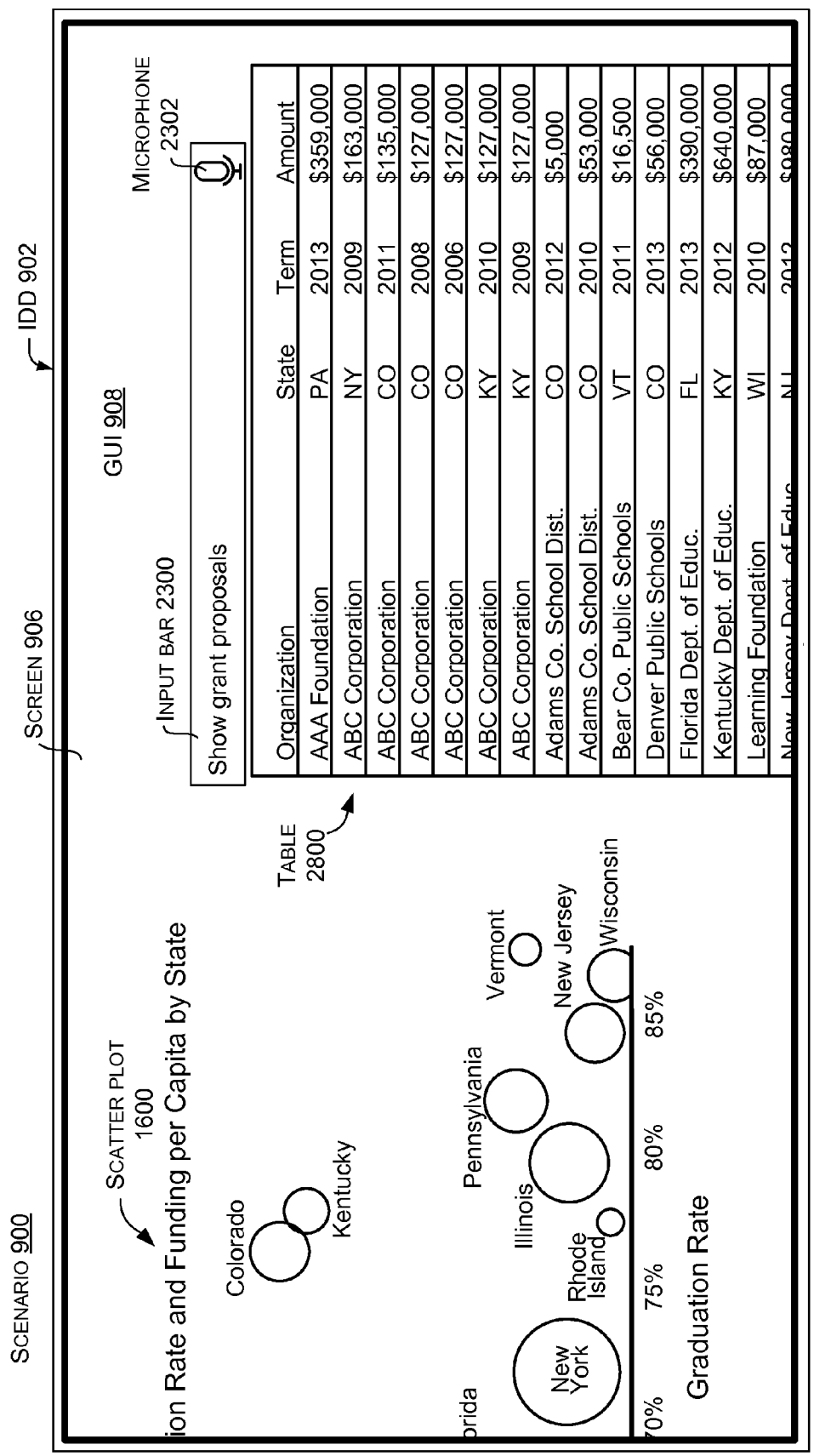
Figure 29:
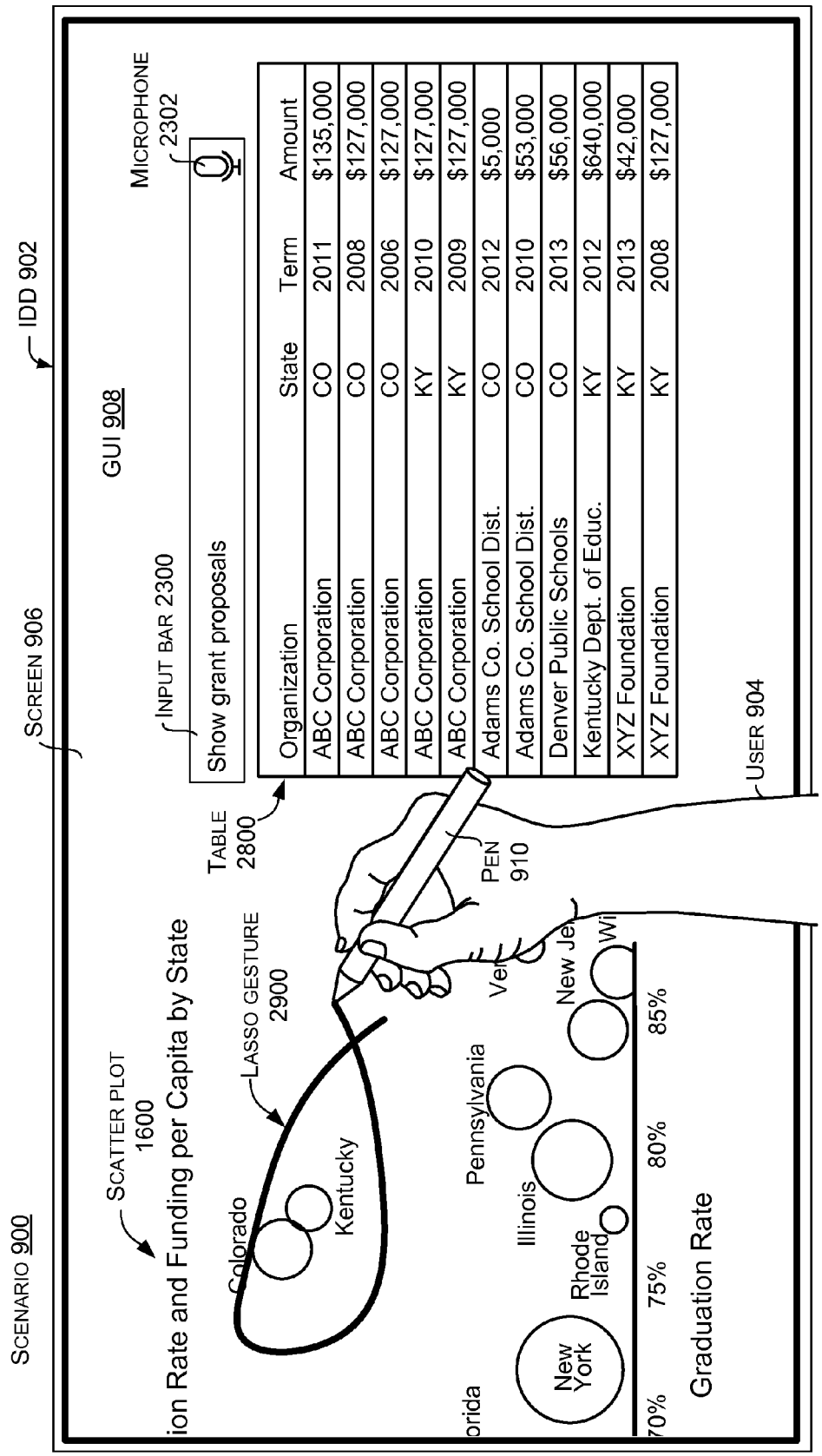

In the example shown in FIG. 28, the user 904 has entered "show grant proposals" to input bar 2300, and in response the interactive digital display 902 has automatically produced a new data visualization, table 2800. In some implementations, the interactive digital display can consider information associated with scatter plot 1600 and the words "show grant proposals" to generate a search string(s) to find data for the new data visualization. As shown in FIG. 29, the user can manipulate table 2800 by using a lasso gesture 2900 to filter data. In this example, the user can draw a loop around the data bubbles for Colorado and Kentucky (shown but not designated) in scatter plot 1600 with the pen 910, effectively "lassoing" these data. Responsive to the lasso gesture, the interactive digital display can cause only grant proposals for Colorado and Kentucky to be shown in table 2800.

Figure 30:
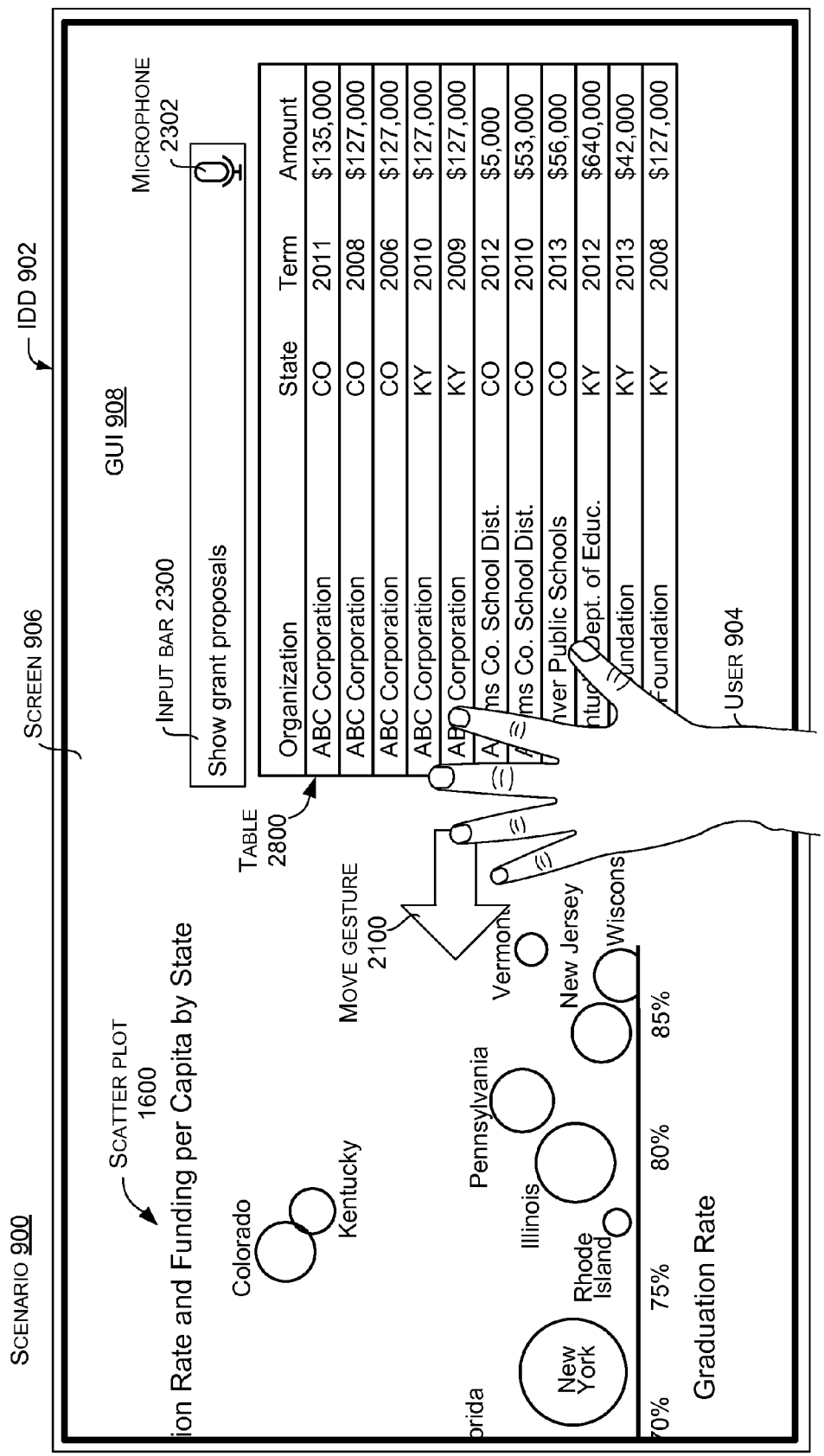

As shown in FIG. 30, the user can perform the move gesture 2100 to move table 2800 and scatter plot 1600 over to focus on the table and/or make room for the table on the GUI 908. In some implementations, the user can move one data visualization (e.g., the scatter plot) at a time, multiple data visualizations at a time, or move the entire GUI. Various methods for selecting and/or moving single objects, multiple objects, and/or the GUI are contemplated.

Figure 31:
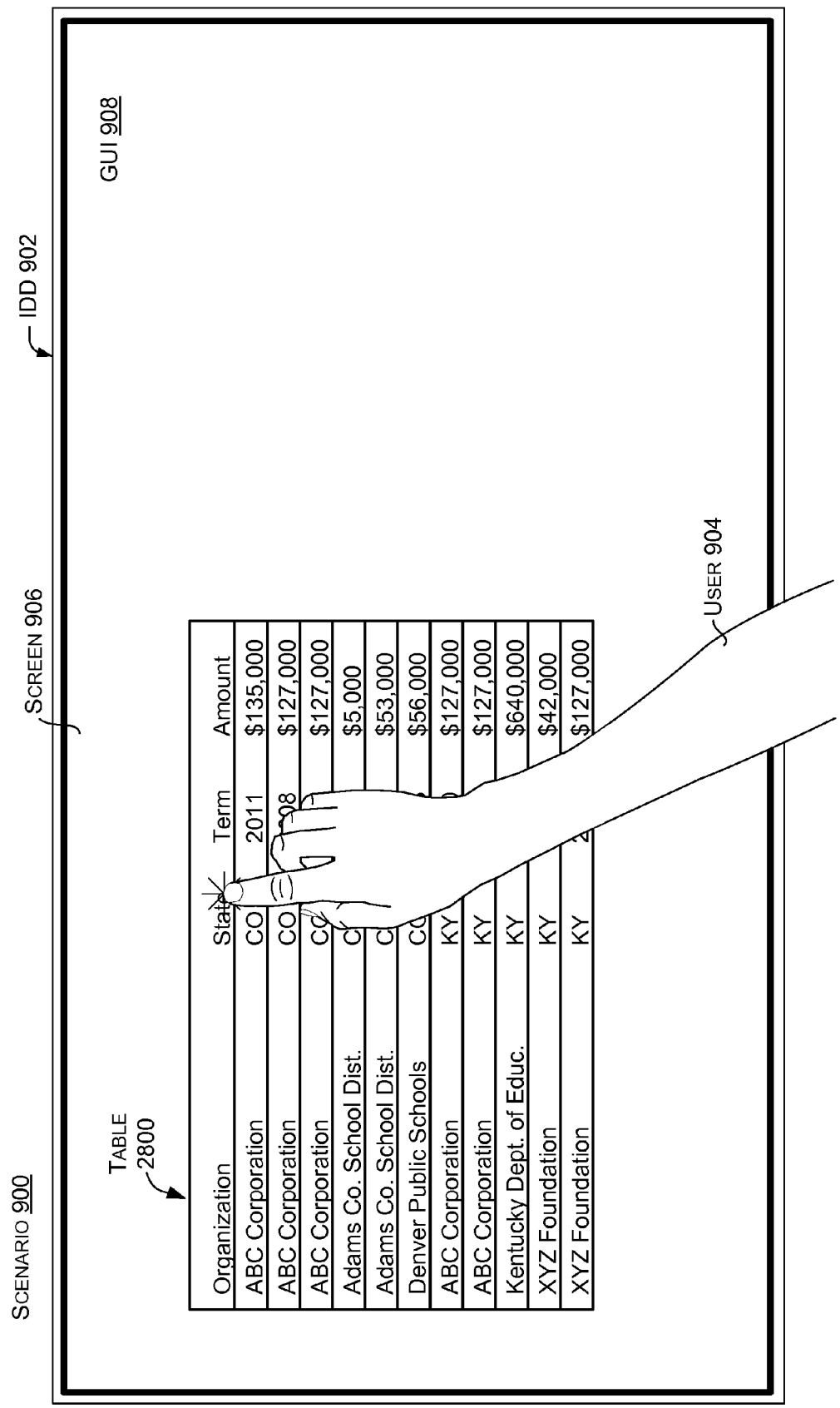

The user 904 can manipulate the table 2800, such as by sorting the table, as shown in FIG. 31. In this case, the user taps the column header "State" to sort the table. In response, the interactive digital display can sort the table alphabetically by state (shown but not designated). Alternatively, the user could tap or double-tap to select a column, then tap to sort the column. Or, the user could invoke a pull-down menu or toolbar for data manipulation or editing options, for example. In other implementations, selecting the header could allow the user to edit the header entries, or select different categories of data for the columns in the table.

Figure 32:
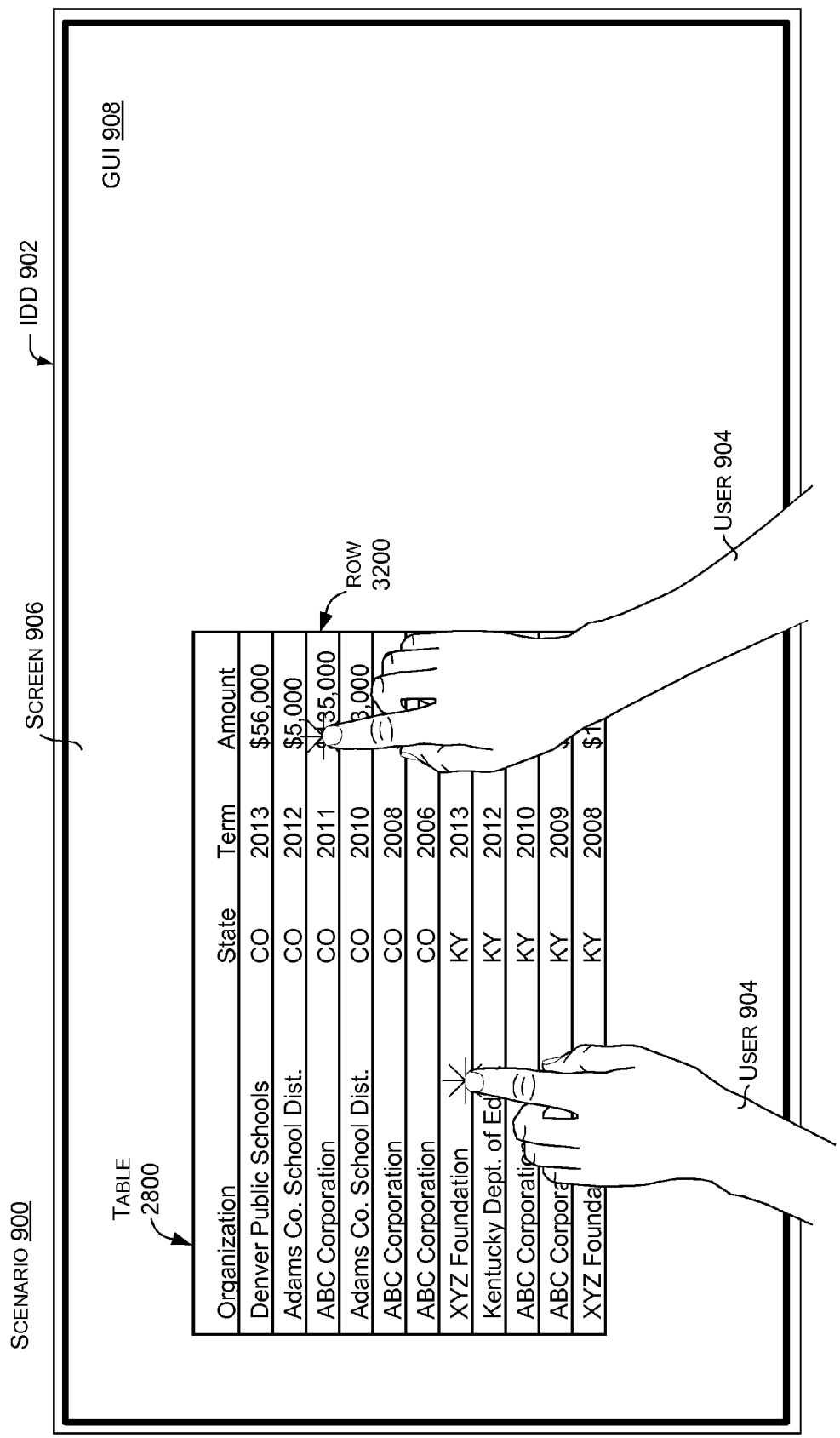

FIG. 32 relates to extraction of objects from a data visualization. In this case, the user 904 can touch and hold table 2800 to cause interactive digital display 902 to make certain elements of the table available as selectable objects. For example, row 3200 can be an individual selectable object. In some configurations, every row of the table can have a box around it. In the example in FIG. 32, the user can touch row 3200 with his right-hand index finger and drag row 3200 to an open space in the GUI 908, to the right. In some cases this can be termed an extraction gesture. Various gestures or other indications are contemplated for differentiating between moving a selectable object from different types of data visualizations as compared to other functions, such as moving the entire data visualization.

Figure 33:
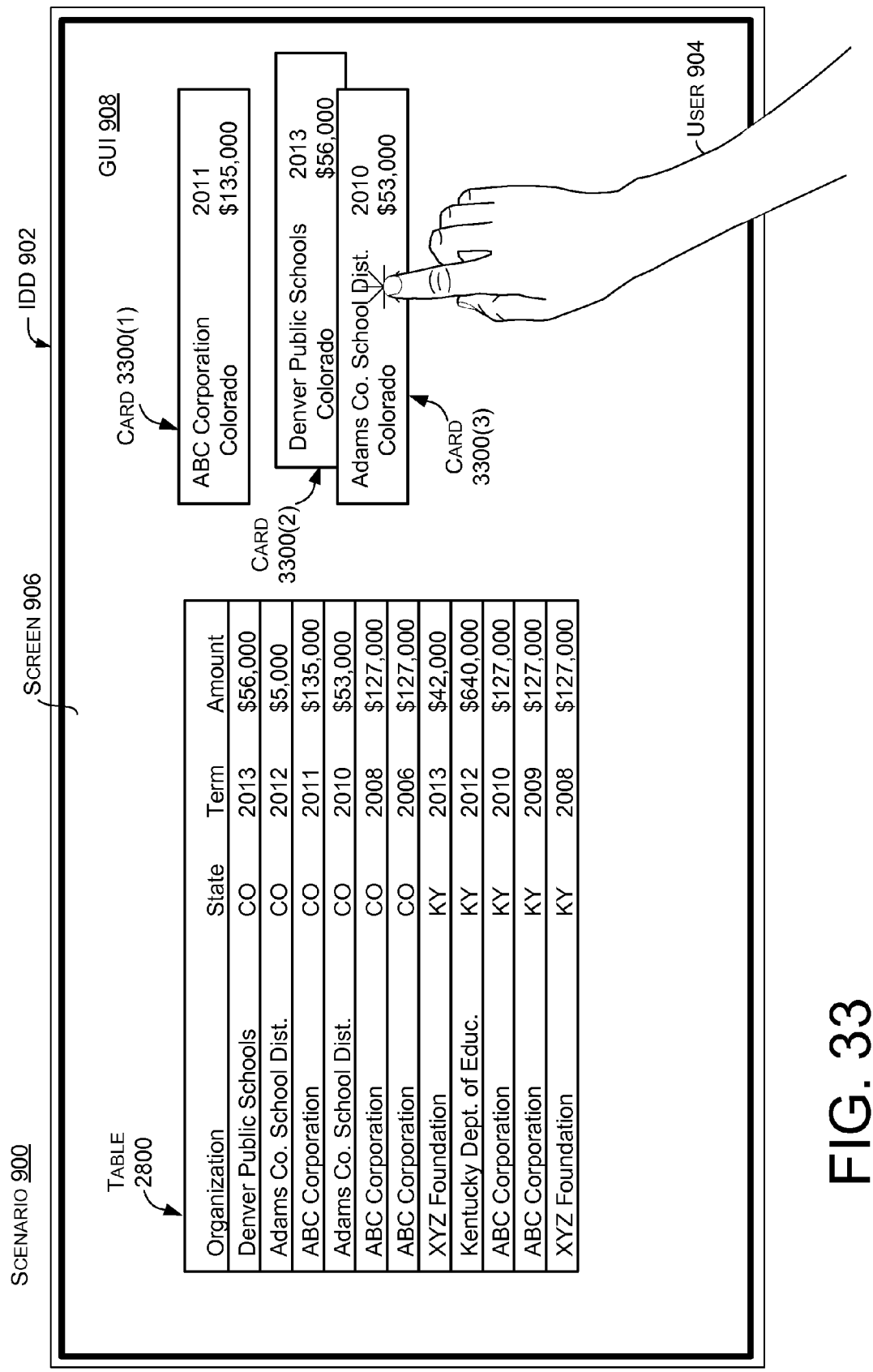

As shown in FIG. 33, extraction of row 3200 (FIG. 32) from table 2800 by the user can cause the interactive digital display 902 to show the extracted data from row 3200 in a new form, card 3300(1) in this case. In this example the user 904 has extracted three different rows from table 2800 to empty space in the GUI 908, where extracted data from those rows are now displayed in cards 3300(1), 3300(2), and 3300(3). In this case, the user has chosen to extract rows representing grant proposals for the year 2010 or later, and with grant values of $50,000 or greater. The extraction operation shown in FIGS. 32 and 33 is an example of how selectable objects from one data visualization can be extracted (e.g., pulled out) as an item in a different form. The extraction operation allows the user to interact with the data in a different, richer way. For instance, the user can now manipulate data in cards 3300(1), 3300(2), and 3300(3), as will be described below.

Figure 34:
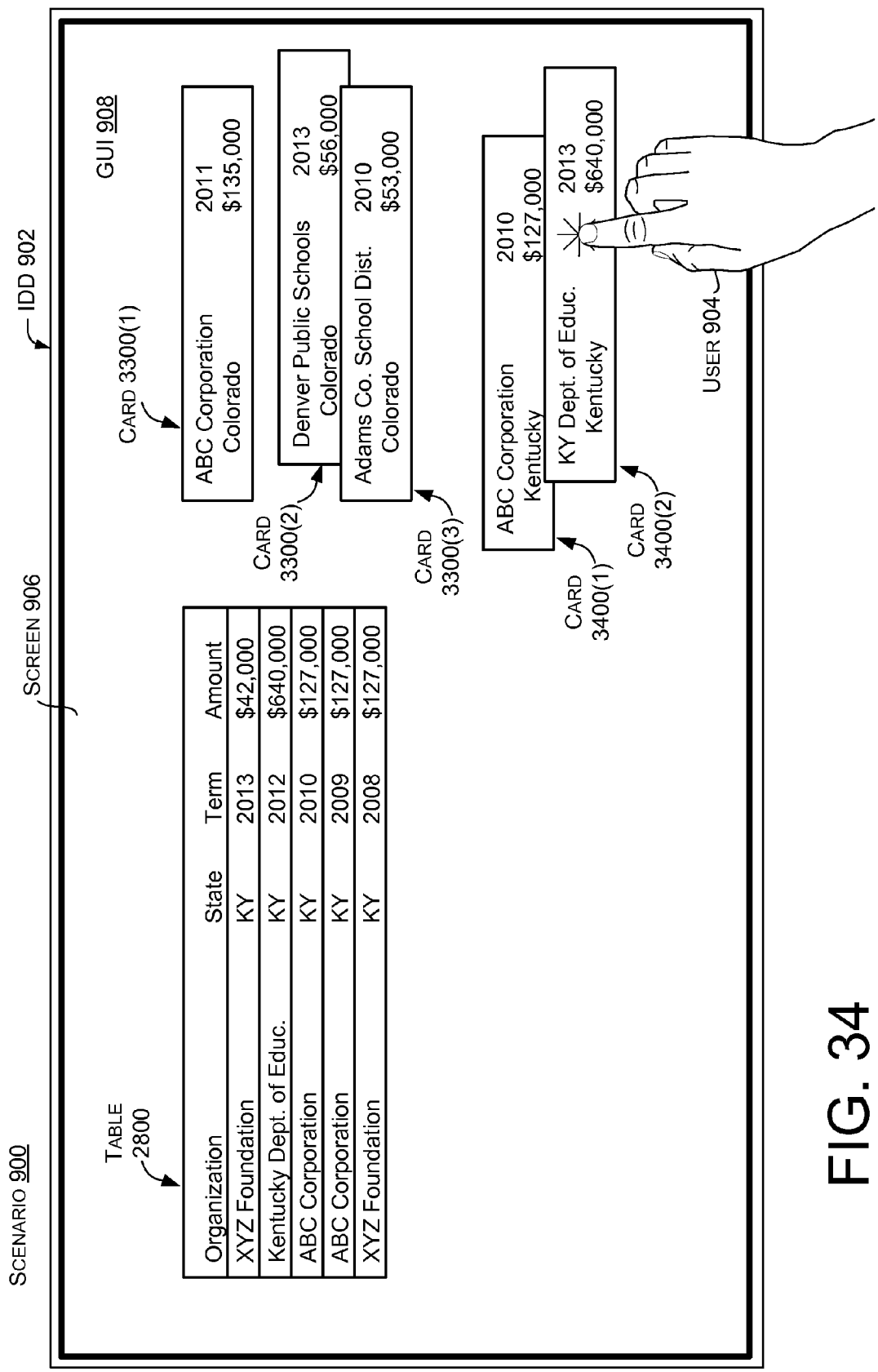

FIG. 34 shows an example of filtering table 2800. In this case, the user 904 has indicated that he wanted only data from Kentucky to appear in the table (not shown). In some implementations, the user can double-tap on Kentucky in table 2800 to make this indication. Other methods or ways of contracting or expanding data visualizations are contemplated. Continuing with the example in FIG. 34, the user can then sort table 2800, such as by tapping the "Term" column header (not shown). In this case, sorting the Term column can help the user locate data he wishes to extract, in other words, help the user locate data on grant proposals for certain years. The user can then extract cards 3400(1) and 3400(2), which contain data for grant proposals from the year 2010 and later, with grant values greater than $50,000. Interactive digital display 902 can now make cards 3300(1), 3300(2), 3300(3), 3400(1), and 3400(2), and the data the cards represent, available to the user for further manipulation via the GUI.

Figure 35:
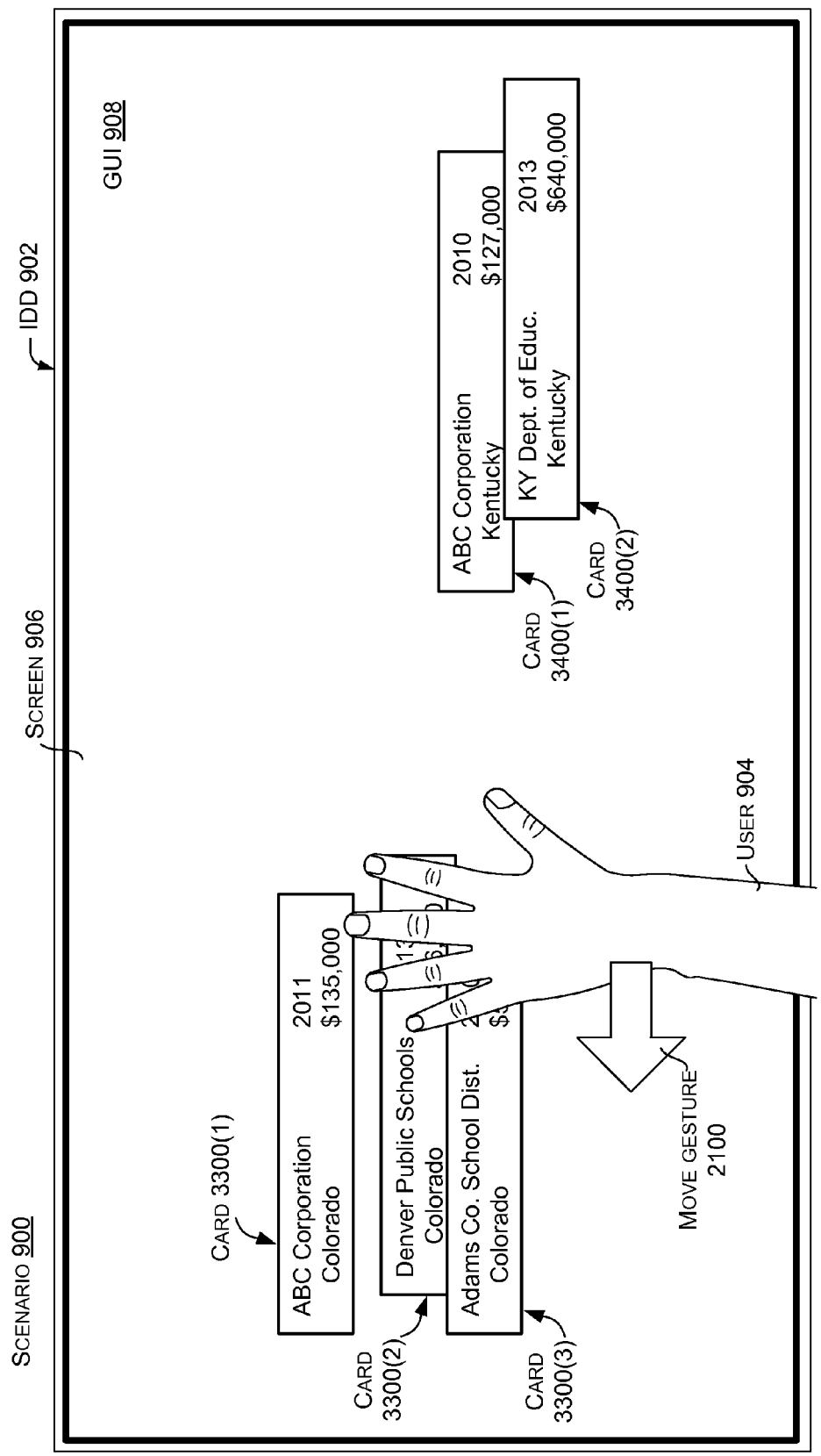
Figure 36:
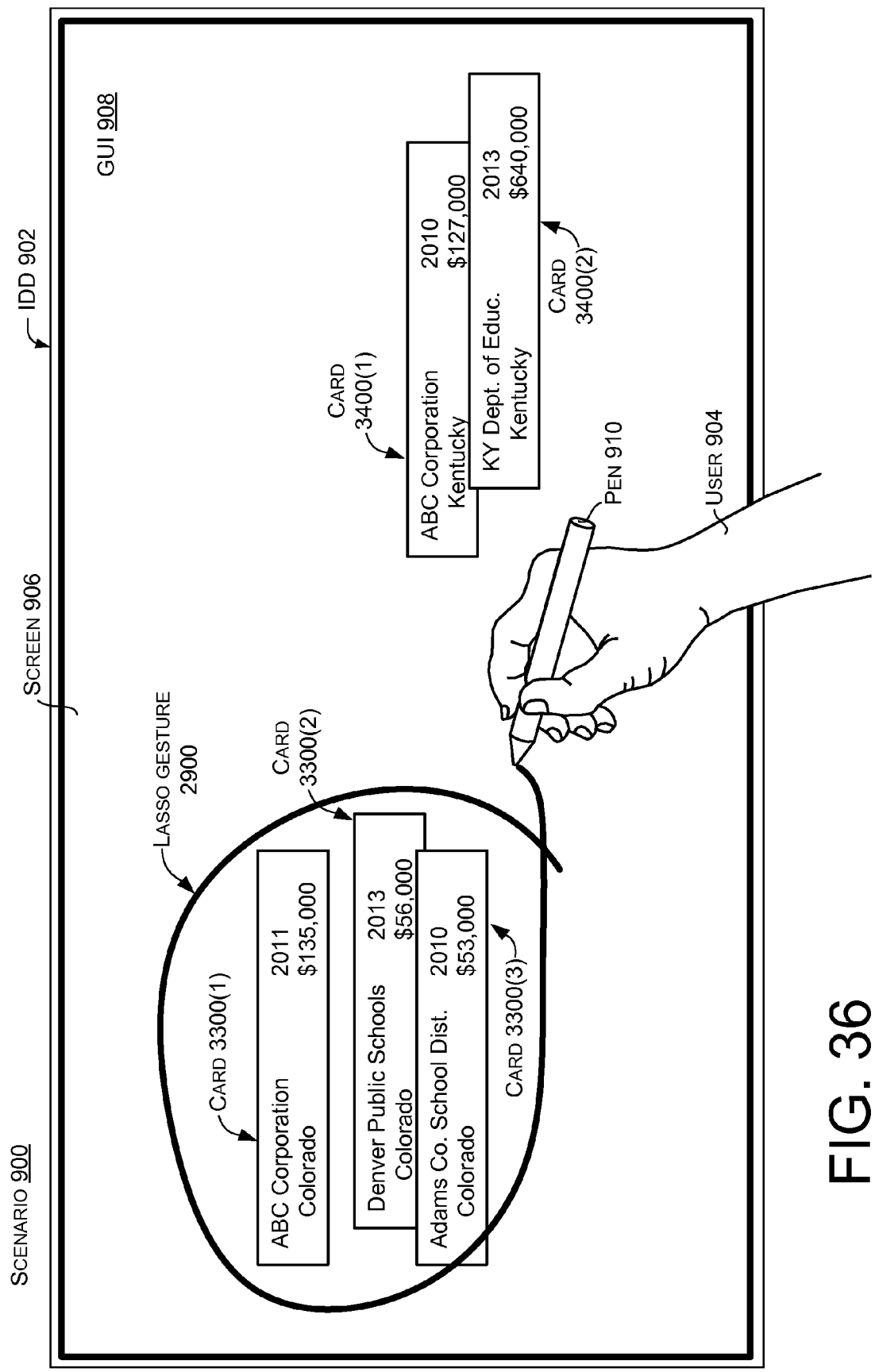
Figure 37:
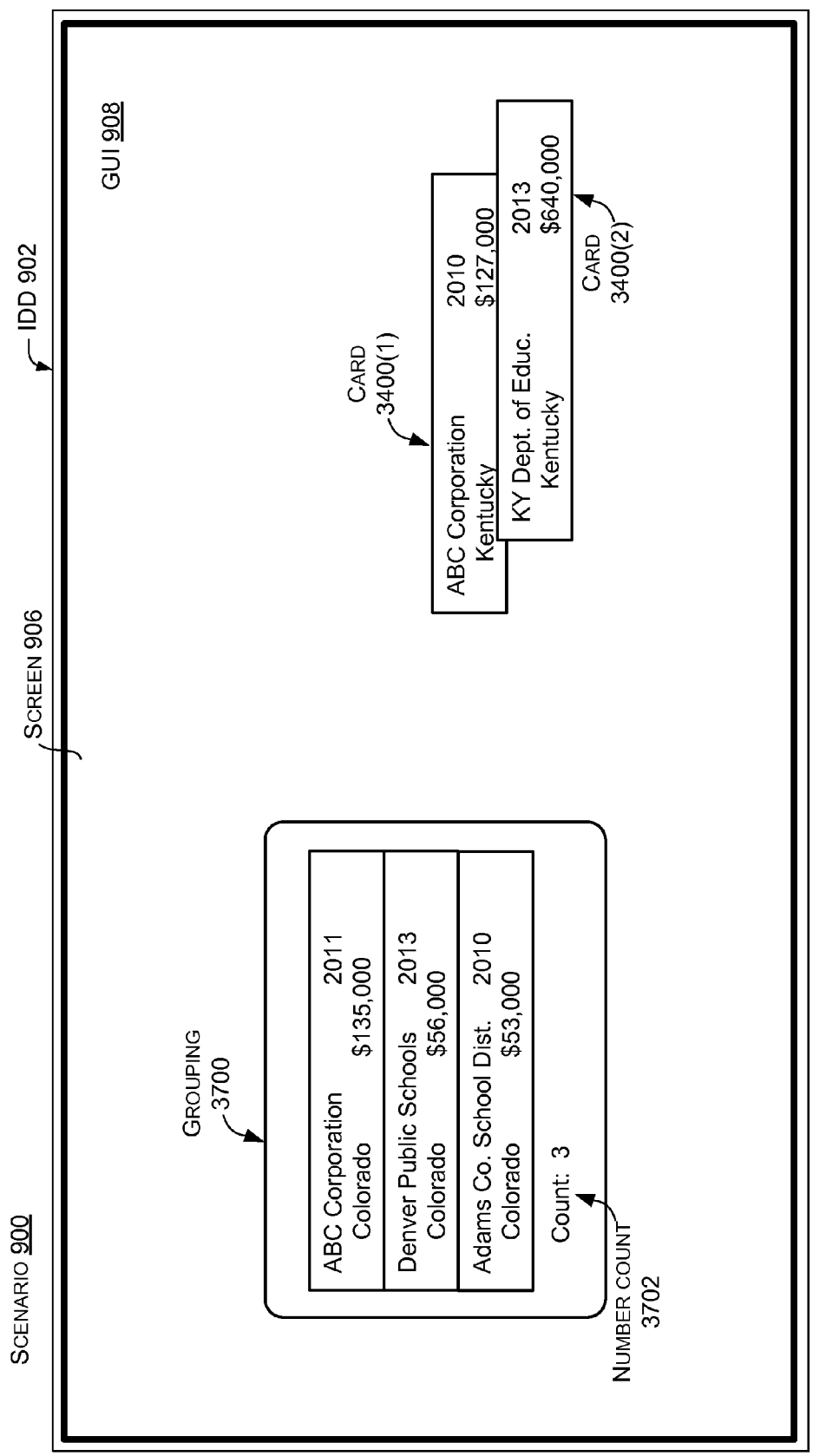

In the example shown in FIG. 35, the user 904 has removed table 2800 from GUI 908 (not shown), and can move cards 3300(1), 3300(2), and 3300(3) to the left with move gesture 2100. In FIG. 36, the user can perform lasso gesture 2900 by drawing a circle around the cards 3300(1), 3300(2), and 3300(3) using the pen 910. In this case, the lasso gesture causes interactive digital display 902 to arrange the cards into grouping 3700 (FIG. 37), which is another data visualization and offers new data analysis functionality. For example, as shown in FIG. 37, the grouping 3700 can display certain statistics relating to the group of data that were arranged together. Grouping 3700 includes a number count 3702, indicating how many items are in the group. Other statistics and/or data analyses are contemplated. For example, the total value of grant proposals in the group could be summed and displayed (not shown). Cards 3400(1) and 3400(2) can also be combined into a separate grouping, as will be shown below relative to FIG. 38.

In some cases the user 904 may wish to reduce the number of categories represented on the cards. For example, the user may want to find a commonality in one of the categories represented in different groupings of cards. A variety of ways to reduce the categories on the cards are contemplated. In one example, the user can double-tap a category on one of the cards in a grouping, such as the "Organization" category (see table 2800 in FIG. 34). The interactive digital display 902 can respond by reducing the displayed categories in all the cards of that grouping to the category that was double-tapped, as shown in grouping 3800 in FIG. 38. Alternatively, in other examples the user could have selected certain columns or only one column from table 2800 for extraction, rather than extracting all of the columns for each row.

Figure 38:
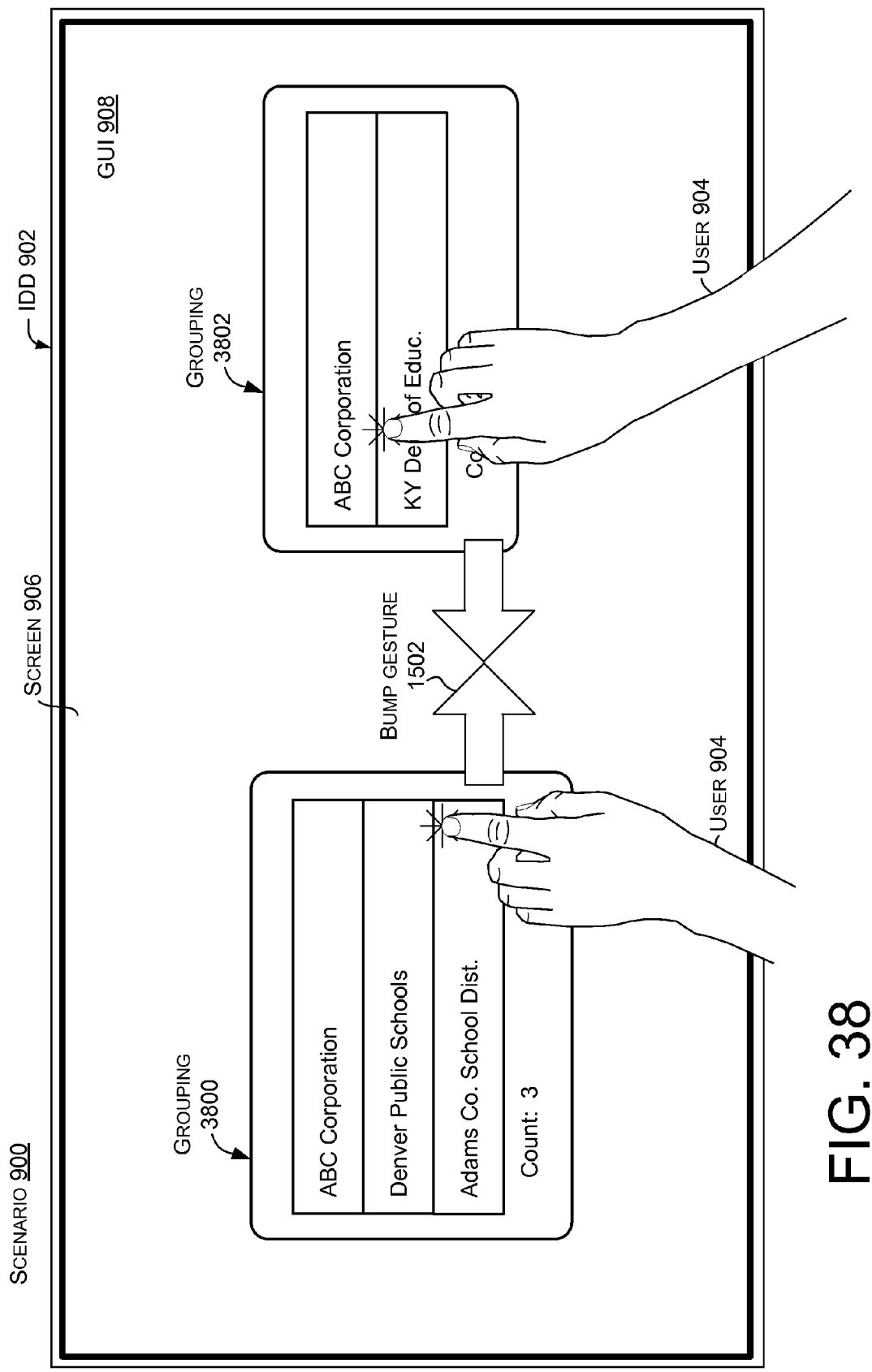
Figure 39:
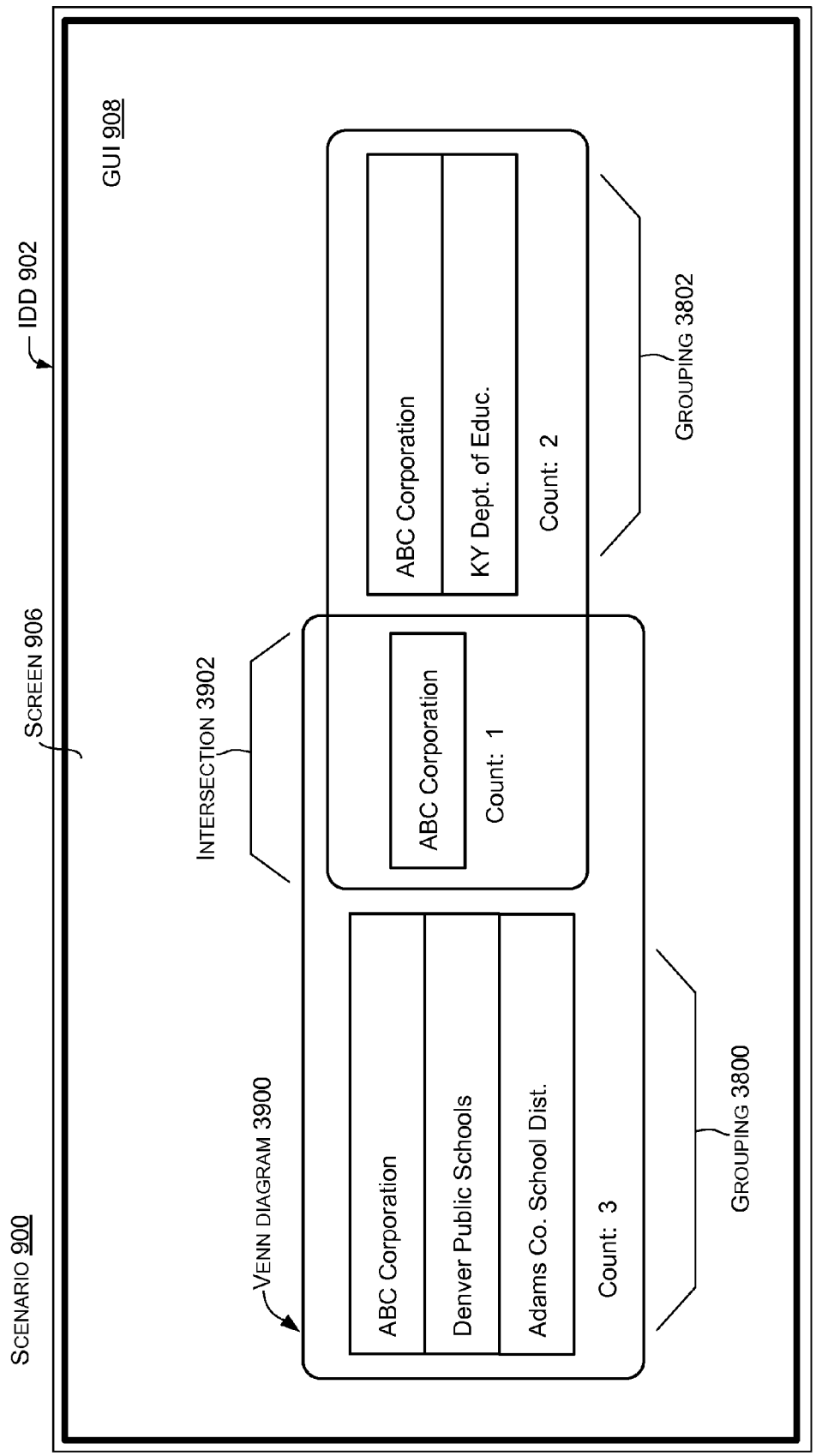

As shown in the example in FIG. 38, the user can combine cards 3400(1) and 3400(2) into grouping 3802 and can reduce the categories associated with these cards to the "Organization" category. The user can then choose to combine grouping 3800 and grouping 3802, such as to find a commonality between the two groupings, in this case by performing bump gesture 1502. The result can be a Venn diagram 3900, as shown in FIG. 39. Venn diagram 3900 is another new data visualization, a new way of viewing data from both grouping 3800 and grouping 3802. The interactive digital display 902 can automatically display Venn diagram 3900 on the GUI 908. The interactive digital display can automatically choose the format for the visualization (e.g., a Venn diagram), and can automatically choose parameters for the new data visualization. In this case, only one organization is common to both grouping 3800 and grouping 3802. Therefore, in this case the interactive digital display can cause one organization ("ABC Corporation") to appear in the intersection 3902 of the Venn diagram.

Figure 40:
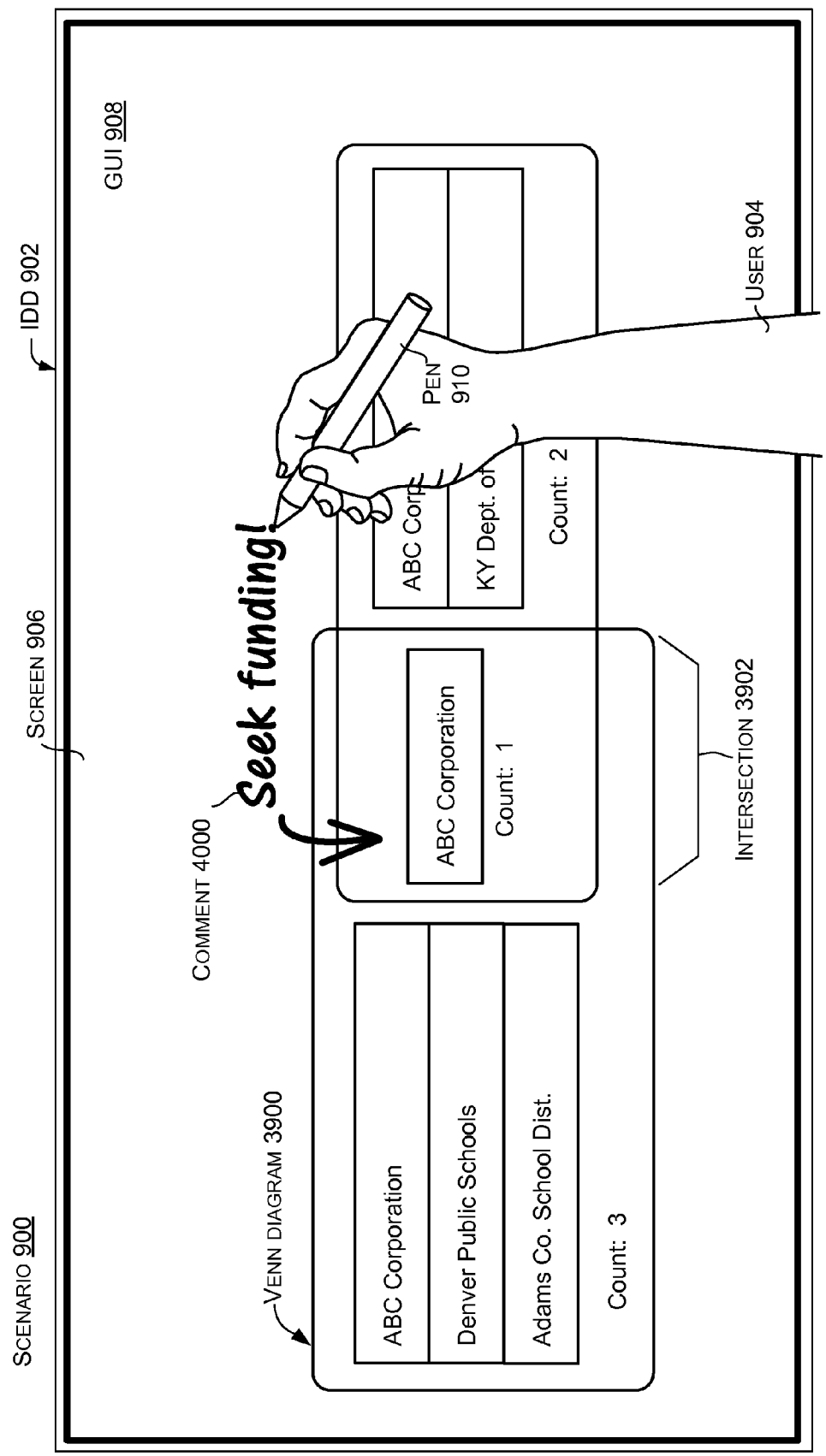
Figure 41:
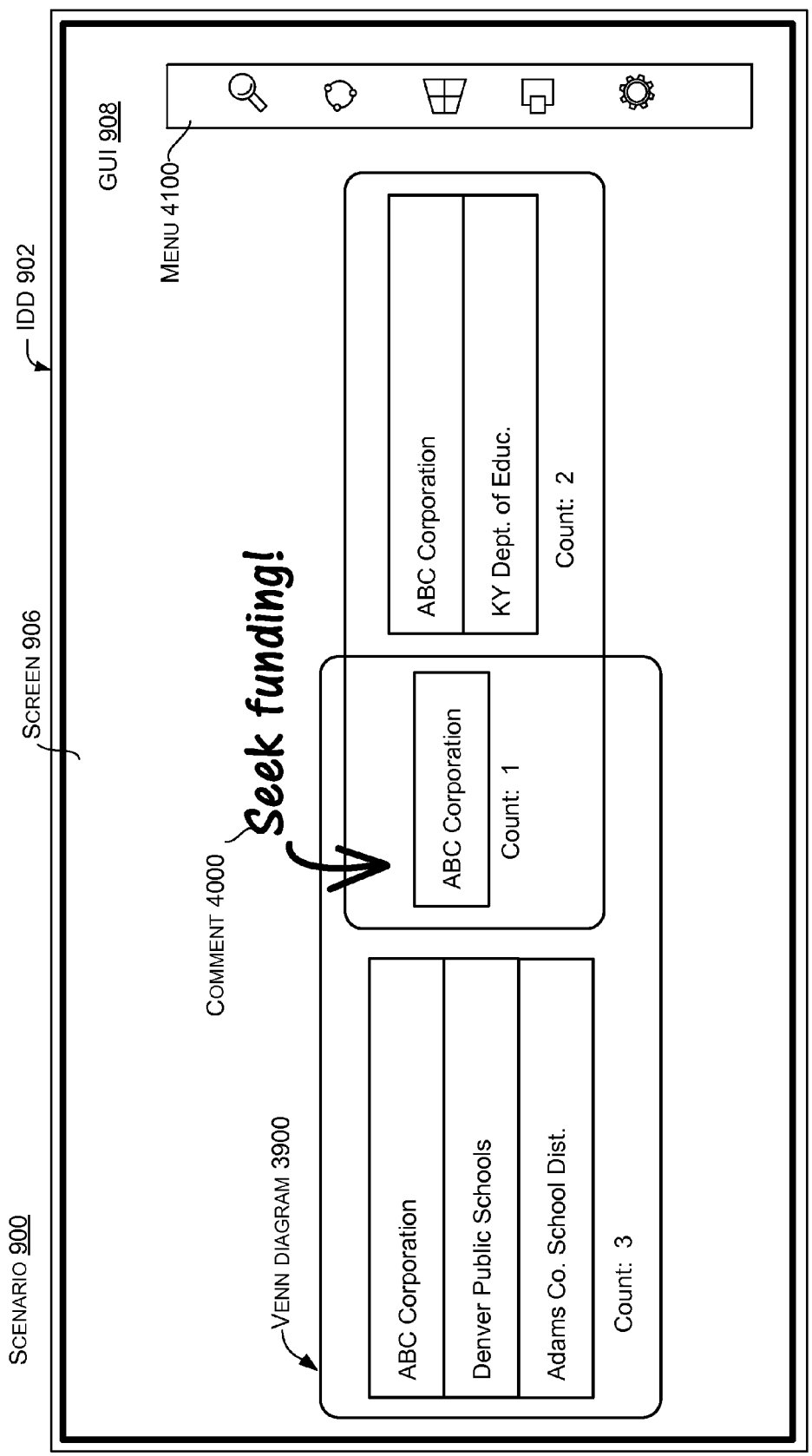

In some cases, the user 904 can reach a conclusion about interactive experience scenario 900 and can wish to share the conclusion and/or other elements of the interactive experience with others. As shown in FIG. 40, the user can add comment 4000 to the GUI 908, using pen 910 in this case. The comment can represent a decision about the data visualizations, such as a decision to seek funding from a certain organization. As shown in FIG. 41, the user can access a menu 4100. The user can access such a menu by a variety of methods, such as using a swiping touch gesture from the side of screen 906 or tapping a certain area of the screen (not shown). In other cases, menu 4100 can be visible and available at any time near one side of the screen.

In this example in FIG. 41, menu 4100 can include several icons, such as search, share, file exploration, export, or tools (shown but not designated). These icons or other icons can represent various functions offered by interactive digital display 902 in coordination with the data visualizations shown on GUI 908. For example, a share icon can be used to initiate an email function, in which the interactive digital display automatically attaches an image of the data visualization currently shown on the GUI to an email message. In this case, an image of Venn diagram 3900 with comment 4000 could be attached to an email message, and the user could be prompted to add other text to the email, choose a recipient, etc. In another example, an export or save icon could be selected to save the data visualizations to a file locally or over a network. Menu 4100 could also be used to access files to add content to GUI 908.

In some implementations the data visualizations currently shown on GUI 908 could be saved and/or shared via menu 4100. In other cases, other selected data visualizations could be saved and/or shared. Or, the entire interactive experience scenario 900 could be saved and/or shared as a video. Interactive digital display 902 can record the interactions as video that can be played back, or searched by time stamp to find something that was drawn and erased. Additionally, the video can be paired with audio for a recording of the meeting that could be viewed later. The interactive digital display can also be used as a portal for others to join and/or observe the interactive experience scenario in real time, such as by video conferencing.

Interactive experience scenario 900 described above relative to FIGS. 9-41 provides examples of the functionality retained in manipulated data visualizations via interactive digital display 902. Stated another way, bar chart 1100 and vertical bar chart 1500 were combined into a new data visualization (scatter plot 1600) that allowed further manipulation of the underlying data (see FIGS. 15-16). Additionally, selectable objects were extracted from table 2800 (FIG. 29), eventually leading to a new data visualization (Venn diagram 3900) that allowed further analysis of the underlying data (FIG. 39). In this manner, interactive digital display 902 can provide a richer experience for users, with virtually limitless progressions of data manipulation and/or analysis.

To summarize, in some implementations an interactive digital display can combine data from seemingly disparate data visualizations (two or more) into a third data visualization. In other implementations an interactive digital display can extract objects from data visualizations to create new data visualizations. Any of these data visualizations can be manipulated on a screen or surface through various forms of user input. This surface can be thought of as the GUI shell of an interactive digital display operating system. The GUI shell can function as a content container as well as an application container. It can act as both a surface for new content creation as well as a portal for accessing data over a network. It can also be where users interact with applications running locally (and/or remotely) on the interactive digital display device.

System Examples

FIGS. 42-46 show example systems for accomplishing the present concepts.

Figure 42:
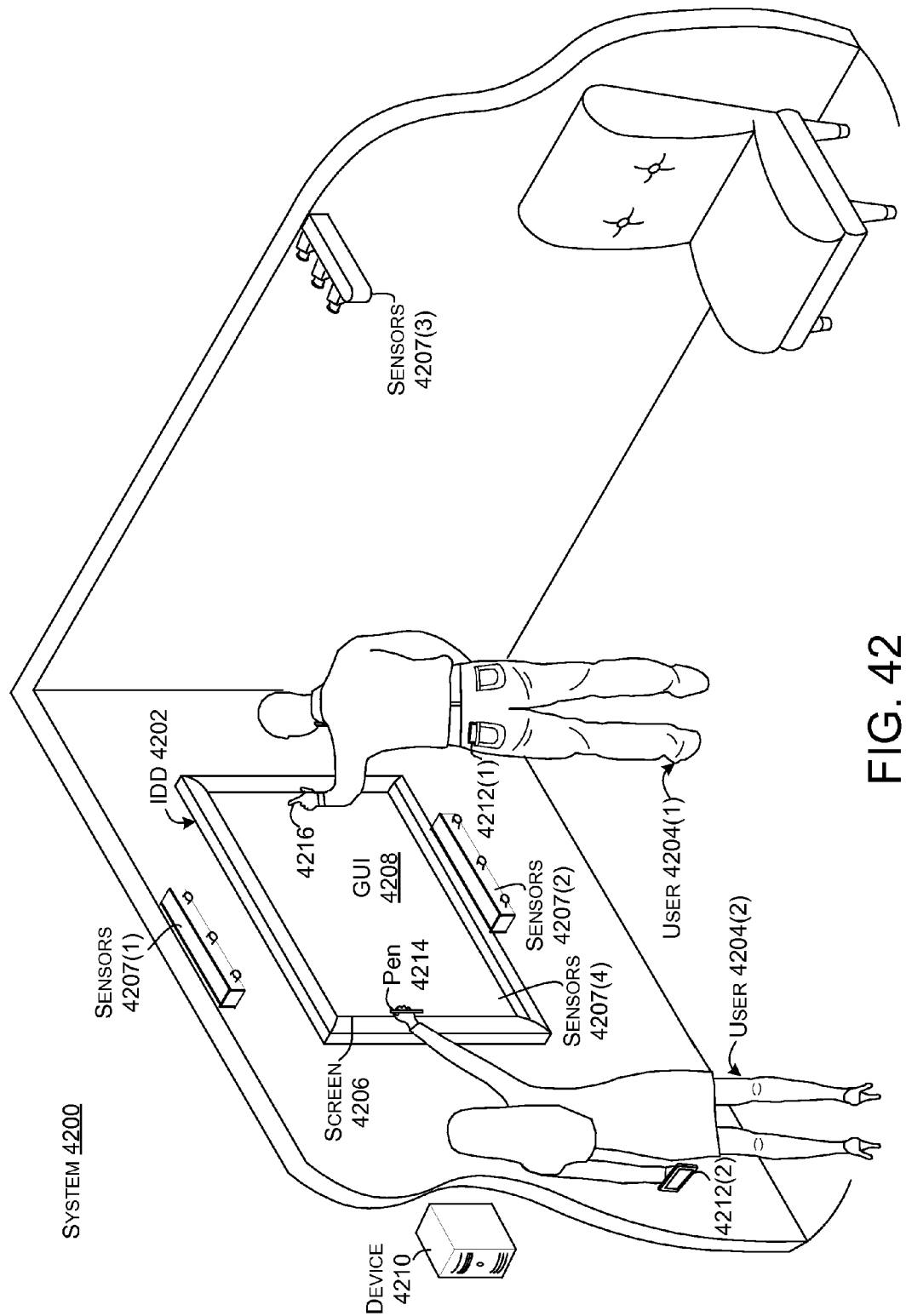
FIGS. 42-46 show example interactive digital display systems in accordance with some implementations of the present concepts.

FIG. 42 shows an example interactive experience system 4200. In this case, the system includes an interactive digital display 4202. One or more users 4204 can participate in an interactive experience with the interactive digital display 4202. The interactive digital display can include a screen 4206 (e.g., interactive surface) and multiple sensors 4207. (These sensors can be similar to sensors 516 introduced above relative to FIG. 5). This example includes four sets of sensors 4207. Graphical user interface (GUI) 4208 (e.g., display area, canvas) can be presented on the screen 4206.

Many types of sensors can be utilized in various implementations. This example includes optical sensors (e.g., sensors 4207(1)-4207(3) and pressure sensors 4207(4). (The pressure sensors 4207(4) can be integrated in the screen 4206 and as such are not readily visible). In this case, the first two sets of sensors 4207(1) and 4207(2) can be oriented to sense an area in front of the screen 4206. The third set of sensors 4207(3) can be oriented to sense an area directly in front of the screen 4206. The varying orientations of the sets of sensors can be intended to detect a user engaging the interactive digital display with user commands. In this case, the screen and the three sets of sensors are connected to a computing device 4210 (in this case not visible to the users) which performs processing for GUI 4208 associated with an interactive experience. Thus, in this implementation the interactive digital display 4202 can be manifest as a display device that is controlled by device 4210. Device 4210 can store the data, process the data and generate the GUI which is presented on interactive digital display 4202. An alternative configuration is illustrated relative to FIG. 43 where the interactive digital display can perform both sets of functions mentioned above.

Note that the present implementations are not limited to a specific type of screen 4206. In contrast, workable implementations can be accomplished with projection screens, light emitting diode (LED) screens, liquid crystal screens, electroluminescent screens, plasma screens, and/or other developing or yet to be developed display and screen types.

The first two sets of sensors 4207(1) and 4207(2) can detect that a user or users, such as users 4204(1), 4204(2), have entered the room in which the interactive digital display 4202 is positioned (or have otherwise entered an area of interest). In this case, the first two sets of outwardly facing sensors 4207(1) and 4207(2) can be positioned above and below the interactive digital display 4202 to detect user gestures, touch and/or eye gaze direction. Note that the number, position, and/or orientation of the first, second, and third sets of sensors 4207(1), 4207(2), 4207(3) is provided for purposes of example and is not intended to be limiting. It is contemplated that many other sensor arrangements can be configured to accomplish the present concepts. Further, while distinct and conspicuous sensors are illustrated, it is contemplated that the sensors will become smaller and less evident to the user as the technology matures. In some implementations, the sensors can be mounted on the outer frame of the interactive digital display. Alternatively, some implementations can have no sensors.

The first, second, and third sets of sensors 4207(1), 4207(2), 4207(3) can be cameras, such as arrays of cameras. The cameras can be configured for visible light, infrared, and/or other frequencies. The cameras may operate in cooperation with an infrared pattern projector that can aid the cameras to distinguish objects from one another. Other camera configurations may employ time of flight or other techniques to enhance information captured by the cameras about the user(s) and/or the environment around the interactive digital display 4202. In one implementation, the sets of sensors can be Kinect® brand sensing technology offered by Microsoft® Corp. In some implementations (not shown), a first set of cameras can point away from the screen 4206 and a second set of cameras can point parallel to the screen surface to sense user input (e.g., gestures). The second set of cameras can allow the screen to function as a touch screen without actually having a touch sensitive surface (e.g., that senses a user's physical touch). Other camera configurations can be employed such as those that image through the screen. One suitable camera for such a configuration is a wedge type camera that could be positioned in front of or behind the screen or to the side of the screen. This type of configuration can detect the user's fingers touching the screen and can also look at the user's hands, arms, eyes, etc. Biometric information obtained by the cameras can be interpreted as a user command. For instance, where the user is looking at on the shared canvas (e.g., user gaze) can be interpreted as a user command relative to content at that location, for example.

Referring again to FIG. 42, in some cases the first, second, and third sets of sensors 4207(1), 4207(2), 4207(3) can include subgroups oriented for different purposes. For example, the first set of sensors 4207(1) can include two subgroups. The first subgroup can be configured to capture a "near field" space directly in front of interactive digital display 4202. The second subgroup can be configured to capture a "far field" space that is more distant from the interactive digital display. The far field subgroup can be used to detect a user(s) entering a room in which the interactive digital display is located. The near field subgroup can be configured to capture biometric data from a user(s) engaging the GUI 4208.

Once a user 4204 has been detected, the sets of sensors 4207 can track the user's position relative to the screen 4206 and movements can be tracked to determine if the user is attempting a user command, such as writing on the screen, making a control gesture, etc.

Note also, that each of the users 4204 in FIG. 42 has a personal device 4212 (in this case a smart phone). The personal device can be utilized for entry of user commands and/or for user identification. The personal device 4212 can work alternatively or additionally to the sets of sensors 4207 to help detect user commands and/or identify the user(s). For example, user 4204(1) could enter a command on personal device 4212(1) which could be used by interactive digital display 4202 to manipulate data visualizations on GUI 4208. In another example, personal device 4212(2) could send out an identification signal, like a beacon signal that can be used by the system to identify user 4204(2).

Personal devices 4212 and pen 4214 may be leveraged in other ways. For instance, the personal device may send a capacitive signal through the user's body that can be detected by capacitive sensors when the user touches or is proximate to the interactive digital display 4202. This feature can be leveraged as multipath capacitive touch. For instance different fingers have different length paths. Some implementations could also add a conductive strip on the floor below the interactive digital display, so that user engagement of the interactive digital display completes a circuit through the interactive digital display and the conductive strip. Capacitance pens can be utilized in a similar manner, especially in instances where users have their own personal pens (e.g., personal devices) that are uniquely identifiable. Thus, pen 4214 can serve dual purposes as a digital writing instrument and to identify user 4204(2).

In a similar manner, when a touch user command is detected as designated at 4216, fingerprint (and/or other biometric) analysis can be used to identify the user performing the command. Fingerprint analysis can also identify which individual finger of the user is touching the screen and the orientation of the finger. This information can be utilized in various ways. For instance, if two users simultaneously touch a region of the board, the finger orientation (determined through the fingerprint analysis) can indicate which finger belongs to which user. For instance, fingerprints tend to be elongate along a length of the user's finger. Thus, the fingerprint can indicate the orientation of the user's finger and arm.

Figure 43:
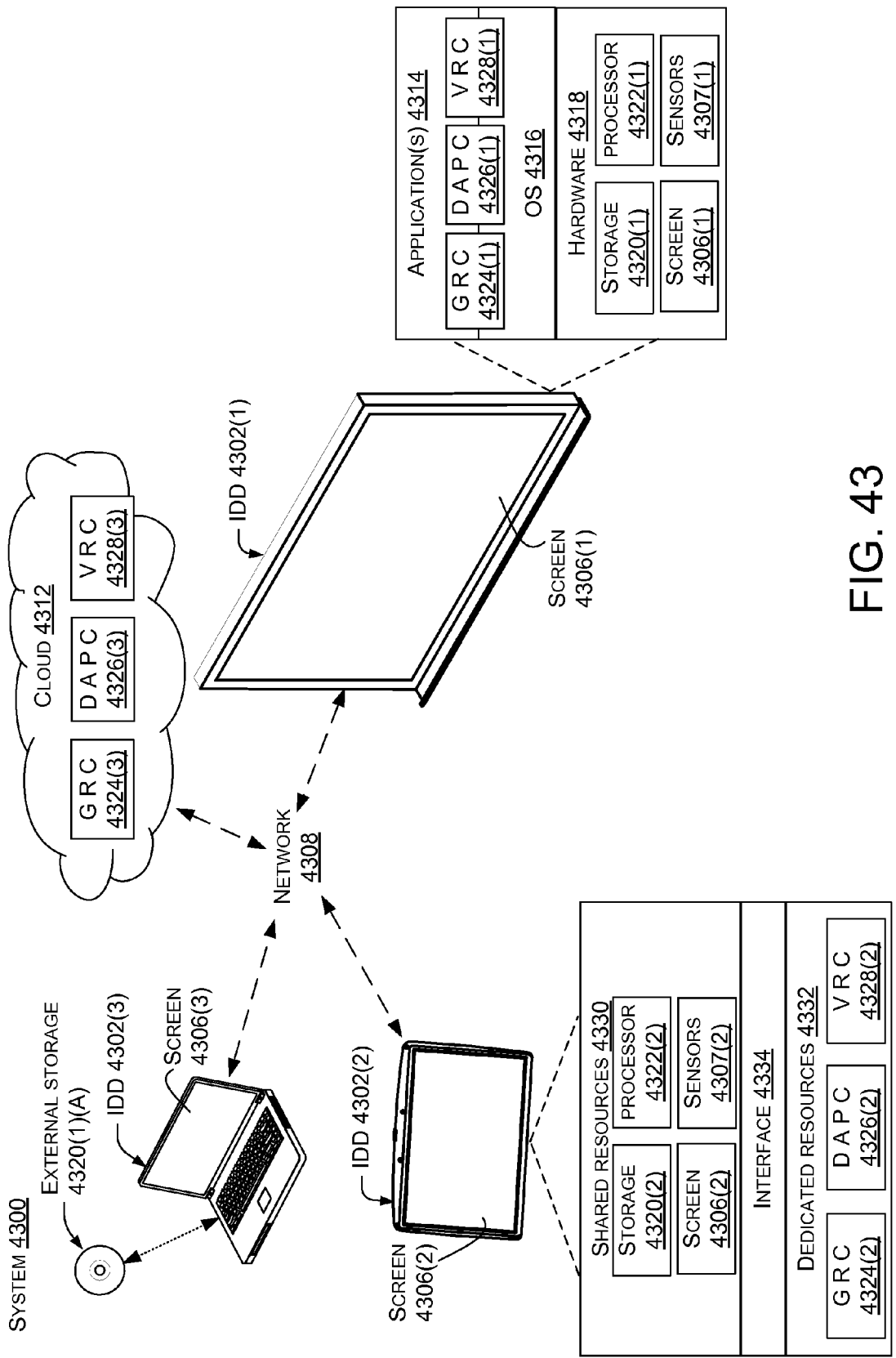

FIG. 43 shows another example system 4300 upon which interactive experience techniques can be implemented. Examples of several types of interactive digital display devices are illustrated relative to system 4300. For purposes of explanation, three interactive digital displays (IDD) 4302(1), 4302(2), and 4302(3) are illustrated. For sake of brevity only two of the illustrated devices are described in detail. This description can be applied to other devices. This description is also intended to provide examples of device configurations that can be employed to support interactive experience concepts. The skilled artisan will recognize other device configurations that can support the described interactive experience concepts.

In this case, interactive digital display 4302(1) is manifest as a digital whiteboard. Interactive digital display 4302(2) is manifest as a tablet type device. Interactive digital display 4302(3) is manifest as a laptop or notebook computer. The term "interactive digital display" as used herein can mean any type of device that has some amount of processing capability. While specific examples of such devices are illustrated for purposes of explanation, other examples of such devices can include traditional computing devices, such as personal computers, cell phones, smart phones, personal digital assistants, or any of a myriad of ever-evolving or yet to be developed types of devices. In this example, each interactive digital display includes a screen 4306(1), 4306(2), and 4306(3) (e.g., interactive surface) and sensors 4307. The sensors may be distinct and/or may be part of the screen (e.g., a touch sensitive screen). Sensors 4307 can be similar to sensors 4207 described above relative to FIG. 42 and are not discussed in detail here for sake of brevity. Briefly, sensors can detect user actions; touch and/or non-touch, in various implementations.

In system 4300, individual interactive digital displays 4302 can exchange data over a network 4308. Also, individual interactive digital displays can function in a stand-alone or cooperative manner to achieve interactive experiences. For instance, part of a functionality offered on an interactive digital display may be performed on the device and part may be performed on another device and/or in the cloud 4312. As used herein, the cloud 4312 refers to computing resources and/or computing functionalities that can be accessed over network 4308.

A multitude of different configurations can be created to implement an interactive digital display 4302 to accomplish interactive experience concepts. For purposes of explanation, examples of two possible device configurations are described below relative to interactive digital displays 4302(1) and 4302(2).

Interactive digital display 4302(1) includes an application(s) 4314 running on an operating system (OS) 4316. The operating system can interact with hardware 4318. Examples of hardware can include storage media or storage 4320(1), processor(s) 4322(1), screen 4306(1), and/or sensors 4307(1) (e.g., touch sensors). Further, a gesture recognition component (GRC) 4324(1), a data analysis and processing component (DAPC) 4326(1), and a visualization rendering component (VRC) 4328(1) can function in cooperation with application(s) 4314 and/or operating system (OS) 4316 and/or hardware 4318. In one configuration, these components 4324(1)-4328(1) can be manifest as an application, an application part, or as part of the operating system.

Processor 4322(1) can execute data in the form of computer-readable instructions to provide a functionality. Data, such as computer-readable instructions and/or user-related data can be stored on storage 4320(1). Storage 4320(1) can include any one or more of volatile or non-volatile memory, hard drives, and/or optical storage devices (e.g., CDs, DVDs, etc.), among others.

The interactive digital displays 4302 can also be configured to receive and/or generate data in the form of computer-readable instructions from external storage 4320(1)(A) that for sake of explanation can be thought of as external storage media. Examples of external storage media can include optical storage devices (e.g., CDs, DVDs, etc.), hard drives, and flash storage devices (e.g., memory sticks or memory cards), among others. The interactive digital displays may also receive data in the form of computer-readable instructions over network 4308 that is then stored on the interactive digital display for execution by its processor.

Interactive digital display 4302(2) has an alternative configuration that can be representative of a system on a chip (SOC) type design. In such a case, functionality provided by the interactive digital display can be integrated on a single SOC or multiple coupled SOCs. In this case, interactive digital display 4302(2) includes shared resources 4330 and dedicated resources 4332. An interface(s) 4334 facilitates communication between the shared resources and the dedicated resources. As the name implies, dedicated resources 4332 can be thought of as including individual portions that are dedicated to achieving specific functionalities. For instance, in this example, the dedicated resources include gesture recognition component 4324(2), data analysis and processing component 4326(2), and visualization rendering component 4328(2). In one case, circuitry on the SOC can be dedicated to the gesture recognition component 4324(2) while other circuitry can be dedicated to the data analysis and processing component 4326(2), and still other circuitry can be dedicated to the visualization rendering component 4328(2).

Shared resources 4330 can be storage, processing units, etc., that can be used by multiple functionalities. In this example, the shared resources include screen 4306(2) and sensors 4307(2). While in this case, gesture recognition component 4324(2), data analysis and processing component 4326(2), and visualization rendering component 4328(2) are implemented as dedicated resources 4332, in other configurations, either or both of these components can be implemented on the shared resources 4330 and/or on both the dedicated resources 4332 and the shared resources 4330.

Generally, any of the functions described herein can be implemented using software, firmware, hardware (e.g., fixed-logic circuitry), manual processing, or a combination of these implementations. The term "component" as used herein generally represent software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations. Generally, interactive digital displays 4302 can alternatively or additionally include other elements, such as, buses, graphics cards (e.g., graphics processing units (GPUs), network hardware), etc., which are not illustrated or discussed here for sake of brevity.

Gesture recognition component 4324 can be configured to receive sensed data from sensors 4307. The gesture recognition component can be configured to process the sensed data to recognize user gestures and/or other user commands. In one implementation, the gesture recognition component can analyze various parameters from the sensed data (e.g., sensed parameters). For instance, in a touch scenario sensed parameters can indicate that the user intended to select a dataset by touching the dataset or making a 'lasso' around the dataset. In a non-touch scenario, sensed parameters can indicate that the user 'hovered' his/her hand over a dataset to select the dataset. Other sensed parameters can relate to user actions relative to the selected data set. For instance, sensed parameters can indicate a velocity and/or direction that the user moved the selected dataset. Thus, by analyzing the sensed parameters, the gesture recognition component can determine that the user concurrently selected two datasets and moved them toward one another in a manner that the user intended to instantiate a bump gesture.

The data analysis and processing component 4326 can receive information about the selected dataset(s), the sensed parameters, and/or the user intent from the gesture recognition component 4324. The data analysis and processing component 4326 can be configured to analyze the selected dataset(s). More specifically, the data analysis and processing component can analyze the underlying data of the selected dataset(s) to determine a logical way to accomplish the user's intent. In some implementations, the data analysis and processing component can analyze various parameters relating to the underlying data (e.g., data parameters). For instance, the data analysis and processing component can determine what types of files, file formats, and/or document types are associated with the dataset(s).

In some cases, the data analysis and processing component 4326 can examine data within files or documents to find words, content, formatting, or other metadata, such as to find data that may be common to two or more files. For example, in response to the recognized bump gesture described above, the data analysis and processing component can retrieve and/or examine data underlying each of the two data visualizations that the user brought together. Referring again to the bump gesture shown in FIG. 15, the data analysis and processing component can determine that the two data visualizations that the user intends to combine have a common category, "State" in this case. The data analysis and processing component can use this common category to build a combined data set that can be used in a new data visualization. In another example, the data analysis and processing component can recognize that two datasets from two different visualizations that the user intends to combine each have a row of data with a common category. In this case, the data analysis and processing component can use the common category as a basis for a combination of the two datasets.

The data analysis and processing component 4326 can perform a variety of functions that correlate to the user intent, such as initiate information retrieval and/or data analysis associated with the gestures. For instance, the data analysis and processing component can respond to the user requesting new data, such as shown via the input bar 2300 in FIG. 28. In this case, the data analysis and processing component can search in local storage or over a network for data that correspond to the requested information. In some cases, the information request can be considered in light of other relevant information or data shown on the display. In another case, the data analysis and processing component can search for and provide new information in response to the user labeling an axis or changing an axis label, as shown in FIGS. 10 and 13. The data analysis and processing component can perform other functions related to the data, such as filtering the data (see FIGS. 29 and 31), extracting a subset of the data (see FIG. 33), or performing statistical analyses on the data (see FIGS. 37 and 39).

The visualization rendering component 4328 can be configured to generate and/or present new data visualizations or present commands associated with results obtained by the data analysis and processing component 4326 and/or the gesture recognition component 4324. Referring again to the bump gesture in FIG. 15, the visualization rendering component can take the combined data set generated by the data analysis and processing component and use it to generate a new data visualization, such as scatter plot 1600 shown in FIG. 16. In this case, using the combined data set, the visualization rendering component can select a scatter plot type chart, select data categories for axes, select appropriate scales and labels for the axes, select a chart title, and choose appropriate formats for all aspects of the scatter plot. In this case, the visualization rendering component can choose colors, fonts, orientations, line thicknesses, data point symbols, and all other visual aspects of the new data visualization. Finally, the visualization rendering component can output the new data visualization (scatter plot 1600 in this case) to the screen 4306 for display. In some implementations, the visualization rendering component can make the complete new data visualization appear when it is generated, can make each component of the new data visualization appear as it is generated, or can animate the transformation from the original two data visualizations to the new data visualization in some other way.

In some cases, the user intent or new visualization format may be inferred from past user actions. For example, if a user has recently combined multiple sets of bar charts, each time specifying that a pie chart be generated from one of the sets of bar charts, the visualization rendering component 4328 may automatically provide a pie chart from the next set of bar charts the user intends to combine. The gesture recognition component 4324 and/or data analysis and processing component 4326 may also make similar inferences from past user actions.

Another example of possible functions of the various components includes processing a user intent to extract a row of data from a table. In this instance, the gesture recognition component 4324 can receive information from sensors 4307 and recognize that a user has selected a table (such as shown with respect to table 2800 in FIG. 32), selected a row of the table, and "dragged" the row out of the table to an open area of the display (such as shown with respect to row 3200 in FIGS. 32 and 33). In this case, velocity and/or direction information from the sensors regarding the drag motion associated with the selected row can be interpreted by the gesture recognition component as a row extraction gesture, e.g., the user intends to extract the row of data. The data analysis and processing component 4326 can determine which data are associated with the selected row and extract those data for use in a new data visualization. For example, the data analysis and processing component can determine how many and/or which categories are represented in the row, extract the data from the row, and/or create a new subset of the data from the row. Further, in some cases the extracted subset may contain only the data visible within a row of a data visualization, or may contain associated information, such as the category or heading information for each column from the table or other metadata that may not be visible to the user. The visualization rendering component 4328 can use the extracted subset of data to create a new data visualization, such as card 3300(1) in this case.

Stated another way, the gesture recognition component 4324 can receive information from the sensors 4307, recognize gestures or other commands from the information, and interpret user intent from the gestures or other commands with respect to data visualizations. The data analysis and processing component 4326 can determine a logical way to combine or otherwise process the data from the data visualizations in accordance with the user intent. The visualization rendering component 4328 can determine a logical way to present the processed data in one or more new data visualizations and output the result to screen the 4306.

Figure 44:
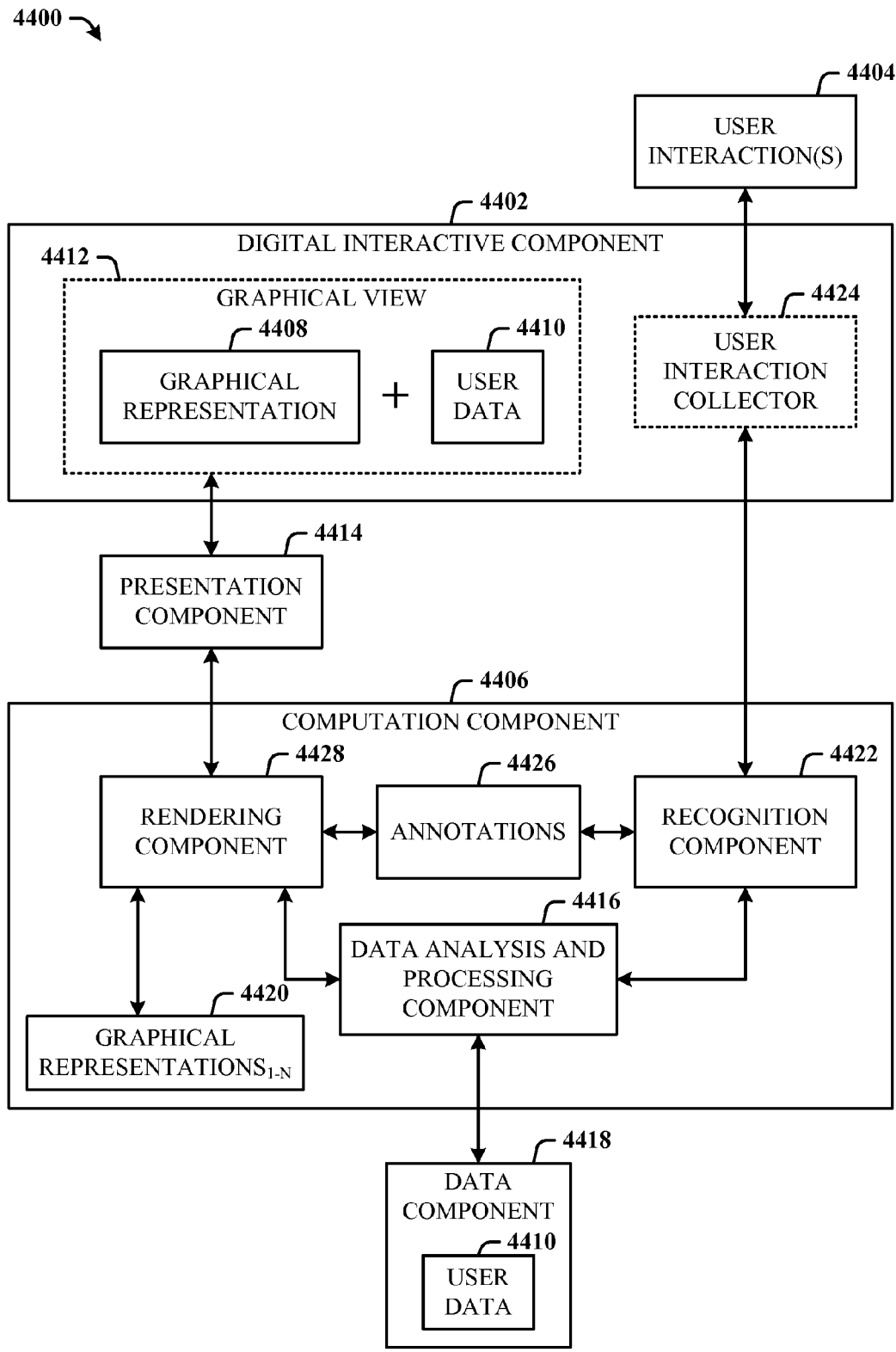
Figure 45:
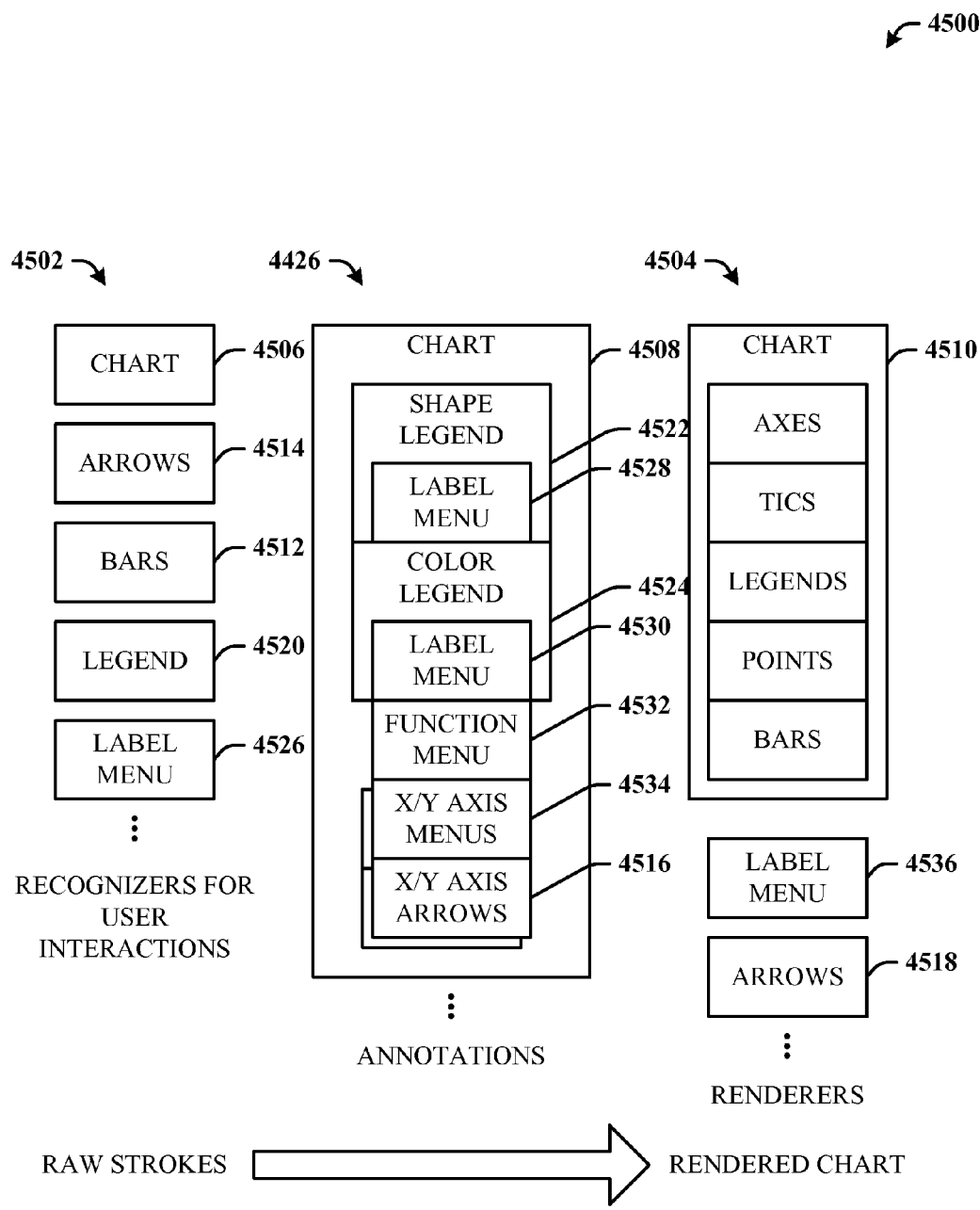
Figure 46:
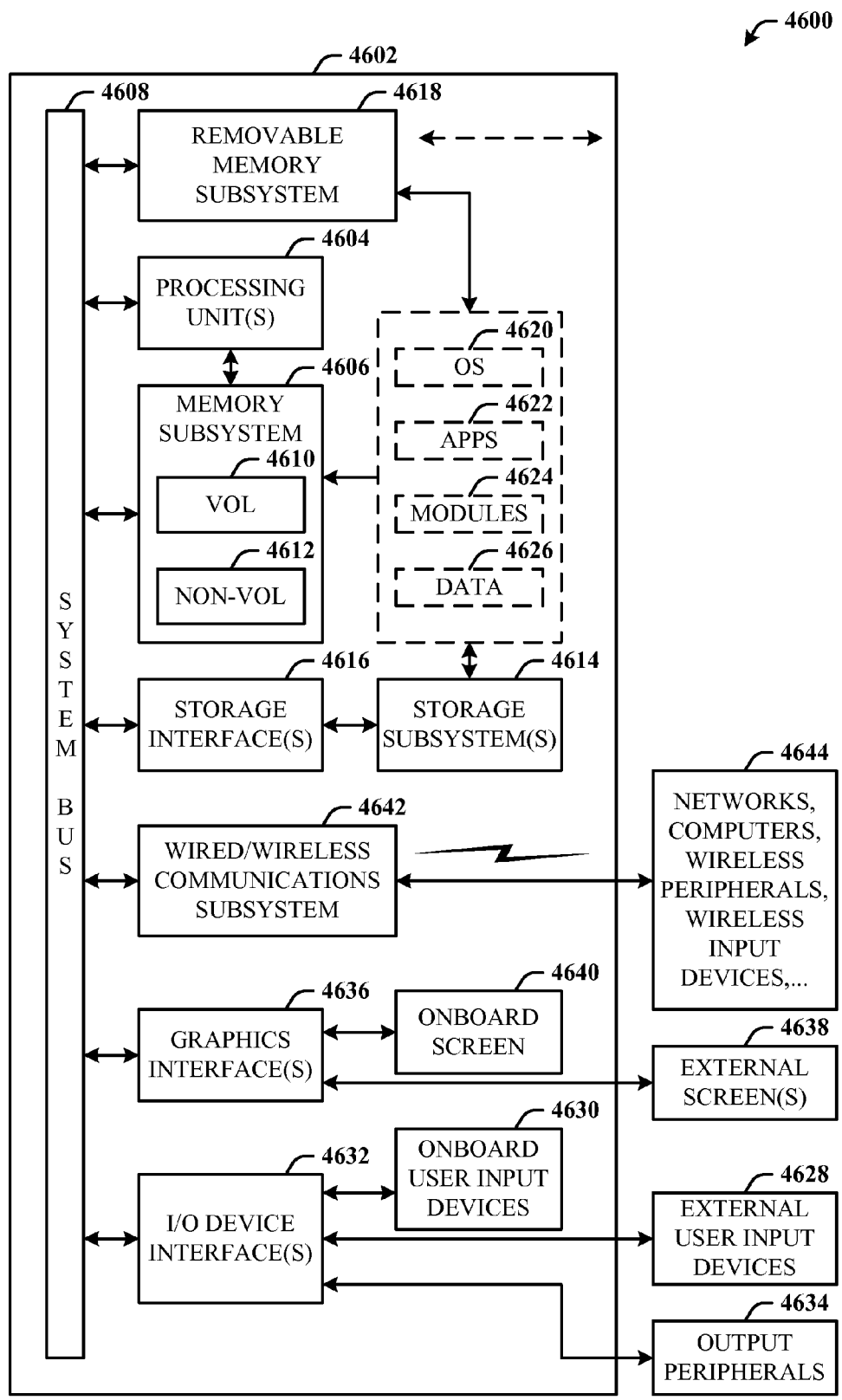

FIGS. 44-46 show other example systems in accordance with the present concepts.

FIG. 44 illustrates a presentation system 4400 in accordance with the disclosed architecture. The system 4400 includes a digital interactive component 4402 that receives user interaction 4404 and processes the user interaction 4404 as, for instance, a stroke. It is to be understood that the stroke can be the result of many different types of input modalities as mentioned above. The digital interactive component can be similar to the gesture recognition component 4324 described above. A computation component 4406 (e.g., computer-based component separate from the interactive component 4402) interprets the user interaction 4404 as related to a graphical representation 4408 (e.g., arrow, chart, legend, etc.), and optionally, performs an operation on user data 4410 based on the stroke, to create an overall graphical view 4412 of the user data 4410 and the graphical representation 4408 which can be in combination with the applied stroke. The computation component 4406 can also manage (e.g., retrieve and generate) annotations as described herein. In some cases, the computation component can perform functions similar to the gesture recognition component 4324, the data analysis and processing component 4326, and/or the visualization rendering component 4328 described above.

The user data 4410 is shown as the graphical representation 4408 to simply convey that the qualitative and/or quantitative information user data 4410 can be characterized by the graphical representation 4408 that can be a set of graphical objects. In an alternative implementation, it is within contemplation of the disclosed architecture that some or all of the user data under observation can be presented in its raw or tabular form, separately or in combination with the graphical representation 4408 via the digital interactive component 4402.

The graphical representation 4408 can be provided by the computation component 4406 as comprising one or more graphical objects (e.g., the axes of a chart, tic marks, etc.). For example, where the user input is a raw stroke (e.g., hand sketched on a display surface using marker pen) intended to be an arrow, the computation component 4406 can capture this input and render the same stroke as a graphical object in the graphical view 4412. Thus, the raw stroke can be rendered in its rough (captured as a freeform unstraightened, unsymmetrical, etc.) format as manually created by the user, proximate to the raw stroke on the board surface.

Alternatively, the raw stroke can be presented as "cleaned-up" (e.g., straight, symmetrical at the points, etc.) arrow object by the computation component 4406 retrieving a predetermined and stored arrow object that is accessed and then presented in the graphical view 4412. In any case, the resulting graphical view 4412 can include only the raw stroke, only the rough stroke, only the cleaned-up stroke, or any combination thereof.

A presentation component 4414 receives rendering information from the computation component 4406 and presents this rendering information in the graphical view 4412 as comprising the stroke (rough or cleaned-up), labels, lists, and other graphical objects, interactive or otherwise, in association with the digital interactive component 4402. In other words, the graphical view 4412 can be projected onto the digital interactive component 4402, which can be a digital whiteboard, by a projector, which is the presentation component 4414. In some cases, the presentation component can be similar to the visualization rendering component 4328 described above.

Where the digital interactive component 4402 is a pen-based display or touch-based display, for example, the presentation component 4414 can be part of the computation component 4406 or part of the display such that the graphical view 4412 can be presented via the display capabilities of the pen-based or touch-based display.

The computation component 4406 can include a data analysis and processing component 4416 that can access the user data 4410 through a data component 4418. The data component 4418 can be a database on a server, distributed database, files on a local client, in-memory data, etc., that makes available the user data 4410 (e.g., dataset) for manipulation and interaction via one or more of graphical representations 4420 (e.g., the graphical representation 4408). In yet another implementation, the data component 4418 can be part of a cloud computing infrastructure.

The graphical objects are the objects used to digitally render or display a chart axis, tic marks on an axis, text, dimensions, a captured user stroke, a box, a line, etc. The graphical objects can change and/or update based on one or more of the user interaction(s) 4404. In contrast, the user data 4410 is the data which the user desires to examine (e.g., sales data, financial data).

With respect to user interaction, if the user interaction 4404 is to change the scale on the y-axis of a graphical representation such as a chart, the data analysis and processing component 4416 adjusts the scaling of an axis according to a stroke that the user applies to an axis. Additionally, the data analysis and processing component 4416 processes the dataset (user data 4410) under inspection by the user according to the new user interaction 4404.

Note that graphical objects can be associated with an application (e.g., charting program, operating system) that provides the capability to perform graphic and charting generation and manipulation, as well as to provide extensibility to add new options for processing and presenting new graphical representations.

As previously described, the digital interactive component 4402 (e.g., active or passive visualization surface) can be a digital whiteboard, interactive display surface, touch surface, pen-based surface, or simply a computer monitor via which the user interacts using a mouse or other pointer-driven user input device, for example, and include the appropriate software (e.g., presentation, operating system, charting/graphing, etc.) to assist the particular digital interactive component 4402 to recognize and process the user interaction.

The data analysis and processing component 4416 (e.g., a computer subcomponent) performs data analysis by applying data analysis functionality (e.g., operations that includes function(s), delete, filter, mathematical operations, scale, etc.) on the user data 4410 in response to the user interaction 4404. For example, if the user applies a stroke to the y-axis of a chart that then is inferred by the system 4400 to establish the scaling for that axis, the system 4400 automatically applies the remaining tic marks for the y-axis. The data analysis and processing component 4416 then automatically performs data analysis on the dataset under inspection (the user data 4410) to fit the chart (the graphical representation 4408).

The presentation component 4414 (e.g., projector system, display surface, touch surface, pen-based surface, etc.) presents the one or more graphical objects in association with the graphical representation 4408 as changed by the operation. In one implementation, the user interaction 4404 is captured and interpreted from the digital interactive component 4402 which is a whiteboard, and then once processed (e.g., inferred) to determine the user intended to draw a graph, the resulting graphical objects are then projected (by a video or camera system) onto the whiteboard for visualization by the user and other viewers in accordance with characterizing the user data 4410 according to the desired dimensions and formats.

In another example, the user interaction 4404 is captured and interpreted from the digital interactive component 4402 which is a touch-based surface or display, and then once processed (e.g., inferred) to determine the user intended to draw a graph, the resulting graphical objects are then presented via the touch-based device (display) for visualization by the user and other viewers (local and/or remote) in accordance with characterizing the user data 4410 according to the desired dimensions and formats.

Note that the graphical representation 4408 is just one of many of the graphical representations 4420 that can be employed and utilized. For example, the graphical representation 4408 can be a bar chart, scatter plot, polar coordinate graph, etc. Additionally, the number and type of representations and associated strokes can be extensible to add new strokes and corresponding representations for use.

The system 4400 provides the capability of auto-completion of the graphical representation 4408 and auto-completion based on user interaction(s) 4404 to the graphical representation 4408. In other words, the user interaction 4404 can suggest the graphical representation 4408, which can be an arrow, axes of chart, bar, etc. Note that in a touch-based interface the user interaction 4404 can comprise a single touch or multi-touch gestures that can be combined with hand postures, for example.

The computation component 4406 can comprise a recognition component 4422 (e.g., gesture recognition component) that receives the one or more interactions (e.g., strokes) from a user interaction collector 4424, which can be a component that receives the user interaction(s) 4404 as applied (input) by the user(s). The recognition component 4422 recognizes the interaction and generates a result that facilitates the presentation of the graphical representation 4408 suggested by the interaction.

The recognition component 4422 employs one or more recognizers that process the user interaction 4404 for the graphical representations 4420 such as arrows, charts, etc. Additionally, the recognition component 4422 handles annotations 4426 (internally) associated with the graphical representations 4420. An annotation is a passive data collection associated with an interaction (e.g., stroke). The user does not interact with an annotation. The annotation performs basic transformations of its underlying data (e.g., an arrow annotation may retrieve the "object" at which the arrow annotation points). User interaction 4404 first passes through the recognizers of the recognition component 4422, which recognizers in turn may modify annotations 4426. During a redraw event, renderers of the rendering component 4428 read this information and display it.

A rendering component 4428 includes different renderers for rendering data in the annotations 4426. The rendering component 4428 can include different renderers for different graphical representation types (e.g., chart, arrows, bars, legend, label menu, etc.). Although depicted as part of the computation component 4406, the recognition component 4422 and rendering component 4428 can be implemented external thereto. For example, the rendering component 4428 can be part of the presentation component 4414.

The user interaction(s) 4404 can include many different types of interactions (e.g., strokes) such that when processed present the corresponding user data 4410 as part of a new or updated graphical representation (of the graphical representations 4420).

The recognition component 4422 adds an annotation (of the annotations 4426) in combination with the graphical representation 4408. The digital interactive component 4402 allows the user interaction 4404 to be applied directly to a visualization interface (e.g., display surface, whiteboard, etc.) by a user. The stroke can be a freeform stroke (sketch-based) input by a user (e.g., marker pen, digital pen, touch, etc.) and recognized for completion of the graphical representation 4408 by the recognition component 4422. This auto-completion feature applies equally well to other user input modes described herein, such as for touch-based inputs, pen-based inputs, etc.

The sketch-based interactions can change the graphical representation 4408 based on symbols, transform the user data 4410 by applying a function, and filter the user data 4410 by removing an item of a legend from consideration (e.g., by applying a strikethrough stroke over the legend item). The user interaction 4404 can comprise multiple input strokes that are processed to operate on the graphical representation 4408 and associated user data 4410 or generate a new graphical representation that characterizes the user data 4410 in a different visual way.

The digital interactive component 4402, data analysis and processing component 4416, recognition component 4422, rendering component 4428, and presentation component 4414 facilitate the receipt, processing, and presentation of multiple concurrent user interactions, associated suggested annotations to be retrieved for the multiple concurrent user interactions, and corresponding graphical representations.

The user interaction 4404 can be interpreted to change the graphical representation 4408 based on symbols, transform the user data 4410 by applying a function, and filter the user data 4410 by deleting a menu item from consideration (using a strikethrough stroke as the user interaction 4404). The user interaction 4404 can be a freeform stroke applied directly by a user to the digital interactive component (e.g., a touch-based surface, pen-based surface, etc.).

The user interaction 4404 can comprise multiple interactions (from a single user or multiple users) which include a second stroke that when processed presents the user data 4410 as part of a new graphical view suggested by a combination of the stroke and the second stroke. The user interaction 4404 can comprise multiple strokes from multiple users that are processed concurrently to operate on the graphical view 4412 and associated user data 4410 or to generate new graphical view of the user data 4410. The presentation component 4414 projects user data as characterized by the graphical representation 4408 and a menu item onto the digital interactive component 4402 in realtime in response to the user interaction 4404.

FIG. 45 illustrates a more detailed embodiment of an exemplary sketch-based interactive computer-based data analysis system 4500 in accordance with the disclosed architecture. It is to be appreciated that this is just one example embodiment. Alternative embodiments can include different types of recognizers 4502, different types of annotations 4426, and renderers 4504 (e.g., chart/graph components such as axes, points, bars, etc.). The system 4500 can be constructed and applied as a form of "blackboard" system with sets of recognizers 4502 (as part of the recognition component 4422) that add information to the system during operation. The recognizers 4502 monitor (directly or indirectly) one or more incoming strokes of particular types (e.g., a delete stroke) and add annotations 4426 based on stroke structure. Renderers 4504 (of the rendering component 4428) render the data in the annotations to the screen or interactive surface (e.g., whiteboard).

Information can be provided as the annotations 4426, which annotations 4426 are then associated with sets of strokes (e.g., pen-based). As strokes are added to the board (visualization surface, component, or interface), relevant features (e.g., arrow) are recognized, and appropriate annotations are added. Likewise, as strokes are erased (removed from consideration), the system 4500 deletes the relevant annotations and ensures that the state of the system 4500 is consistent with the erasure.

The recognizers 4502 can include a chart recognizer, arrow recognizer, bar recognizer, legend recognizer, and label menu recognizer, just to name a few. The chart annotations 4426 include, but are not limited to, a shape legend, label menu, color legend, function menus, axes menus, axes arrows, and so on. The rendered chart (graphical representation 4408) can include a set of graphical objects such as axes, tic marks, legends, points, bars, one or more label menus, arrows, and so on.

In one implementation, a registry of the recognizers 4502 can be maintained along with a formal description of the patterns associated with the recognizers. Alternatively, each recognizer can implement its own patterns arbitrarily, and hence, there is no global description repository utilized. The recognizers 4502 "listen" for updates to the system, whether the updates are new strokes (drawn by the user) or new annotations (added by other recognizers). When a stroke is added to the board (visualization surface), all listening recognizers are notified so that each recognizer can check in turn if the stroke matches the type of item that the recognizer is looking for.

A single stroke may trigger several stroke recognizers 4502 and be matched successfully by all of the recognizers 4502. Thus, strokes can have multiple overlapping annotations 4426 as well. For example, strokes may be interpreted as an arrow as well as the letter "t." In the case where these interpretations coexist, the ambiguous interpretation is left alone. When one interpretation excludes the other, higher level recognizers may remove a conflicting annotation (e.g., arrows recognized as axes are stripped of any textual annotations). Once an update occurs, it is up to the recognizers 4502 to modify the annotations 4426 appropriately to ensure that the underlying meaning of each annotation matches the strokes on the board.

Several different annotations 4426 on strokes can be maintained by the recognizers 4502, including, but not limited, to the following. Additionally, the following are but some examples in which the strokes can be implemented.

Arrows: users can begin the charting process by drawing two arrows (each input individually) for axes. In one design, single-stroke arrows can be utilized for performance reasons. Arrow annotations 4426 are maintained by an arrow recognizer, which "listens" (or observes) for raw strokes shaped like arrows.

Charts: upon recognizing two (nearly) intersecting arrows as axes, the system creates a chart annotation for that chart. Within this structure is stored the semantic information for the chart, including the backend data sets loaded by the user, logical placement of x- and y-axis tic marks on the axes, and which columns are loaded into which axes. The chart annotation is created by a specific recognizer that listens only for intersecting arrows, but once instantiated, it is managed by its own chart recognizer that listens for axis tics (raw strokes) and axis label (text menu/legend annotation) updates. As users add strokes to the system, the strokes are annotated internally as needed, and the results cascade up to the encompassing chart annotation. By handling multiple chart annotations independently, users are allowed to draw any number of charts that will fit on the screen (visualization surface or interface component). Alternatively, the user can call up charts that are retrievable by the device.

Axis Legends: Created with each chart annotation are two legend annotations, one each for the color and shape axes. These data structures hold data about which data column is selected for that axis (through a label menu annotation) as well as filters applied to that column's data. These annotations are kept up-to-date by the legend recognizer that listens for raw strokes that cross out values populated from the column, and changes to label menu annotations that modify which data column is selected for that axis.

Label Menus: label menu annotations can have two forms. The first and simplest form defines an area for text entry. As users write in the area, the associated label menu recognizer monitors the resulting text annotations (e.g., as returned from queries to libraries), and chooses the first partial match among the possible options. For example, given a list of column names (e.g., "Country," "Population," "Year") as options, the label menu sets its choice as "Country" as soon as a set of strokes are annotated as "C," "CO," "COU," etc. A second type of label menu displays the list of available options below the text entry area. Users may then circle the option the user desires to select. With this type of label menu, the menu recognizer also listens for raw strokes that circle options. Once an option is circled, the recognizer updates the annotation by setting its choice. A third type can incorporate a combination of the other two such that as the user writes text, the system shows a list of column names that matches (i.e., contains) the entered text.

Bars: when a user draws a bar-shaped stroke on the visualization surface or interface, a listening bar recognizer creates a bar annotation. The chart recognizer then checks whether the bar defined in that annotation crosses (intersects) the x-axis, and changes its chart annotation to a bar chart if the intersection exists.

While the recognizers 4502 update and manage the underlying data of annotations, the renderers 4504 have the task of displaying to the user the state defined in the annotations 4426. Each annotation/recognizer defines a method of interaction, the details of which are communicated to the user by changing the look of the board. Rendering can be restricted to adding graphics to the board (without removing or cleaning up user strokes) in order to encourage users to modify the charts through the previous strokes.

The chart rendered overlays straight lines over the user-drawn axes and tic marks, and draws colored points/symbols/bars at the correct position on the board. It then calls label menu and legend renderers to print text from the recognized results of handwriting in the text entry areas of the chart.

The recognizers 4502 can be associated with specific annotations 4426 and renderers 4504. For example, a chart recognizer 4506 can have a chart annotation 4508 and a chart renderer 4510 (that rendered axes, tics, legends, points, and bars, for example). Similarly, a bars recognizer 4512 can have the same chart annotation 4508 and a chart renderer 4510. An arrows recognizer 4514 can have an x/y axis arrows annotation 4516, and arrows renderer 4518. A legend recognizer 4520 can have a shape legend annotation 4522 and a color legend annotation 4524. A label menu recognizer 4526 can have a shape legend label menu annotation 4528, color legend label menu annotation 4530, function menu annotation 4532, and an x/y axis menus annotation 4534, as well as a label menu renderer 4536. As shown, these are only but a few of the possible recognizers, annotations, and renderers that can be employed.

Put another way, an interactive system is disclosed that includes a digital interactive component that receives user interaction as a stroke applied directly thereto, a recognition component that recognizes the stroke and manages an annotation associated with a set of strokes, a rendering component that renders state defined in an annotation, a data analysis and processing component that performs an operation on user data based on the graphical representation to create a graphical view of the user data, and a presentation component that presents the graphical view of the user data in association with the stroke and the digital interactive component.

The presentation component can project the graphical view, and a characterization of the user data based on the graphical representation onto the digital interactive component in realtime response to the user interaction. The user interaction can be a freeform stroke that suggests at least one of a chart, graph, arrow, legend, menu, scaling, filtering, colorization, data transformation, or erasure. The user interaction is interpreted and recognized to enable analysis of the user data. The user interaction is processed to enable change of the graphical representation based on symbols or gestures, transformation of the user data via a function, and filtering of the user data, etc. The user interaction can comprise multiple sketch-based strokes applied to the digital interactive component and recognized concurrently to create corresponding suggested graphical representations.

Referring now to FIG. 46, there is illustrated a block diagram of a computing system 4600 that executes sketch-based interaction with computer-aided data analysis in accordance with the disclosed architecture. In order to provide additional context for various aspects thereof, FIG. 46 and the following description are intended to provide a brief, general description of the suitable computing system 4600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 4600 for implementing various aspects includes the computer 4602 having processing unit(s) 4604, a computer-readable storage such as a system memory 4606, and a system bus 4608. The processing unit(s) 4604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 4606 can include computer-readable storage (physical storage media) such as a volatile (VOL) memory 4610 (e.g., random access memory (RAM)) and non-volatile memory (NON-VOL) 4612 (e.g., ROM, EPROM, EEPROM, etc.). A basic input/output system (BIOS) can be stored in the non-volatile memory 4612, and includes the basic routines that facilitate the communication of data and signals between components within the computer 4602, such as during startup. The volatile memory 4610 can also include a high-speed RAM such as static RAM for caching data.

The system bus 4608 provides an interface for system components including, but not limited to, the system memory (e.g., memory subsystem) 4606 to the processing unit(s) 4604. The system bus 4608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 4602 further includes machine readable storage subsystem(s) 4614 and storage interface(s) 4616 for interfacing the storage subsystem(s) 4614 to the system bus 4608 and other desired computer components. The storage subsystem(s) 4614 (physical storage media) can include one or more of a hard disk drive (HDD), a magnetic floppy disk drive (FDD), and/or optical disk storage drive (e.g., a CD-ROM drive DVD drive), for example. The storage interface(s) 4616 can include interface technologies such as EIDE, ATA, SATA, and IEEE 1394, for example.

One or more programs and data can be stored in the system memory 4606, a machine readable and removable memory subsystem 4618 (e.g., flash drive form factor technology), and/or the storage subsystem(s) 4614 (e.g., optical, magnetic, solid state), including an operating system 4620, one or more application programs 4622, other program modules 4624, and program data 4626.

The operating system 4620, one or more application programs 4622, other program modules 4624, and program data 4626 can include the entities and components of the system 4400 of FIG. 44, the entities and components of the system 4500 of FIG. 45, among others.

Generally, programs include routines, methods, data structures, other software components, etc., that perform particular tasks or implement particular abstract data types. All or portions of the operating system 4620, application programs 4622, modules 4624, and/or data 4626 can also be cached in memory such as the volatile memory 4610, for example. It is to be appreciated that the disclosed architecture can be implemented with various commercially available operating systems or combinations of operating systems (e.g., as virtual machines).

The storage subsystem(s) 4614 and memory subsystems (4606 and 4618) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 4602 and includes volatile and non-volatile internal and/or external media that is removable or non-removable. For the computer 4602, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 4602, programs, and data using external user input devices 4628 such as a keyboard and a mouse. Other external user input devices 4628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 4602, programs, and data using onboard user input devices 4630 such a touchpad, microphone, keyboard, etc., where the computer 4602 is a portable computer, for example. These and other input devices are connected to the processing unit(s) 4604 through input/output (I/O) device interface(s) 4632 via the system bus 4608, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 4632 also facilitate the use of output peripherals 4634 such as printers, audio devices, camera devices, and so on, such as a sound card and/or onboard audio processing capability.

One or more graphics interface(s) 4636 (also commonly referred to as a graphics processing unit (GPU)) provide graphics and video signals between the computer 4602 and external screen(s) 4638 (e.g., LCD, plasma) and/or onboard screen 4640 (e.g., for portable computer). The graphics interface(s) 4636 can also be manufactured as part of the computer system board.

The computer 4602 can operate in a networked environment (e.g., IP-based) using logical connections via a wired/wireless communications subsystem 4642 to one or more networks and/or other computers. The other computers can include workstations, servers, routers, personal computers, microprocessor-based entertainment appliances, peer devices or other common network nodes, and typically include many or all of the elements described relative to the computer 4602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 4602 connects to the network via a wired/wireless communication subsystem 4642 (e.g., a network interface adapter, onboard transceiver subsystem, etc.) to communicate with wired/wireless networks, wired/wireless printers, wired/wireless input devices 4644, and so on. The computer 4602 can include a modem or other means for establishing communications over the network. In a networked environment, programs and data relative to the computer 4602 can be stored in the remote memory/storage device, as is associated with a distributed system. It will be appreciated that the network connections shown are exemplary and other means of establishing a communications link between the computers can be used.

The computer 4602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Method Examples

Figure 47:
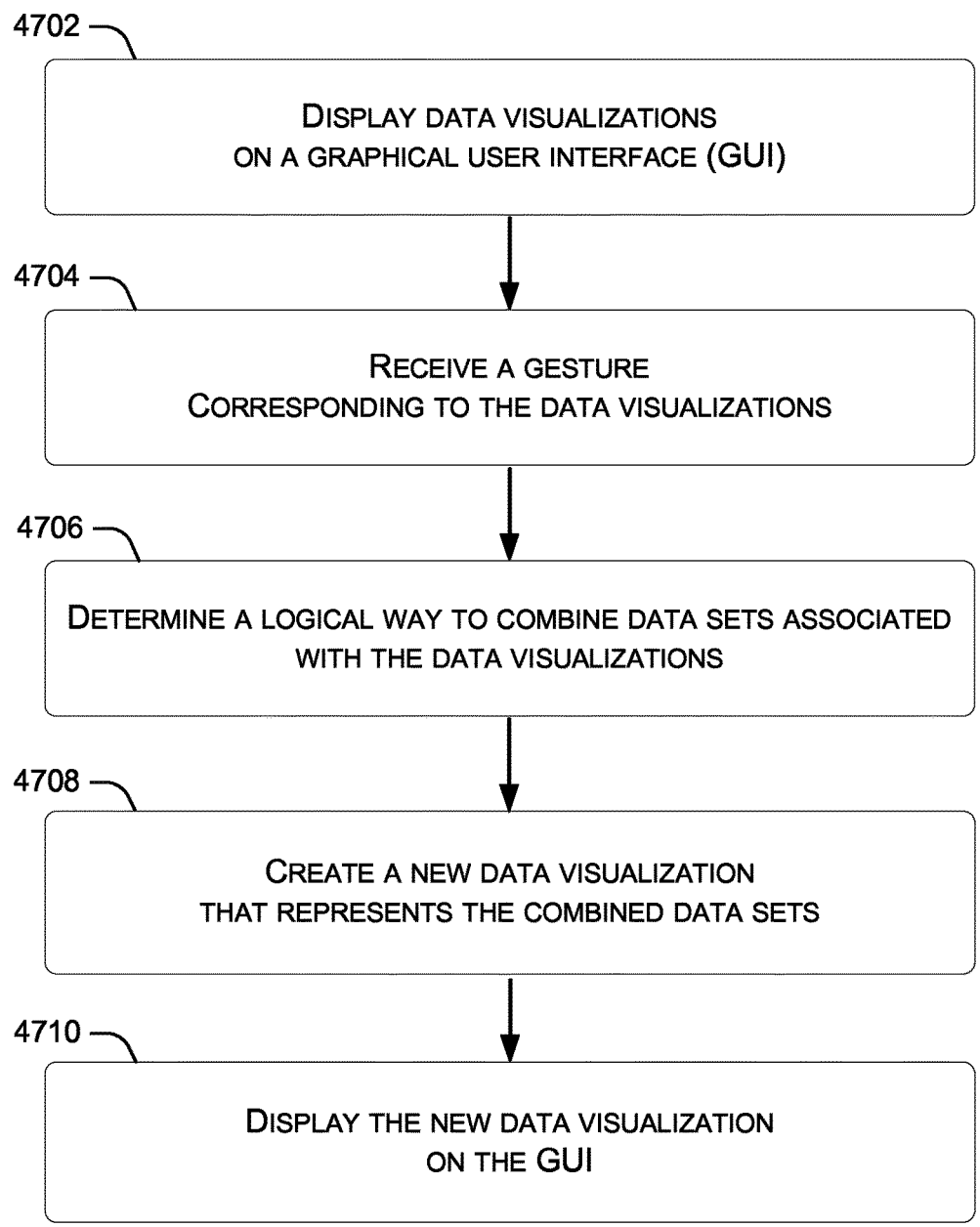
FIGS. 47-49 are flowcharts of example interactive digital display techniques in accordance with some implementations of the present concepts.

FIG. 47 shows an example interactive experience method 4700. In this case, the method can display data visualizations on a graphical user interface (GUI) at block 4702. The GUI can be displayed on a variety of devices, including a digital whiteboard, smart phone, and tablet. Examples of the data visualizations can include charts, graphs, tables, photographs, computer-generated graphical objects, and/or artworks that have been processed into digital images. The data visualizations can be retrieved from storage locally or over a network.

From one perspective the GUI can be thought of as a 'canvas' where a user or users create new data visualizations. In some implementations, touch, via finger touch (e.g., touch) and/or pen touch (e.g., pen) can be the primary input mechanisms for creation of new content on the shared canvas via basic functionality. Much like a physical whiteboard, a user can write free-form ink on the canvas. In some cases, the canvas can be scrollable, to create an (essentially) infinite canvas. This ink can be automatically recognized through a number of shape recognizers, bridging the gap between free form ink and objects with schema and behaviors. For example, as a user writes a list, the method can recognize this and start to draw guidelines for the next item in the list as well as provide behaviors for ink-to-text, sorting, etc.

The method can receive a gesture corresponding to the data visualizations at block 4704. Alternatively, the method can receive any form of command or user input relative to the data visualizations and/or the GUI. For example, the input can include pen input, touch input, body gestures, visual cues, or spoken commands. In some implementations, the input can be made relative to one device, such as a tablet, while the data visualizations are viewed on another device, such as a digital whiteboard, or viewed on a projection screen. The gesture or user input can be directed toward a wide variety of operations relative to the data visualizations. Specific examples are described in more detail above relative to FIGS. 1-41.

Responsive to the gesture, the method can determine a logical way to combine data sets associated with the data visualizations at block 4706. Alternatively, the method can extract data from a data set to generate a subset of the data set. The extracted subset can be used to create a new data visualization.

The method can create a new data visualization that represents the combined data sets at block 4708.

The method can display the new data visualization on the GUI at block 4710.

Figure 48:
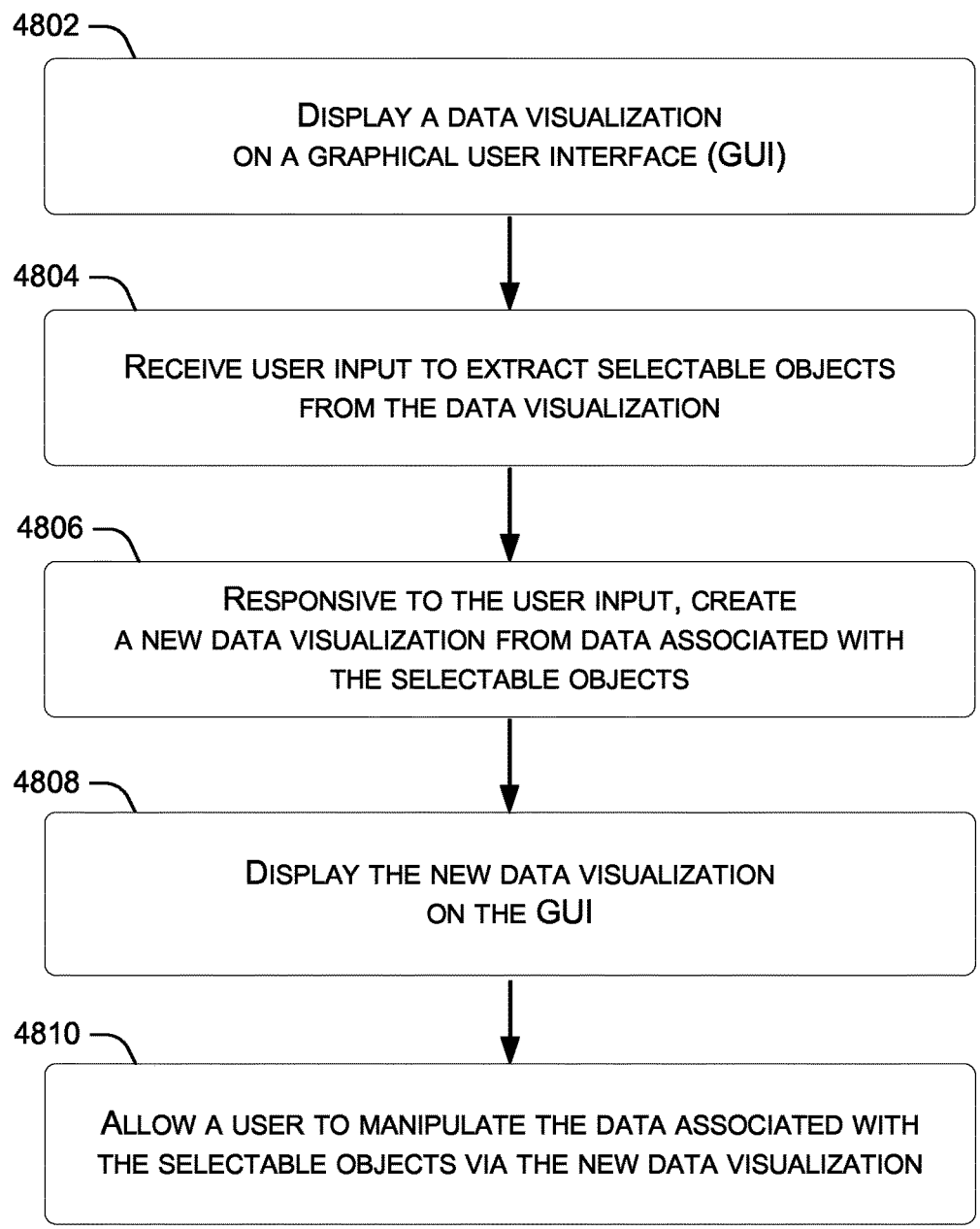

FIG. 48 shows an example interactive experience method 4800. In this case, the method can display a data visualization on a graphical user interface (GUI) at block 4802.

The method can receive user input to extract selectable objects from the data visualization at block 4804. The selectable objects can be any of a variety of items within the data visualizations, including rows of a table, columns of a table, data points on a chart, and/or isolated images in a picture, among others. The user input can include pen input, touch input, body gestures, visual cues, or spoken commands, among others. The selectable objects can be a subset of the data in the data visualization.

Responsive to the user input, the method can create a new data visualization from data associated with the selectable objects at block 4806. The extracted subset can be used to create a new data visualization. For example, rows of a table can be extracted to create a new table.

The method can display the new data visualization on the GUI at block 4808.

The method can allow a user to manipulate the data associated with the selectable objects via the new data visualization at block 4810. For example, the user can further extract selectable objects from the subset, or combine the subset with another subset or other information to create new data visualizations. Or, the user can perform various forms of data analyses on the subset.

Figure 49:
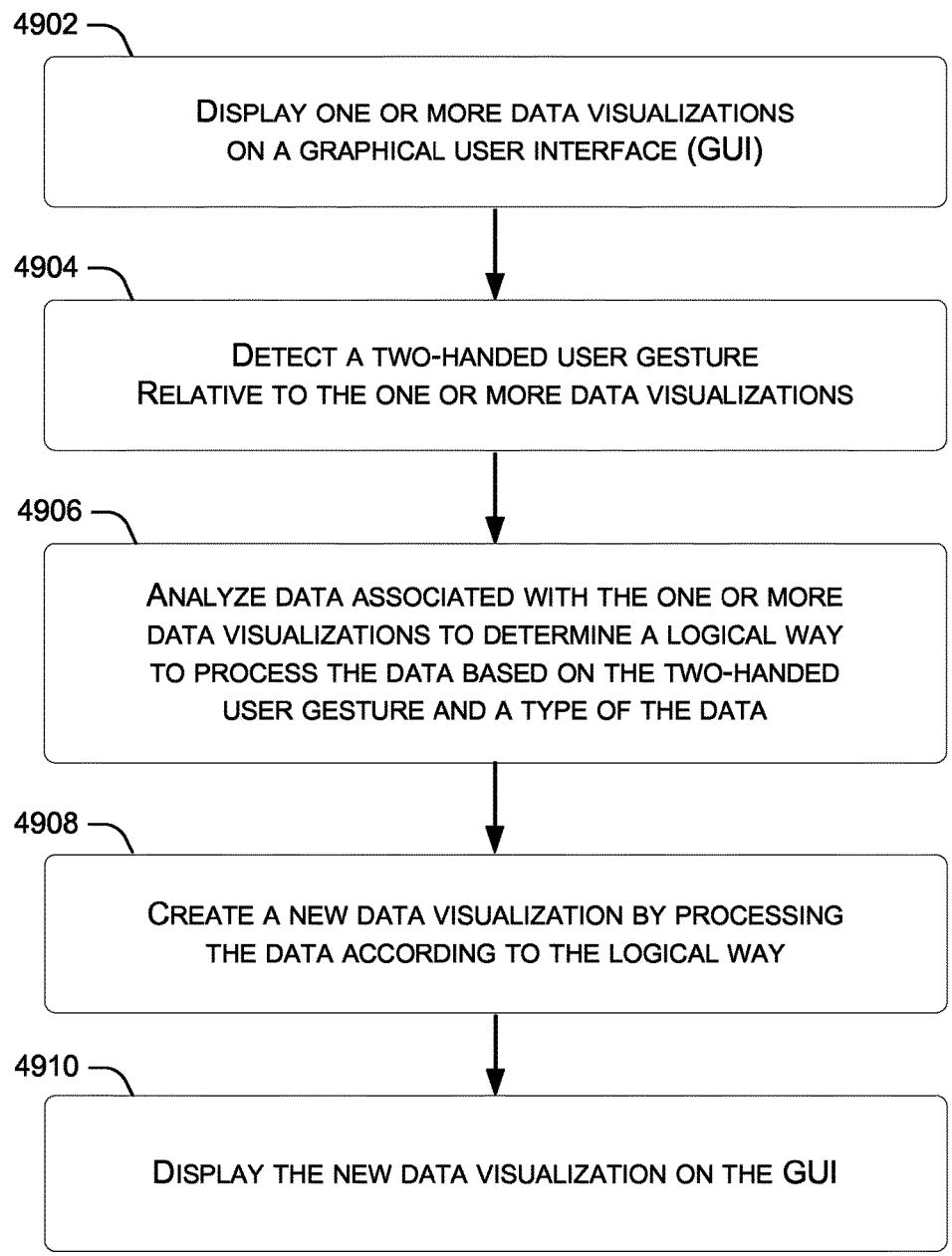

FIG. 49 shows an example interactive experience method 4900. In this case, the method can display one or more data visualizations on a graphical user interface (GUI) at block 4902.

The method can detect a two-handed user gesture relative to the one or more data visualizations at block 4904. In some cases, the two-handed user gesture can be a "bump" gesture. In other cases, the two-handed user gesture can be a gesture indicating an extraction command, to extract data from a data visualization.

The method can analyze data associated with the one or more data visualizations to determine a logical way to process the data based on the two-handed user gesture and a type of the data at block 4906. In one example, the method can determine that the user is performing a bump gesture relative to two charts, and determine that a logical way to respond to the bump gesture is to combine the charts into a new chart (e.g., to combine the data for the two charts and use the combined data to create the new chart). Further in this example, the type of new chart created by the method can be derived from the type of data in the one or more data visualizations.

The method can create a new data visualization by processing the data according to the logical way at block 4908. In one example, the new data visualization can contain individually selectable objects that represent subsets of data associated with the new data visualization. In some cases, the new data visualization can be generated without further input from the user beyond the two-handed user gesture.

At block 4910, the method can display the new data visualization on the GUI.

The described methods can be performed by the systems and/or devices described above relative to FIGS. 42-46, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a computing device causes the computing device to perform the method.

To summarize, the present techniques can offer a low friction or frictionless ability to interact with data visualizations in an interaction experience with a digital display device. Users can brainstorm ideas, manipulate data, and search for information in a whiteboard-style interaction using intuitive and/or widely recognized user commands.

CONCLUSION

The interactive digital display can allow interactions with data visualizations. The interactive digital display can attempt to recognize user input to offer functionality including new visualizations of data. The data can include newly created content and existing information accessed locally and/or over a network.

The present concepts can be distinguished from existing pen- and touch-enabled devices by the depth of functionality related to data manipulations. In some implementations of the present concepts, the interactive digital display can automatically generate combinations of data visualizations, offering new ways of viewing the combined data. The interactive digital display can allow users to separate objects or data from data visualizations as independent functional items, which can be further combined or analyzed with other information. The interactive digital display can allow natural brainstorming and collaboration activities among users aided by the computational power of a computer.

Although techniques, methods, devices, systems, etc., pertaining to interaction with data visualizations on digital displays are described in language specific to structural features and/or methodological acts, it is to be understood that the subject matter defined in the appended claims is not necessarily limited to the specific features or acts described. Rather, the specific features and acts described above are disclosed as exemplary forms of implementing the claimed methods, devices, systems, etc.

The invention claimed is:

1. A device, comprising:
 a screen;
 a camera; and,
 a processor configured to cause a graphical user interface to be presented on the screen and wherein the graphical user interface is configured to:
  receive visual input from the camera, the visual input related to a non-touch user command performed by a user and detected by the camera,
  interpret the visual input as a bump gesture indicating selection of a first data visualization and a second data visualization and movement of the first and second data visualizations toward one another to combine the first and second data visualizations,
  responsive to interpreting the visual input as the bump gesture, without further input from the user beyond the bump gesture:
   analyze data associated with the first and second data visualizations to automatically determine a logical way to process the data and automatically determine a format of a third data visualization, and automatically generate the third data visualization with the automatically determined format, wherein the third data visualization represents a combination of the data from the first and second data visualizations.

2. The device of claim 1, wherein the bump gesture performed by the user consists of the user selecting the first data visualization and the second data visualization with two hands or one or more fingers from each hand and simultaneously moving the two hands or the one or more fingers toward one another, and wherein the graphical user interface is further configured to show the first and second data visualizations simultaneously moving toward one another as the bump gesture is performed.

3. The device of claim 1, wherein the graphical user interface is further configured to automatically generate the third data visualization by examining a first set of data from the first data visualization and a second set of data from the second data visualization for a common category.

4. The device of claim 3, wherein the third data visualization is based at least in part on the common category.

5. The device of claim 1, wherein the graphical user interface is configured to display the third data visualization.

6. The device of claim 1, wherein the graphical user interface is further configured to:
receive another input from the camera,
interpret the another input as an extraction gesture to extract a subset of data from the third data visualization;
responsive to the extraction gesture, automatically create a fourth data visualization that displays the subset of data; and
display the fourth data visualization on the graphical user interface.

7. The device of claim 6, wherein the extraction gesture is performed by the user in relation to one or more selectable objects in the third data visualization, the selectable objects representing the subset of data.

8. The device of claim 7, wherein the fourth data visualization presents the subset of data in a different form than the third data visualization, and the fourth data visualization includes new objects that are individually selectable.

9. The device of claim 6, wherein the fourth data visualization is displayed on the graphical user interface with the third data visualization.

10. A method implemented by one or more computing devices, the method comprising:
displaying a first image and a second image on a graphical user interface (GUI);
detecting a two-handed, non-touch user gesture relative to the first and second images, wherein a first hand indicates selection of the first image and a second hand indicates selection of the second image, and the two-handed, non-touch user gesture further comprises simultaneous independent actions performed by the user with the first hand and second hand relative to the first and second images;
analyzing data associated with the first and second images to determine a logical way to process the data based on the two-handed, non-touch user gesture and a type of the data;
creating a new image by processing the data according to the logical way; and
displaying the new image on the GUI.

11. The method of claim 10, wherein the first and second images are pictures, and the new image created by processing the data according to the logical way includes at least one object from each of the pictures.

12. A system, comprising:
storage configured to store computer-readable instructions;
a processor configured to execute the computer-readable instructions;
a gesture recognition component configured to recognize a two-handed gesture entered by a user relative to selectable objects of a display of one or more visualizations of data, wherein the two-handed gesture comprises selecting a first individual selectable object with a first hand of the user and selecting a second individual selectable object with a second hand of the user, and the two-handed gesture further comprises an independent action performed by the user with the first hand relative to the first individual selectable object and a simultaneous independent action performed by the user with the second hand relative to the second individual selectable object;
a data analysis and processing component configured to:
analyze the data associated with the one or more visualizations in response to the two-handed gesture, and
determine a logical way to process at least some of the data from the one or more visualizations in accordance with the two-handed gesture; and,
a visualization rendering component configured to generate a new visualization that represents the at least some of the data from the one or more visualizations,
wherein the processor is configured to execute the computer-readable instructions associated with at least one of the gesture recognition component, the data analysis and processing component, or the visualization rendering component.

13. The system of claim 12, wherein the system further comprises sensors that receive the two-handed gesture.

14. The system of claim 13, wherein the sensors are touch sensors associated with the display.

15. The system of claim 14, wherein the gesture recognition component is further configured to receive output from the touch sensors and derive the two-handed gesture from the output.

16. The system of claim 12, wherein the visualization rendering component is further configured to communicate the new visualization as output to the display.

17. The system of claim 12, wherein the system further comprises the display.

18. The system of claim 12, wherein the one or more visualizations comprises multiple visualizations, and the new visualization represents combined data from the multiple visualizations.

19. The system of claim 12, wherein the new visualization represents extracted data from the one or more visualizations.

20. The system of claim 19, wherein the selectable objects are the one or more visualizations and the selectable objects are also elements within the one or more visualizations, the two-handed gesture is related to an individual visualization and an individual element, and the extracted data is associated with the individual element.

* * * * *